United States Patent [19]

Kageyama et al.

[11] Patent Number: 4,882,614
[45] Date of Patent: Nov. 21, 1989

[54] MULTIPLEX SIGNAL PROCESSING APPARATUS

[75] Inventors: Sadashi Kageyama, Hirakata; Yoshio Abe, Ibaraki; Yoshio Yasumoto, Nara; Shuji Inoue, Neyagewa; Hitoshi Takai, Hirakata; Mitsujiro Matsumoto, Shijyonawate; Kouji Aono, Saijyo; Kiyoshi Uchimura, Hirakata; Eiji Iwasaki, Neyagawa, all of Japan

[73] Assignee: Matsushita Electric Industrial Co., Ltd., Osaka, Japan

[21] Appl. No.: 70,804

[22] Filed: Jul. 7, 1987

[51] Int. Cl.$^4$ .................. H04N 7/08; H04N 11/12
[52] U.S. Cl. .................. 358/12; 358/141; 358/147
[58] Field of Search .................. 358/12, 14, 15, 16, 358/23, 141, 142, 147

[56] References Cited

U.S. PATENT DOCUMENTS

| | | | |
|---|---|---|---|
| 2,861,180 | 11/1958 | Sonnenfeldt | 358/36 |
| 4,237,486 | 12/1980 | Shimp | 358/14.2 |
| 4,417,270 | 11/1983 | Nagao et al. | 358/23 |
| 4,473,837 | 9/1984 | Tiemann | 358/12 |
| 4,485,401 | 11/1984 | Tan et al. | 358/141 |
| 4,521,803 | 6/1985 | Gittinger | 358/12 |
| 4,533,960 | 8/1985 | Tiemann et al. | 358/12 |
| 4,535,352 | 8/1985 | Haskell | 358/16 |
| 4,551,754 | 11/1985 | Merse et al. | 358/180 |
| 4,583,115 | 4/1986 | Lynch | 358/31 |
| 4,594,607 | 6/1986 | Lewis, Jr., et al. | 358/23 |
| 4,616,252 | 10/1986 | Schiff | 358/23 |
| 4,631,574 | 12/1986 | Lo Cicero et al. | 358/141 |

FOREIGN PATENT DOCUMENTS

| | | | |
|---|---|---|---|
| 3414452 | 10/1985 | Fed. Rep. of Germany | 358/14 |
| 49-79117 | 7/1974 | Japan . | |
| 53-36295 | 10/1978 | Japan . | |
| 59-171387 | 9/1984 | Japan . | |
| 1158918 | 7/1969 | United Kingdom | 358/14 |
| 1198986 | 7/1970 | United Kingdom | 358/14 |

OTHER PUBLICATIONS

Fukinuki et al., Experiments on Proposed Extended-Definition TV with Full NTSC Compatibility, SMPTE Journal, Oct. 1984, pp. 923–929.

Primary Examiner—John W. Shepperd
Attorney, Agent, or Firm—Wenderoth, Lind & Ponack

[57] ABSTRACT

A multiplex signal processing apparatus in a signal transmitting and receiving system includes at the transmitting side: a first amplitude-modulator for modulating a first carrier by a main signal to obtain a vestigial sideband, amplitude-modulated main signal; a second amplitude-modulator for modulating a second carrier which has the same frequency but differs in phase by 90° from the first carrier by a multiplex signal to obtain a double sideband, amplitude-modulated multiplex signal; an inverse Nyquist filter for filtering this signal to obtain a vestigial sideband, amplitude-modulated multiplex signal; and an adder for adding the vestigial sideband, amplitude-modulated main and multiplex signals to obtain a multiplexed signal. The apparatus at the receiving side includes: a Nyquist filter for filtering the multiplexed signal; a carrier regenerator for regenerating the first and second carriers from the multiplexed signal; a main signal detector for detecting the main signal from the multiplexed signal passed through the Nyquist filter by using the first carrier; a filter for removing quadrature distortion from the multiplexed signal; and a multiplex signal detector for detecting the multiplex signal from the multiplexed signal passed through the filter by using the second carrier. By inverse Nyquist filtering the auxiliary signal in quadrature to the picture carrier, a normal synchronous receiver will produce a conventional television signal without distortion (crosstalk) caused by quadrature distortion of an auxiliary signal containing additional picture information while at the same time allowing relatively simple demodulation of the auxiliary signal in improved receivers without adding distortion.

33 Claims, 37 Drawing Sheets

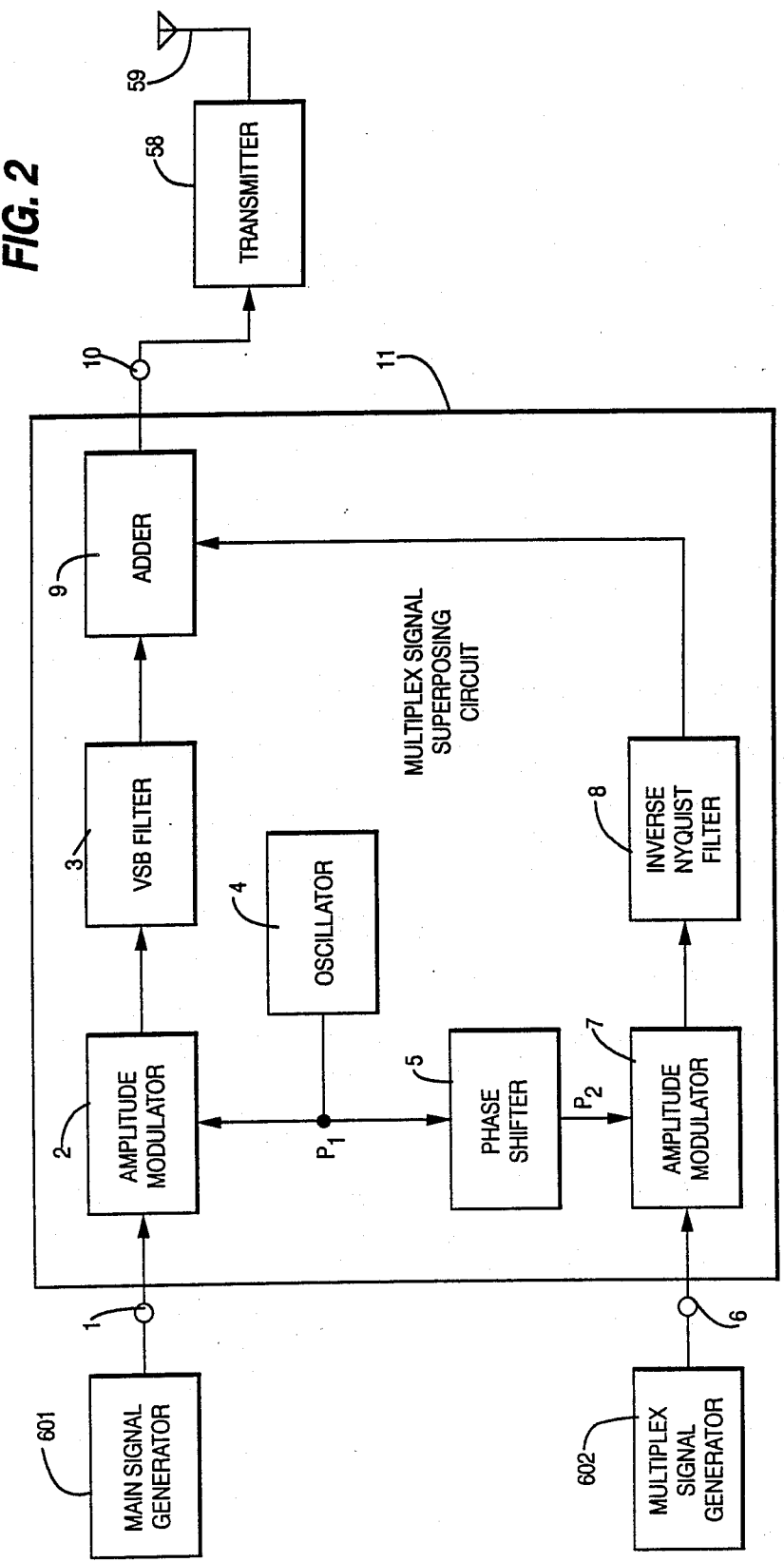

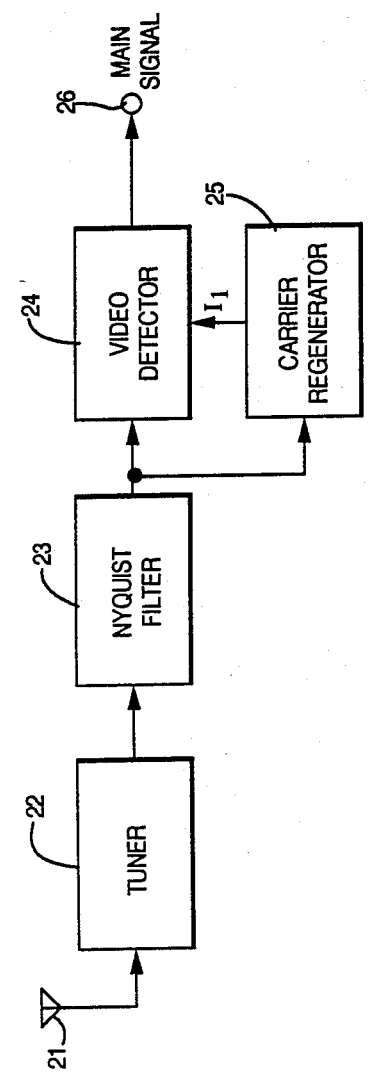
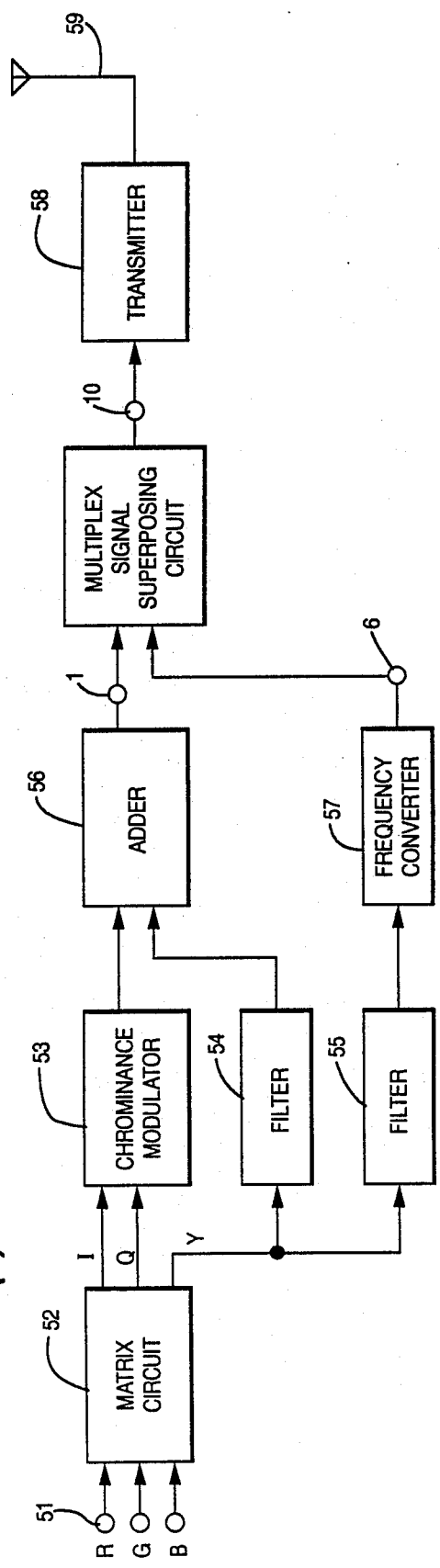
FIG. 3(a) PRIOR ART
FIG. 5(a)

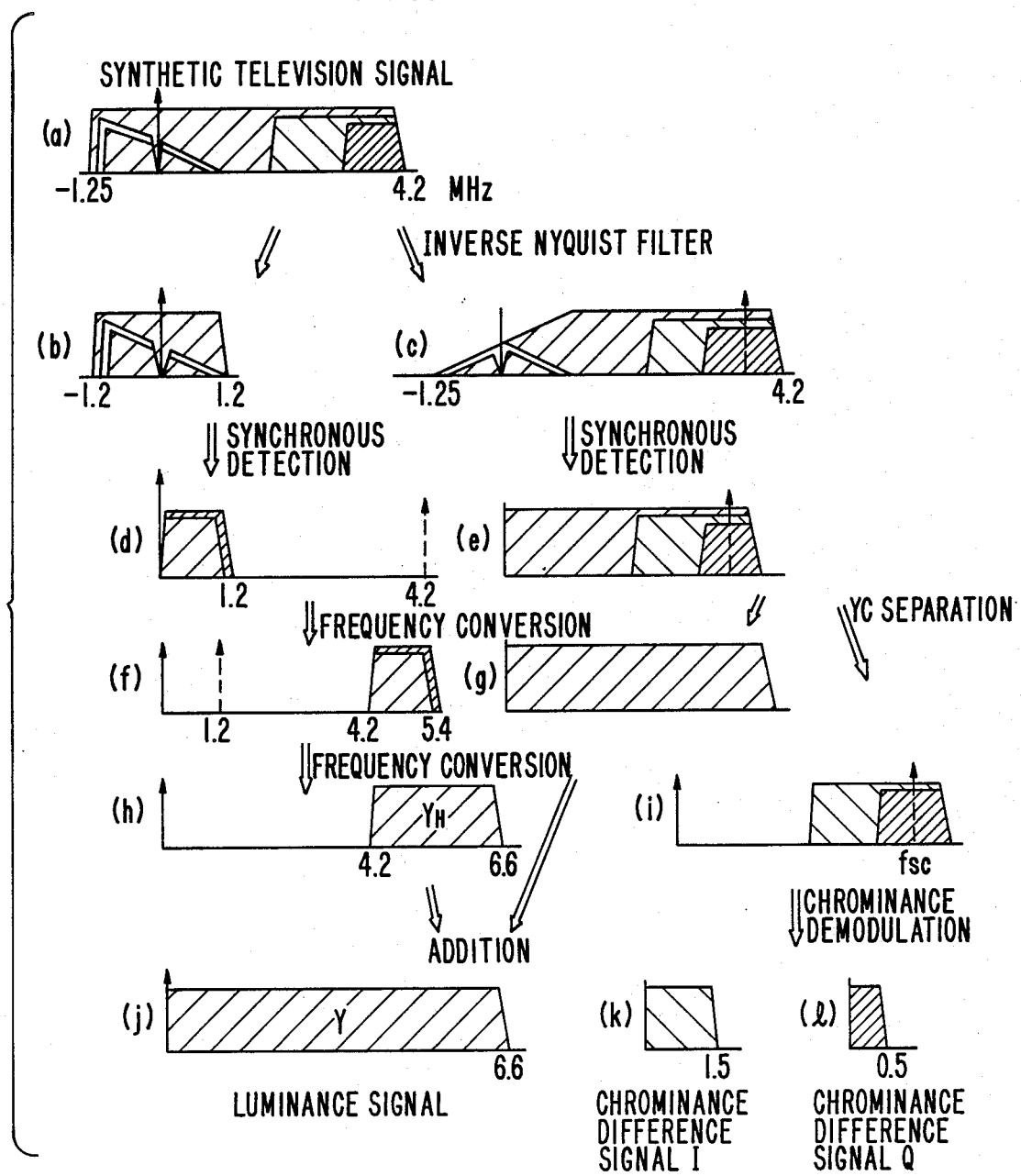

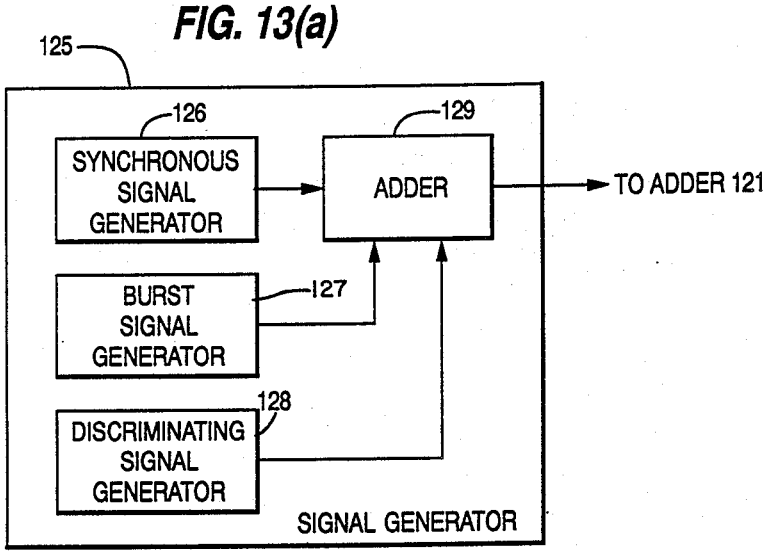
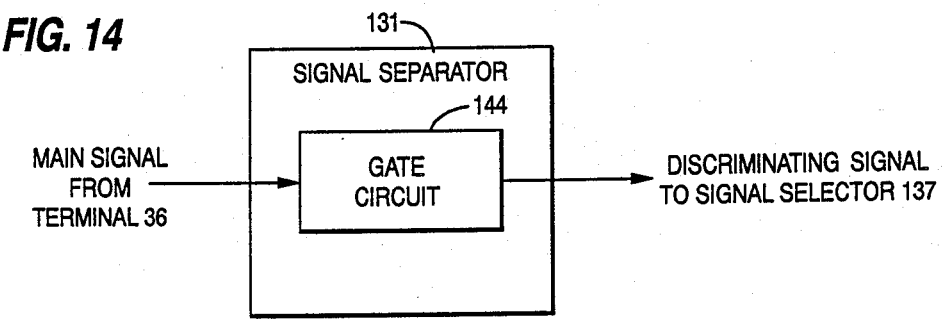
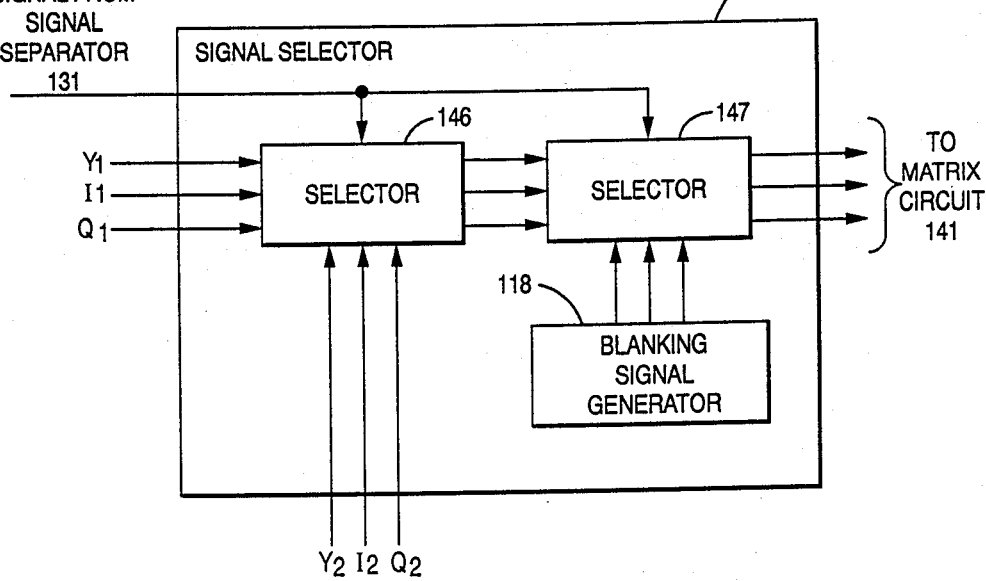

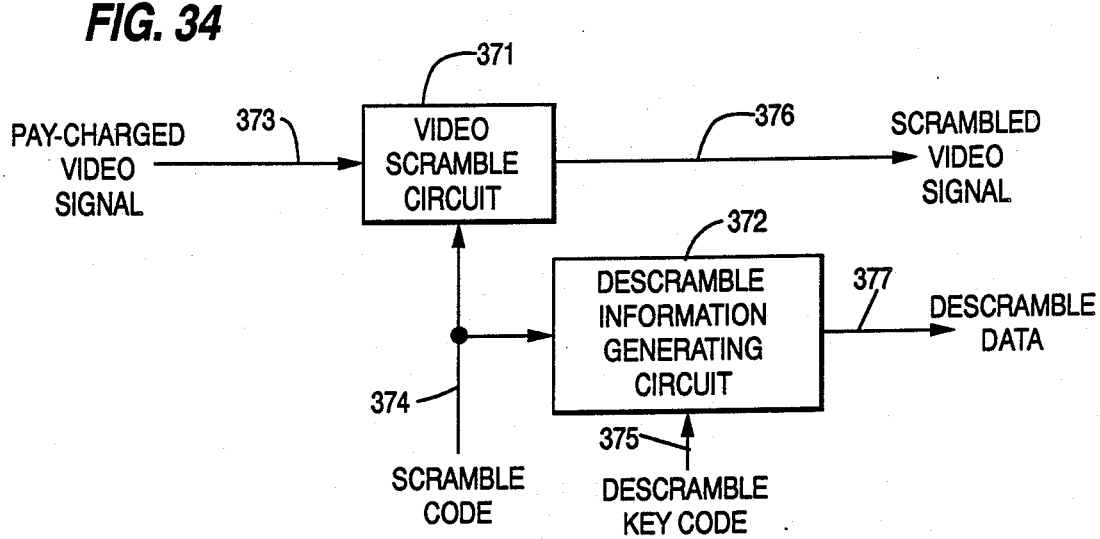
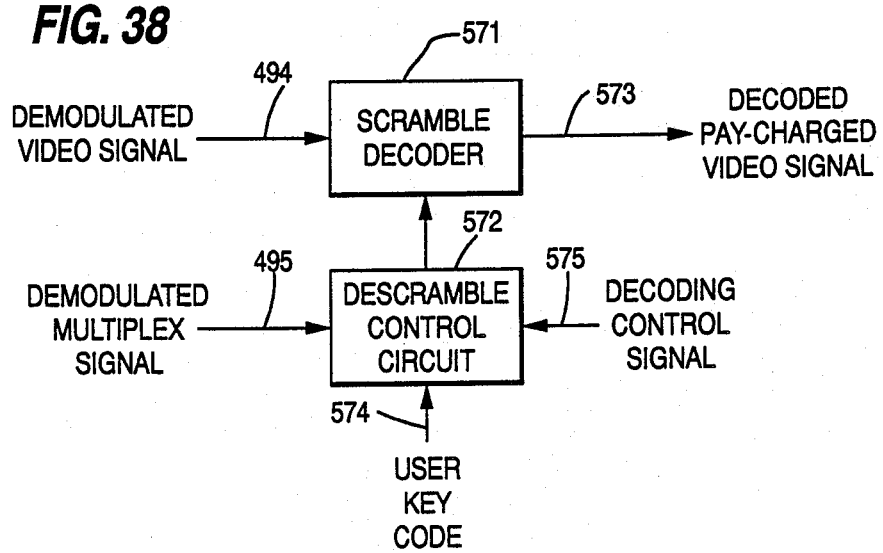
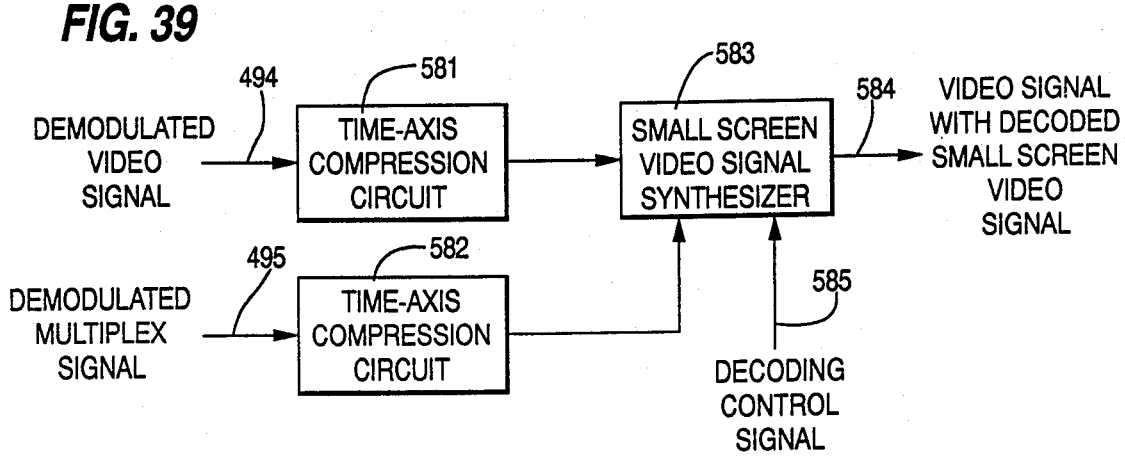

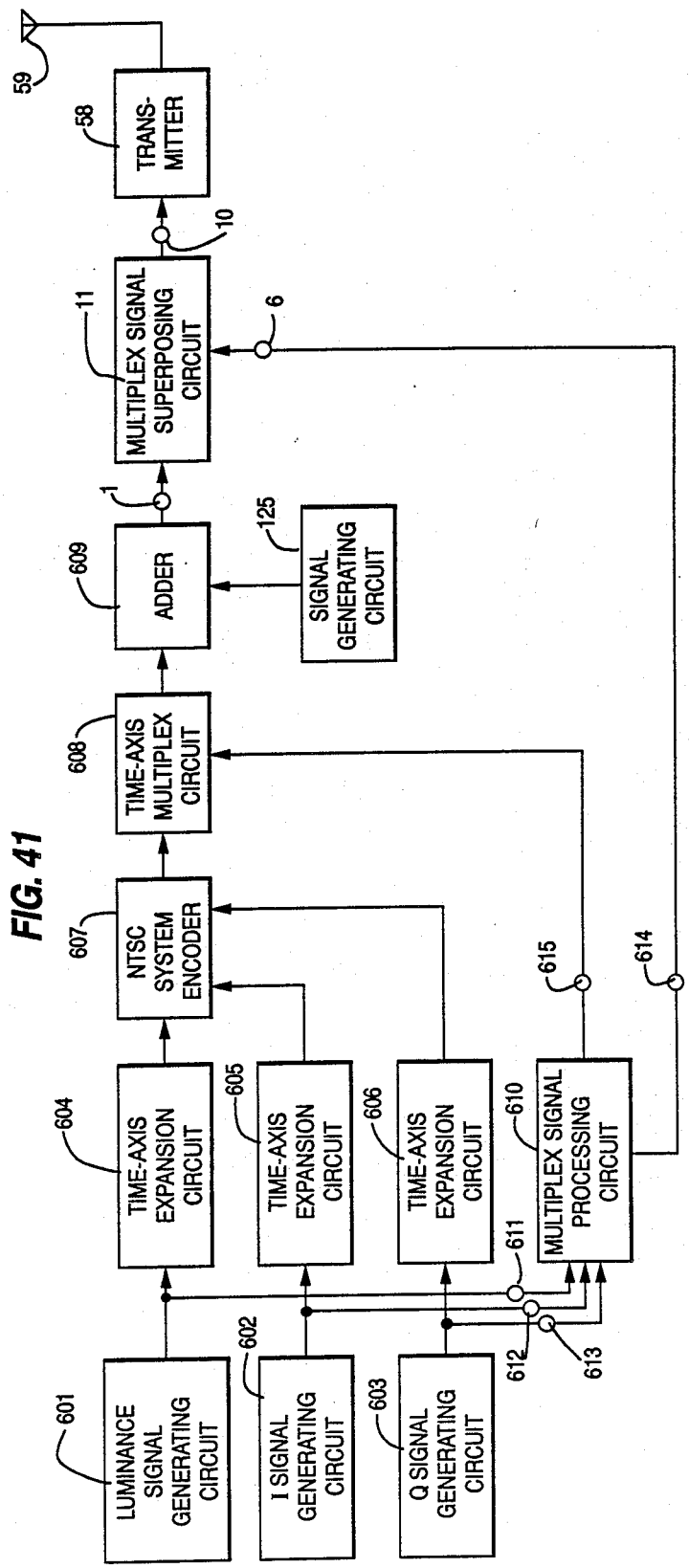

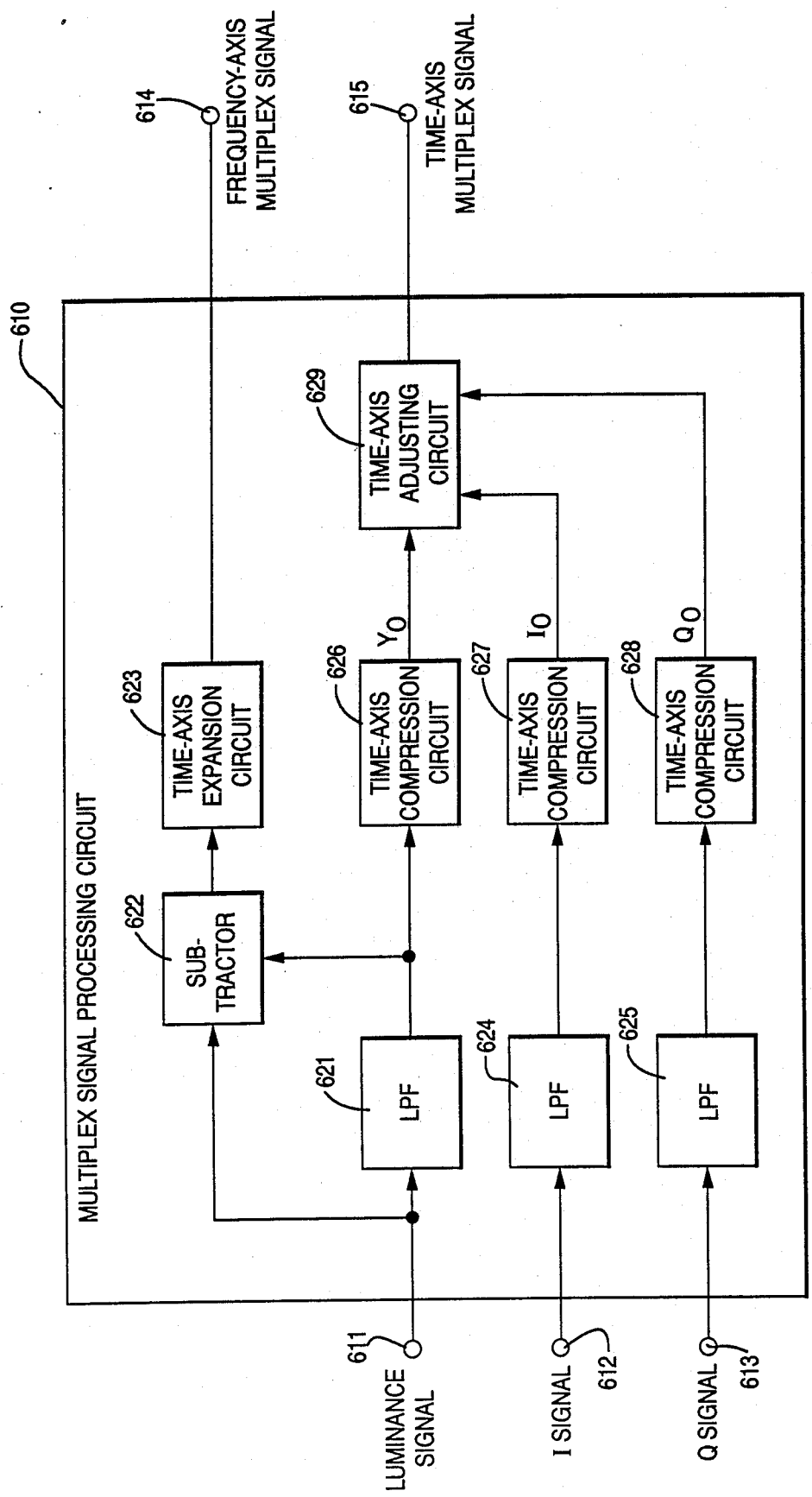

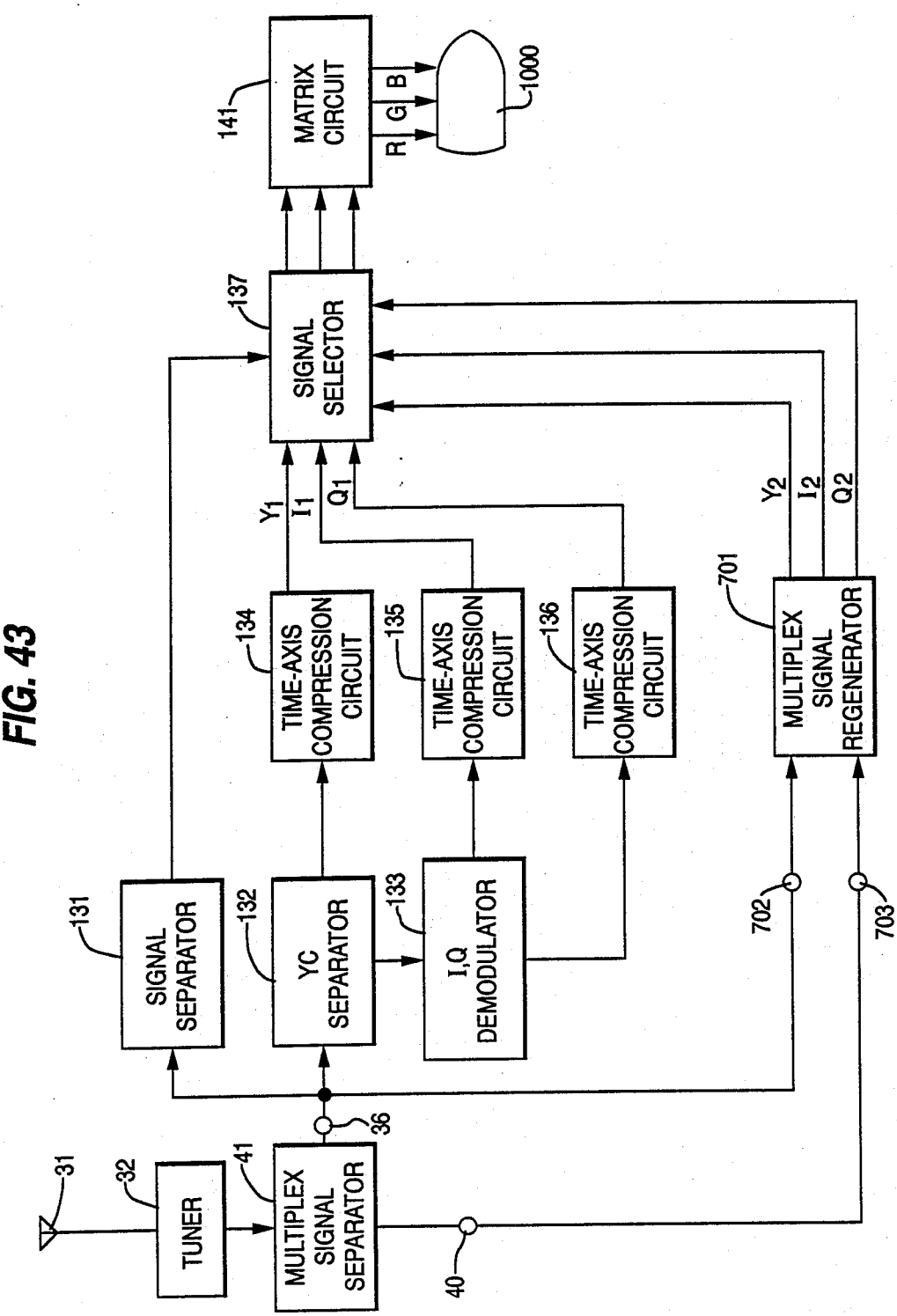

MULTIPLEX SIGNAL PROCESSING APPARATUS

BACKGROUND OF THE INVENTION 1. Field of the Invention

This invention relates to an apparatus for multiplexing a specific signal with an amplitude-modulated signal, transmitting and receiving the multiplexed signal, and extracting the specific signal from the multiplexed signal. 2. Description of the Prior Art In Japan, more than 25 years have passed since the color television broadcasting of the current NTSC (National Television System Committee) system began in 1960. In this period, to answer the requests for a finer definition and higher performance television receiver, various new television systems have been proposed. At the same time, the contents of the programs presented to the viewers have been changed from the mere studio programs or location programs to programs providing images of higher picture quality and higher realistic feeling such as cinema-size movies.

The current broadcasting is specified with 525 scanning lines, 2:1 interlace scanning, a luminance signal horizontal bandwidth of 4.2 MHz, and an aspect ratio of 4:3 (see, for example, Broadcasting Technology Series, Color Television, ed. by Japan Broadcasting Corporation, Japan Broadcasting Corporation Pub., 1961). In this background, several television signal composition methods aiming at compatibility with the current broadcasting system and enhancement of horizontal resolution have been proposed. One of such examples is disclosed in the Japanese Laid-Open Patent No. 59-171387. Considering the NTSC television signal expressed on a two-dimensional plane of temporal frequency $f_1$ 1 and vertical frequency $f_2$, chrominance signals C are present in the second and fourth quadrants due to the phase relationship with the chrominance subcarrier fsc. The example uses the vacant first and third quadrants for multiplexing the high frequency components of the luminance signal. The chrominance signal and the multiplexed high frequency components are separated and reproduced at the receiving end, thereby enhancing the horizontal resolution.

In the current television broadcast, as is clear from the description above, the band of signals is limited by the standard, and it is not easy to add some new information in quantity. For example, methods to enhance the horizontal resolution are proposed, but many problems are left unsolved from the viewpoint of the compatibility with the current television broadcasting and the deterioration of demodulation characteristics of high frequency components in a moving picture. Besides, from the standpoint of effective use of the radio wave resources, the transmission band cannot be extended as an easy solution.

SUMMARY OF THE INVENTION

It is a primary object of this invention to present a multiplex signal processing apparatus for multiplex transmission of a large quantity of information in a defined band.

According to this invention, a multiplex signal processor at a transmitter side amplitude-modulates a main carrier by a main signal to obtain a vestigial sideband (VSB), modulated main signal; amplitude-modulates a carrier which has the same frequency as but is shifted in phase by 90° from the main carrier by a specific multiplex signal to obtain a double sideband, modulated multiplex signal; passes the double sideband, modulated multiplex signal through a Nyquist filter to obtain a vestigial sideband (VSB), modulated multiplex signal; and superposes the VSB, modulated multiplex signal on the VSB, modulated main signal to obtain a multiplexed signal, which is transmitted.

A multiplex signal processor at a receiver side has a synchronous detector and a quadrature distortion eliminating filter for demodulating the main and multiplex signals from the received multiplexed signal.

By this constitution, in, for example, television broadcasting, it is possible to obtain not only the conventional television broadcasting images but also multiplex information at the receiver, by generating a television signal capable of multiplex transmission of other information within the standard band of the existing television broadcasting. At the same time, when received the multiplexed signal by an existing television receiver, there is almost no interference by the multiplex signal, and the compatibility with the existing television receivers can be maintained. Further, since multiplex transmission of other information is possible in a band determined by the standard, it is very advantageous also from the viewpoint of effective use of radio wave resources.

BRIEF DESCRIPTION OF THE DRAWINGS

FIG. 2, FIG. 5(a), FIG. 6(a), FIG. 9(a), FIGS. 12(a), FIG. 18, FIG. 24, and FIG. 30 are block diagrams each showing a multiplex signal processor at the transmission side embodying this invention;

FIG. 4(a), FIGS. 8(a)–(n), and FIGS. 11(a)–(u) are special diagrams showing the processing method of the multiplex signal processor at the reception side according to this invention;

FIG. 13(a) is an internal circuit composition of a signal generator 125 in FIG. 12(a);

FIG. 14 is a internal circuit composition of the signal separator 131 shown in FIG. 12(b);

FIG. 15 is an internal circuit composition of the signal selector 137 shown in FIG. 12(b);

FIG. 34 is a circuit composition of an example of the scramble processor of FIG. 30;

FIG. 38 is a circuit composition of an example of the scramble demodulator of FIG. 35;

FIG. 39 is a circuit composition of an example of the small screen video addition circuit of FIG. 35.

FIG. 41 is a block diagram showing a television multiplex signal processor at the transmission side according to this invention;

FIG. 42 is a circuit composition of an example of the multiplex signal processing circuit 610 shown in FIG. 41;

FIG. 43 is a block diagram showing a television multiplex signal processor at the reception side according to this invention.

DETAILED DESCRIPTION OF THE PREFERRED EMBODIMENTS

Figure 1A:
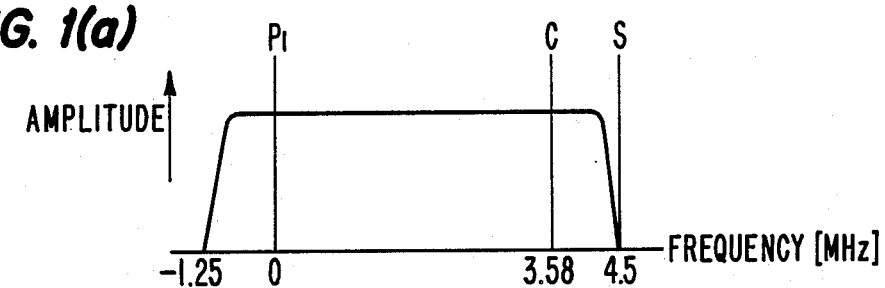
FIGS. 1(a)–(c), FIGS. 7(a)–(n), FIGS. 10(a)–(j), and FIGS. 23(a)–(f) are spectral diagrams showing the processing method of the multiplex signal processor at the transmission side according to this invention.
Figure 1B:
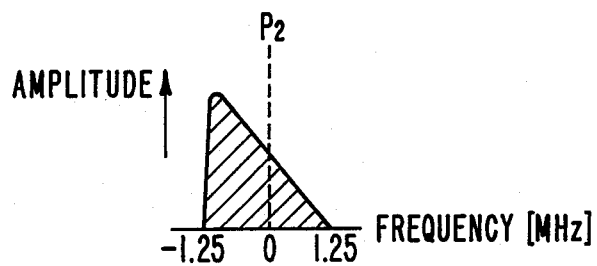
Figure 1C:
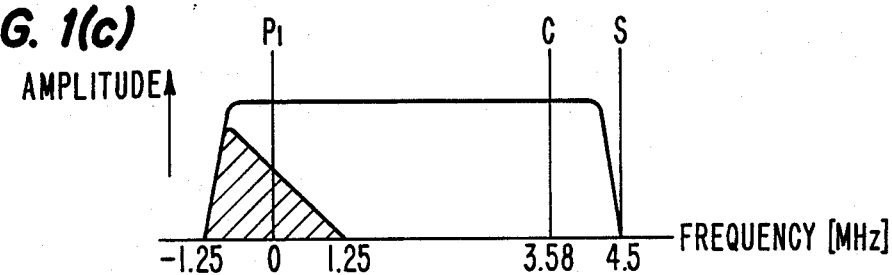

FIGS. 1(a)–(c) are spectral diagrams used to show the television signal processing method at the transmission side according to an embodiment of this invention. More specifically, FIG. 1(a) is a spectral diagram of a vestigial sideband, amplitude-modulated television signal in the NTSC television system, in which the lower sideband of video carrier $P_1$ is the vestigial sideband. In this case, the signal may be any television signal amplitude-modulated in the vestigial sideband, and it is not limited to the NTSC television signal. FIG. 1(b) is a signal which is obtained by amplitude-modulating a vestigial sideband of a carrier $P_2$ which has the same frequency but is different in phase by 90° from the video carrier $P_1$ by a multiplex signal different from the television signal shown in FIG. 1(a). Preferably the carrier $P_2$ is removed in the blanking period. When the signal shown in FIG. 1(b) is multiplexed with the television signal shown in FIG. 1(a), the result is as shown in FIG. 1(c). The multiplex signal may be either an analog signal or a digital signal.

FIG. 2 is a block diagram showing a television multiplex signal processor at the transmission side as one of the embodiments of this invention, in which element 601 is a main signal generator; element 1 is a main signal input terminal; element 2 is an amplitude modulator; element 3 is a VSB filter; element 4 is an oscillator; element 5 is a phase shifter; element 602 is a multiplex signal generator; element 6 is a multiplex signal input terminal; element 7 is an amplitude modulator; element 8 is an inverse Nyquist filter; element 9 is an adder; element 10 is a composite signal output terminal; element 58 is a transmitter, and element 59 is an antenna. Numeral 11 denotes a multiplex signal superposing circuit. By a main signal generated by the original signal generator 601, for example, a video baseband signal, a carrier $P_1$ generated by the oscillator 4 is amplitude-modulated by the amplitude modulator 2. The modulated signal is band limited by the VSB filter 3 to become a vestigial sideband signal, which is fed to the adder 9. The VSB filter 3 is a filter to transform a double sideband signal into a vestigial sideband signal. The carrier $P_1$ from the oscillator 4 is shifted in phase by 90° by the phase shifter 5 to form carrier $P_2$. By a multiplex signal generated in the multiplex signal generator 602, the carrier $P_2$ is amplitude-modulated to have a double sideband by the amplitude modulator 7, and preferably in the blanking period the carrier is removed. The phase shift direction of the phase shifter 5 may be either fixed or varied at intervals of the horizontal scanning period, field or frame. The modulated multiplex signal is band limited by the inverse Nyquist filter 8, and then fed to the adder 9.

The amplitude frequency characteristic of the inverse Nyquist filter 8 is, as mentioned later, to possess a property symmetrical to the amplitude frequency characteristic immediately before video detection by the receiver with respect to the video carrier. The output of the adder 9 is a composite signal. That is, the modulated multiplex signal is superposed on the modulated video baseband signal by the adder 9 to produce the composite signal. The composite signal is transmitted from the transmitter 58 with the antenna 59, but the transmission path is not limited to a wireless system. In this example, the composite signal is obtained by adding the outputs of the VSB filter 3 and the inverse Nyquist filter 8, but is is also possible to feed the sum of the outputs of the amplitude modulator 2 and the inverse Nyquist filter 8 into the VSB filter 3 to obtain the composite signal.

Figure 3B:
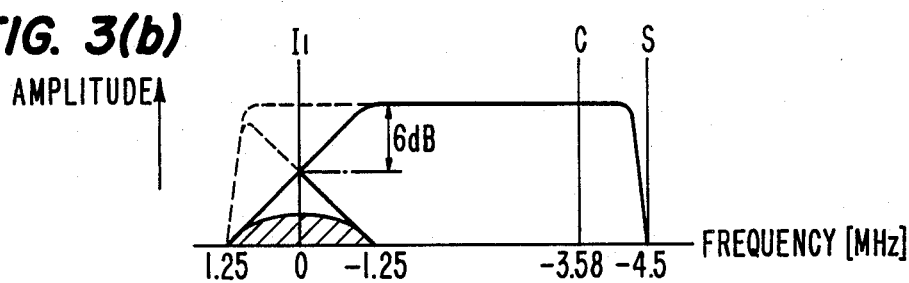
FIGS. 3(a), (b), and (c) are respectively a block diagram, spectral diagram and vector diagram showing a conventional television receiver.

On the other hand, a television multiplex signal processor at the reception side as one of the embodiments of this invention is as follows. The following example refers to terrestrial broadcasting of an NTSC television system, but it is not intended as a limitation thereof. FIG. 3(a) is a block diagram of an existing television receiver for video synchronous detection, in which element 21 is an antenna; element 22 is a tuner; element 23 is a Nyquist filter; element 24 is a video detector; element 25 is a carrier regenerator, and element 26 is a main signal output terminal. The signal transmitted from the transmission side is received by the antenna 21, converted in frequency to an intermediate frequency band by the tuner 22, and band limited by the Nyquist filter 23. The band-limited signal is fed into the video detector 24 and the carrier regenerator 25. In the carrier regenerator 25, a video carrier $I_1$ for synchronous detection is regenerated. The band-limited signal is synchronously detected by the carrier $I_1$ by the video detector 24, and becomes the main signal, that is, the video baseband signal. The frequency characteristic of the Nyquist filter 23 is as follows. Referring to FIG. 3(b) which shows the frequency characteristic of the Nyquist filter 23, the amplitude is attenuated by 6 dB at the video carrier $I_1$, and the Nyquist filter characteristic possesses nearly an odd-symmetrical amplitude property with respect to the video carrier $I_1$.

Figure 3C:
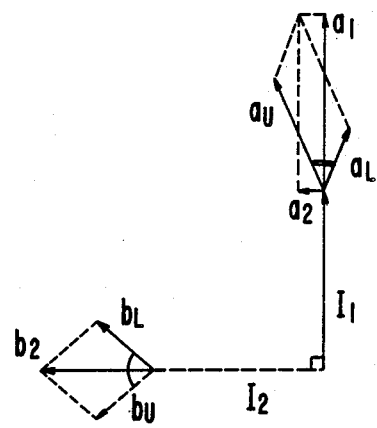

On the other hand, as shown in FIG. 1(b), when the multiplex signal is band limited by the filter in the transmitter having an inverse characteristic to the frequency characteristic of the Nyquist filter in the receiver, the multiplex signal components in the shaded area of FIG. 3(b) is nearly a double sideband. When this is expressed by a vector diagram, it becomes as shown in FIG. 3(c), in which $I_1$ is the video carrier of the main signal, that is, the video baseband signal, and $I_2$ is the carrier of the multiplex signal in which the carrier has the same frequency but is different in phase by 90° from $I_1$. The video baseband signal is a vestigial sideband with respect to the carrier $I_1$, so that the upper and lower sidebands are vector $a_U$ and vector $a_L$, respectively, which are vector $a_1$ and vector $a_2$, respectively, when decomposed into orthogonal vectors. Since the multiplex signal is nearly a double sideband signal, supposing the upper and lower sidebands to be vector $b_U$ and vector $b_L$, respectively, their synthetic vector is $b_2$, which is the only component to intersect with the vector $I_1$ orthogonally. That is, when the main signal is synchronously detected by the carrier $I_1$, quadrature distortion due to the vector $a_2$, and vector $b_2$ components does not occur. Thus, the impairment by the multiplex signal to the existing television receiver performing video synchronous detection does not occur, in principle.

Figure 4A:
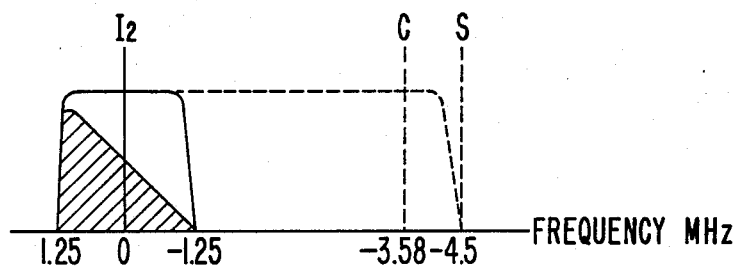
Figure 4B:
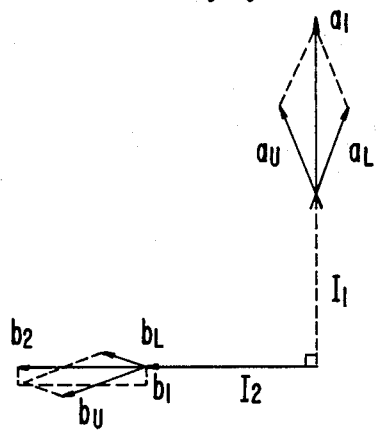
FIG. 4(b) is a vector diagram used to explain the principle of the multiplex signal processor at the reception side according to this invention.

Next, the detection of the multiplex signal at the reception side is described below. The signal of the video intermediate frequency band which is the output of the tuner is band limited by a band-pass filter, as shown in FIG. 4(a), so that the main signal, that is, the video baseband signal becomes a double sideband signal. Its vector expression is shown in FIG. 4(b). Since the multiplex signal is vestigial sideband with respect to the carrier $I_2$, the upper and lower sidebands are vector $b_U$ and vector $b_L$, respectively, which become vector $b_1$ and vector $b_2$, respectively, when decomposed into orthogonal vectors. At the same time, since the video baseband signal is made into nearly a double sideband signal by the function of the band-pass filter, supposing the upper and lower sidebands to be vector $a_U$ and vector $a_L$, respectively, their synthetic vector is $a_1$, which is the only component intersecting orthogonally with the vector $I_2$. That is, when the multiplex signal is synchronously detected by the carrier $I_2$, quadrature distortion due to the vector $a_1$, and vector $b_1$ components does not occur. Thus, only the multiplex signal components can be demodulated.

Figure 4C:
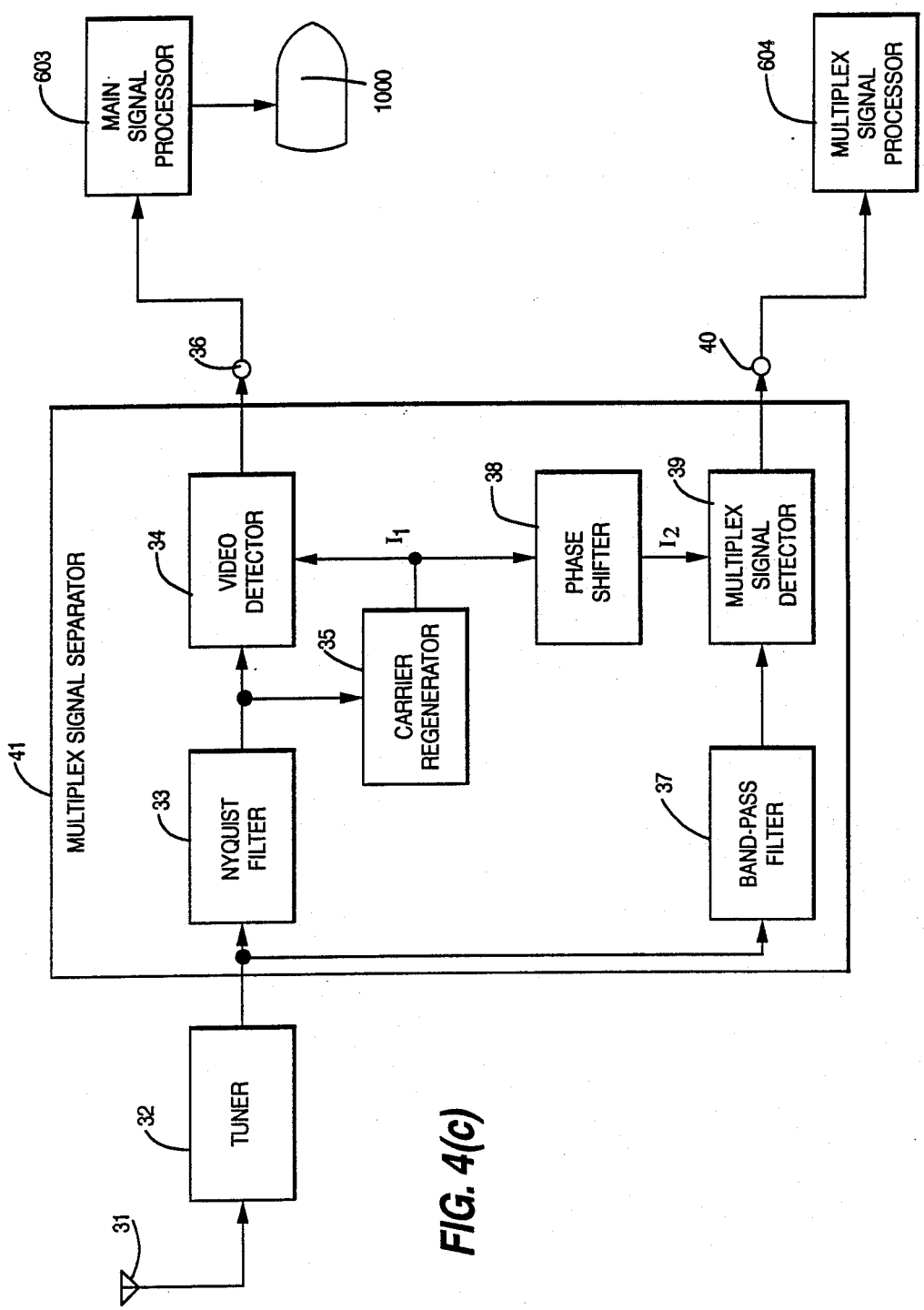
FIG. 4(c), FIG. 5(b), FIG. 6(b), FIG. 9(b), FIG. 12(b), FIG. 25, and FIG. 35 are block diagrams each showing a multiplex signal processor at the reception side embodying this invention.

FIG. 4(c) shows an example of television multiplex signal processor for also demodulating the multiplex signal, in which element 31 is an antenna; element 32 is a tuner; element 33 is a Nyquist filter; element 34 is a video detector; element 35 is a carrier regenerator; element 36 is an original signal output terminal; element 37 is a band-pass filter; element 38 is a phase shifter; element 39 is a multiplex signal detector; element 40 is a multiplex signal output terminal; element 603 is a main signal processor, and element 604 is a multiplex signal processor. Element 41 denotes a multiplex signal separator. The multiplexed signal transmitted from the transmission side is received by the antenna 31, converted in frequency into the intermediate frequency band by the tuner 32, and band limited by the Nyquist filter 33. The band-limited signal is supplied into the video detector 34 and the carrier regenerator 35. In the carrier regenerator 35, a video carrier $I_1$ for synchronous detector is regenerated. The band-limited signal is detected by the carrier $I_1$ in the video detector 34, and becomes the main signal, that is, the video baseband signal. The main signal is converted into, for example, R, G, B signals by the main signal processor 603, and is displayed on a screen 1000.

The output of the tuner 32 is band-limited also as shown in FIG. 4(a) by the band-pass filter 37. By a carrier $I_2$ obtained by 90° phase shifting in the carrier $I_1$ by the phase shifter 38 (that is, by the carrier $I_2$ having the same phase as the carrier for multiplex signal modulation used at the transmission side), the band-limited signal synchronously detected in the multiplex signal detector 39, and becomes the multiplex signal. The multiplex signal is subjected to processing which is opposite to the processing by the multiplex signal generator at the transmission side, in the multiplex signal regenerator 604. The video detector 34 and the multiplex signal detector 39 are detectors for the synchronous detection of an amplitude-modulated signal.

As described above, in the existing receiver, since the multiplex signal is nearly cancelled by the synchronous detection by the video carrier $I_1$, the main signal is not interfered with by the multiplex signal. Further, in the receiver capable of demodulating the multiplex signal not only the main signal, that is, the video baseband signal is obtained in the same way as above, but also the multiplex signal can be also obtained without quadrature distortion by filtering and synchronous detection by the carrier $I_2$. This is not limited to the NTSC television system, and can be applied to any system as long as the signal is amplitude modulated in the vestigial sideband.

FIG. 5(a) is a block diagram showing a television multiplex signal processor at the transmission side for multiplexing the high frequency components of the luminance signal as one of the embodiments of this invention, in which elements 51 are R, G, B input terminals; element 52 is a matrix circuit; element 53 is a chrominance modulator; element 54 is a first filter; element 55 is a second filter; element 57 is a frequency converter; element 56 is an adder; element 11 is a multiplex signal superposing circuit; element 1 is a main signal input terminal; element 6 is a multiplex signal input terminal; element 10 is a composite signal output terminal; element 58 is a transmitter, and element 59 is an antenna. R, G, B signals from a video camera or the like are supplied into the matrix circuit 52 to be converted into luminance signal Y and the chrominance difference signals I and Q. The chrominance difference signals I and Q are modulated in the chrominance modulator 43 to become a carrier chrominance signal, which is fed into the adder 56. The luminance signal Y is fed into the first filter 54 and the second filter 55. The high frequency components of the luminance signal Y which are band limited by the second filter 55 are converted into the low frequency range by the frequency converter 57. The output of the first filter 54 is added to the carrier chrominance signal in the adder 56. The output of the adder 56 is fed through the main signal input terminal 1 into the multiplex signal superposing circuit 11. The output of the frequency converter 57 is fed through the multiplex signal input terminal 6 into the multiplex signal superposing circuit 11. The output of the multiplex signal superposing circuit 11 is a composite television signal having high frequency components of the luminance signal superposed on the video baseband signal which is the main signal. The composite television signal is fed through the composite signal output terminal 10 into the transmitter 58, and is transmitted from the antenna 59. Here, the first filter is a low-pass filter passing, for example, 4.2 MHz or lower, and the second filter is a high-pass filter passing, for example, 4.2 MHz or higher or a band-pass filter passing between, for example 4.2 and 5.2 MHz.

Figure 5B:
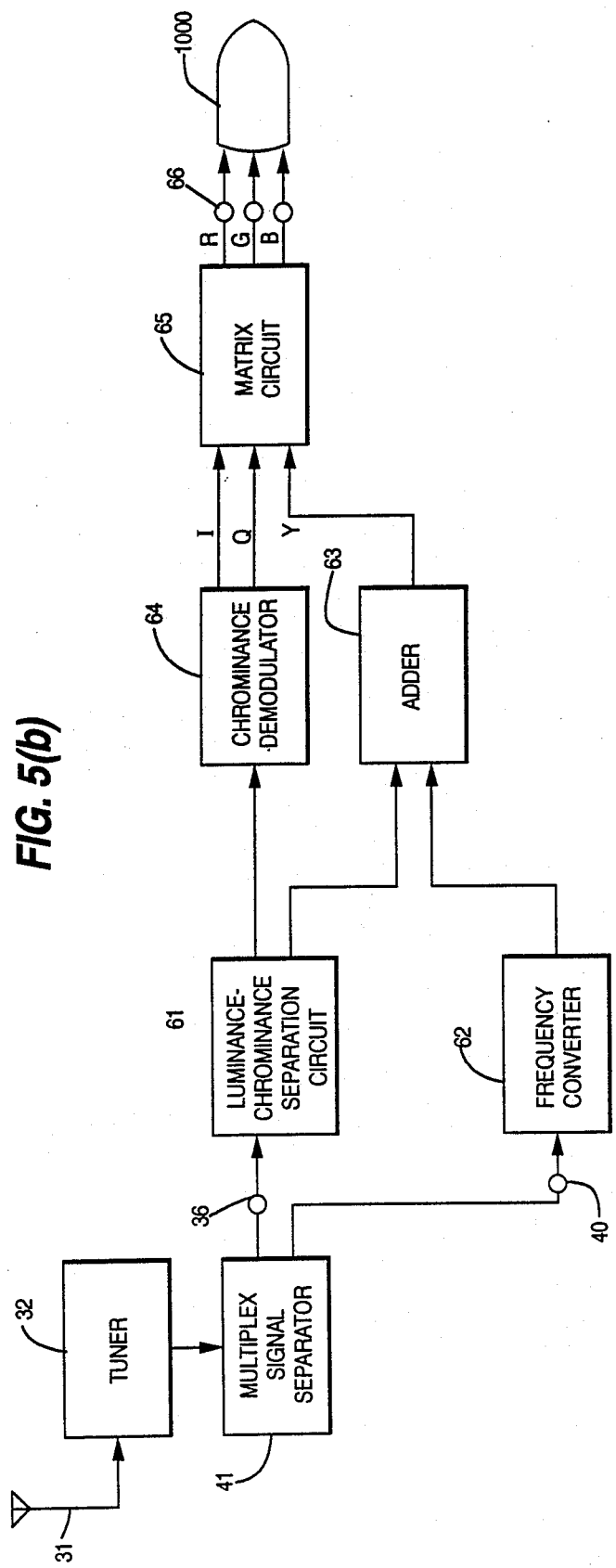

FIG. 5(b) is a block diagram showing a television multiplex signal processor at the reception side for reproducing the high frequency components of the luminance signal as one of the embodiments of this invention, in which element 41 is a multiplex signal separator; element 36 is a main signal output terminal; element 40 is a multiple signal output terminal; element 61 is a luminance-chrominance separation circuit; element 62 is a frequency converter; element 63 is an adder; element 64 is a chrominance demodulator; element 65 is a matrix circuit, and elements 66 are R, G, B output terminals. As stated above, the main signal, that is, the video baseband signal is outputted from the multiplex signal separator 41 through the main signal output terminal 36, and is fed into the luminance-chrominance separation circuit 61. The multiplex signal is outputted from the multiplex separator 41 through the multiplex signal output terminal 40, and is fed into the frequency converter 62. The video baseband signal is separated into the luminance signal and the carrier chrominance signal by the luminance-chrominance separation circuit 61. The separated carrier chrominance signal is demodulated into the chrominance difference signals I and Q in the chrominance demodulator 64, and they are fed into the matrix circuit 65. The demodulated multiplex signal from the separator 41, that is, the high frequency components of the luminance signal, is converted into the original frequency band by the frequency converter 62, and is added to the low frequency component of the luminance signal separated by the luminance-chrominance separation circuit 61 in the adder 63, and the added result is fed into the matrix circuit 65. The outputs of the matrix circuit 65 are R, G, B signals, which are supplied, for example, into a CRT 1000. In this way, the high frequency components of the luminance signal can be transmitted as the multiplex signal and demodulated, so that the horizontal resolution of luminance can be enhanced.

Figure 6A:
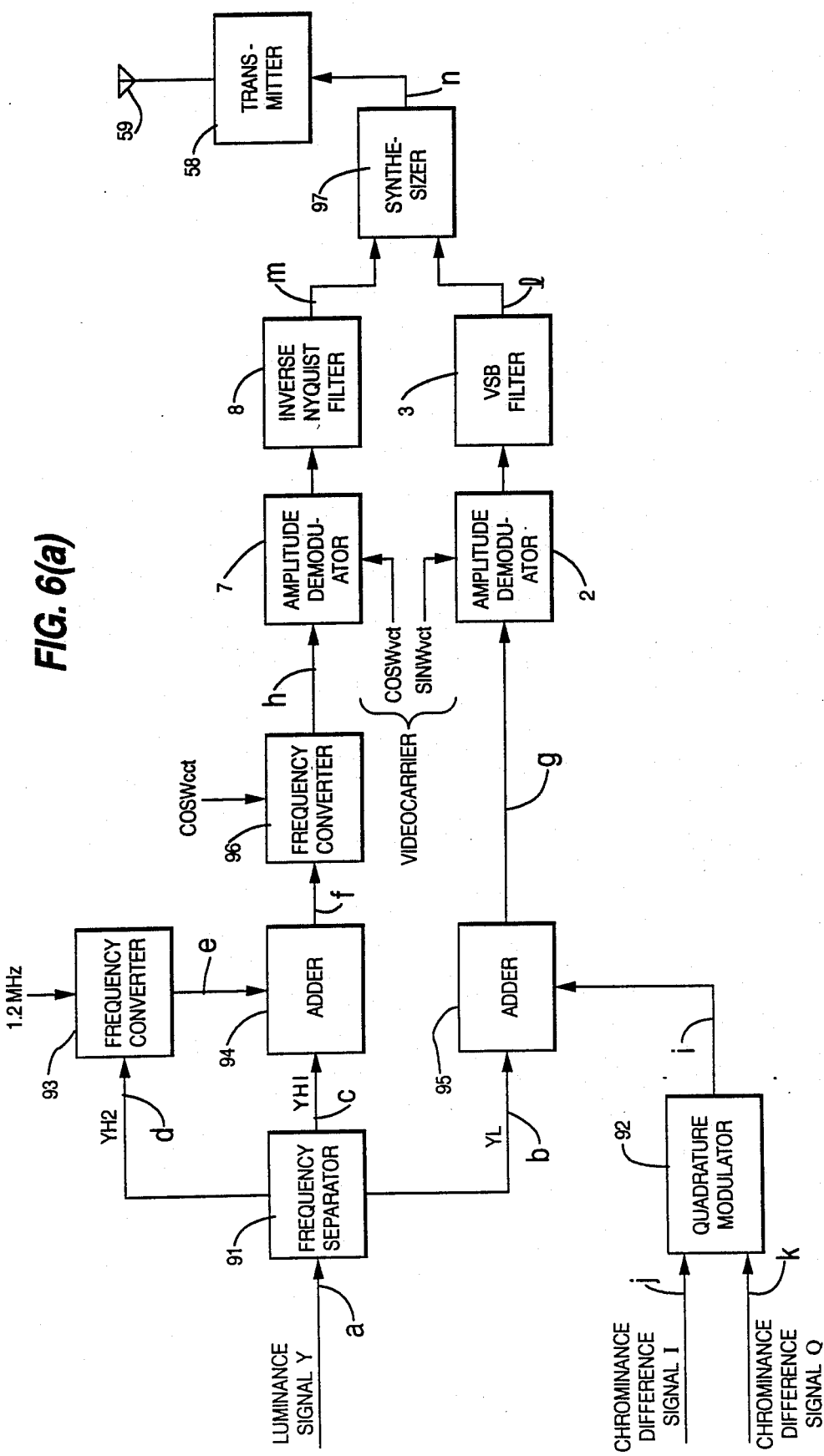
Figure 6B:
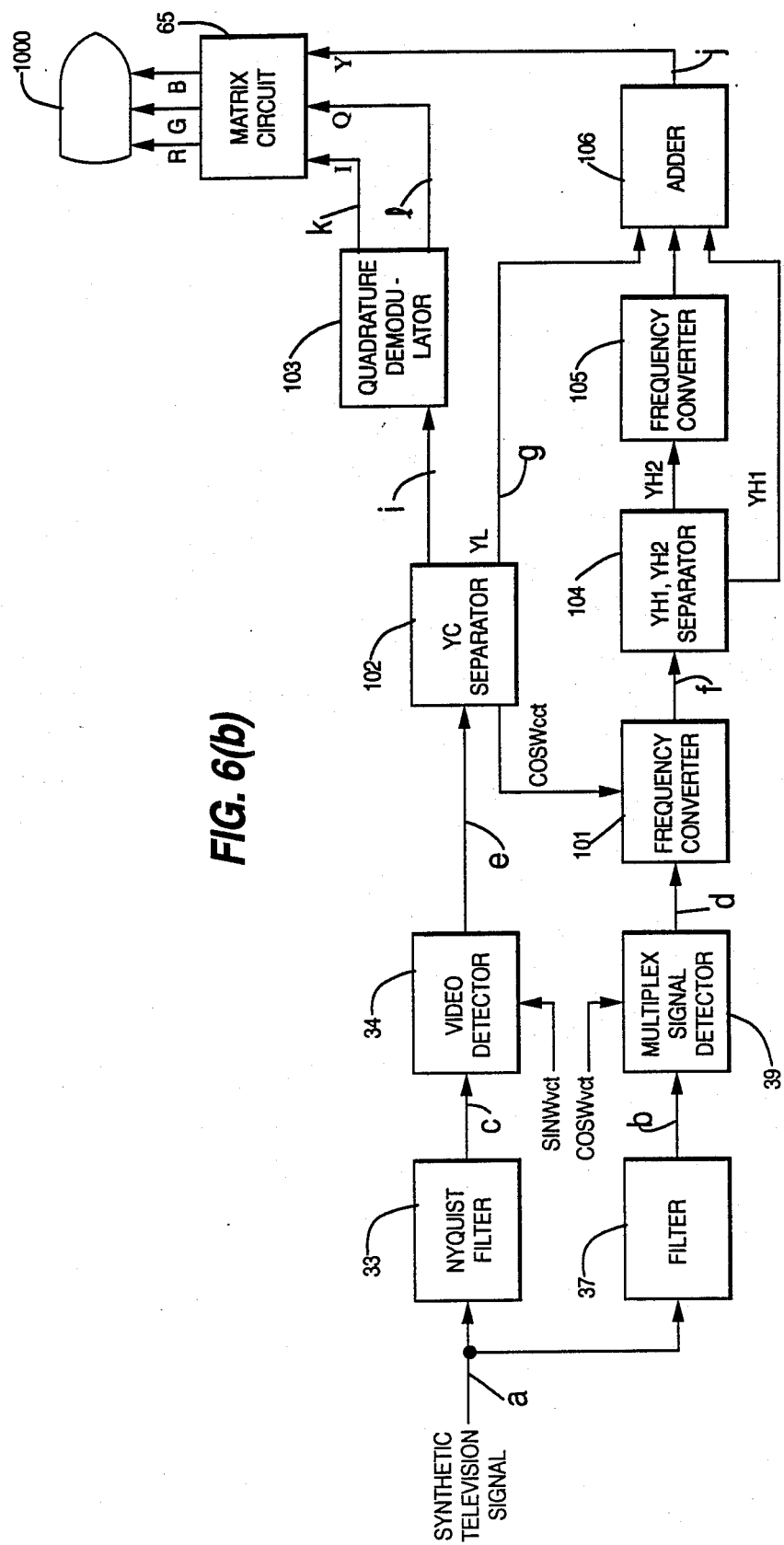
Figure 7:
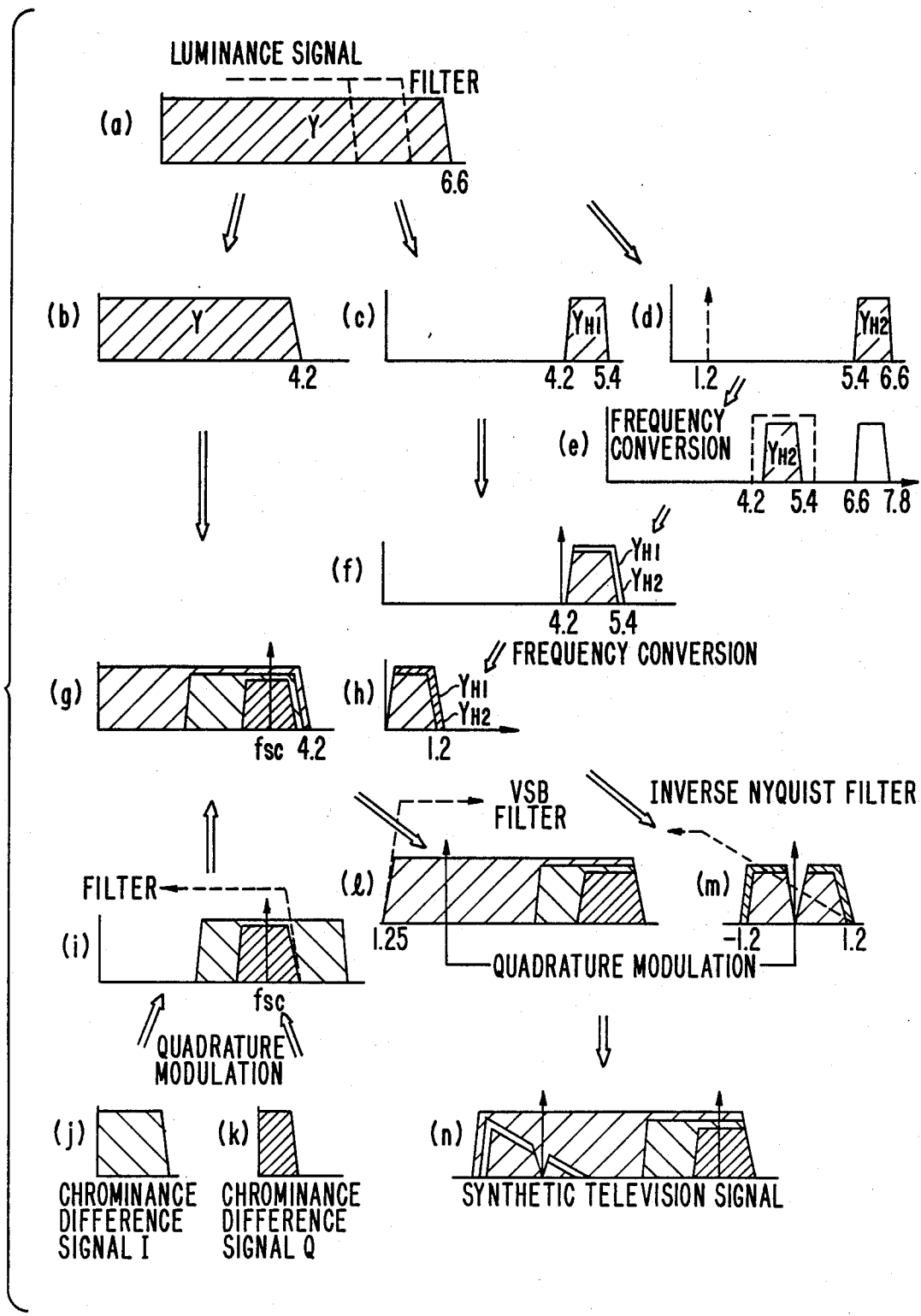

FIG. 6(a) is a block diagram showing a television multiplex signal processor at the transmission side for multiplexing the high frequency components of the luminance signal in another embodiment of this invention. FIGS. 7(a)–(n) are explanatory diagrams showing the signal waveforms at the corresponding parts in FIG. 6(a). FIG. 6(b) is a block diagram showing a television multiplex signal processor at the reception side for reproducing the high frequency components of the luminance signal in another embodiment of this invention. FIGS. 8(a)–(l) are explanatory diagrams showing the signal waveforms at the corresponding parts in FIG. 6(b).

First the signal synthesizing method at the transmission side shown in FIG. 6(a) is explained. A luminance signal of a wide band (for example: 0 to 6.6 MHz) is separated into three frequency bands YL, YH1, YH2 by a frequency separator 91, in which YL is a low frequency luminance signal of 0 to 4.2 MHz, YH1 is a first high frequency luminance signal of 4.2 to 5.4 MHz, and YH2 is a second high frequency luminance signal of 5.4 to 6.6 MHz. On the other hand, chrominance difference signals I and Q are subjected to quadrature modulation by a quadrature modulator 92 to form a carrier chrominance signal in the same manner as in the ordinary NTSC system. The thus obtained carrier chrominance signal is added to the low frequency luminance signal YL in an adder 95. The spectrum of the added result is shown in Fig. 7(g), which is similar to an ordinary NTSC signal. The second luminance signal YH2 (FIG. 7(d)) from 5.4 MHz to 6.6 MHz is multiplied by a signal of 1.2 MHz to be converted into frequency a signal of 4.2 MHz to 5.4 MHz (FIG. 7(e)) by a frequency converter 93. This 1.2 MHz signal may be selected at ⅓ of the subcarrier of the chrominance signal, and its phase information may be transmitted separately. This luminance signal converted into the lower frequency band is added to the first high frequency luminance signal YH1 in an adder 94 (FIG. 7(f)), and the resultant luminance signal is multiplied by a signal cos cc t of about 4.2 MHz in a frequency converter 96 to be converted into a further low frequency band (FIG. 7(h)). The reference phase of the signal cos cc t for frequency conversion is transmitted in multiplexed form, for example, in the vertical blanking period. The composite luminance signal converted into the further low frequency and the composite video signal of 4.2 MHz or less which is compatible with the ordinary NTSC signal are subjected to quadrature modulation by amplitude modulators 7 and 2 using video carriers sin vc t and cos vc t, respectively. At this time, when the multiplex signal of a bandwidth of 1 MHz modulated by the amplitude modulator 7 has its direct-current component suppressed, the carrier suppression modulation is achieved as shown in FIG. 7(m), which is very convenient as stated later. This signal passes through an inverse Nyquist filter 8 having the characteristic as shown in FIG. 7(m). The video signal which is the main signal passes through a VSB filter 3 as shown in FIG. 7(l). The outputs of the filters 8 and 3 are synthesized in a synthesizer 97 to become a signal as shown in FIG. 7(n). This synthetic signal, as compared with the ordinary NTSC video signal amplitude-modulated in the vestigial sideband, has a multiplex signal of about 1 MHz (the luminance signal of 4.2 to 5.2 MHz and luminance signal of 5.2 to 6.2 MHz) superposed in the vestigial sideband. By controlling the synthesizer of FIG. 6(a), it may be also possible to add the multiplex signal only to that portion of the signal other than the synchronous signal of the original television signal. In this case, as mentioned later, in a video synchronous detector of the system to reproduce the video carrier on the basis of the synchronous signal, there is no deterioration of the characteristics due to superposition of the multiplex signal, and an excellent reception performance as in the conventional method can be obtained. Incidentally, the phase of the signal cos cc t for frequency conversion may be controlled so as to be inverted at intervals of at lest the horizontal scanning period, field or frame. This can be said not only for cos cc t, but also to other signals used for frequency conversion.

Referring now to FIG. 6(b) and FIGS. 8(a)–(l), the television multiplex signal processor at the reception side for reproducing the high frequency components of the luminance signal is described below.

The received synthetic modulated signal is as shown in FIG. 8(a), which is same as shown in FIG. 7(n). In an ordinary receiver, it corresponds to the tuner output. The synthetic modulated signal is fed into a Nyquist filter 33 and a filter 37. In FIG. 6(b), the part from this Nyquist filter 33 through a video detector 34 to a YC separator 102 is of the same composition as that of an ordinary NTSC receiver. The Nyquist filter 33 attenuates a signal amplitude by 6 dB at the position of the video carrier $I_1$, and it possesses nearly an odd-symmetrical amplitude characteristic with respect to the video carrier $I_1$. On the other hand, as shown in FIG. 7(m), at the transmission side, since the multiplex signal is band limited by the inverse Nyquist filter having the inverse characteristic to the frequency characteristic of the Nyquist filter 33, the multiplex signal component in the shaded area of FIG. 8(c) becomes nearly a double sideband signal. Therefore, as mentioned above, by synchronous detection, the multiplex signal does not interfere with the main signal.

The multiplex signal demodulation at the reception side is described below. The signal of the video intermediate frequency band, which is the tuner output, is band limited by the filter 37 (see FIG. 8(b)). The main video signal is subjected to quadrature synchronous detection by a multiplex signal detector 39, by the respective reproduced video carriers sin vc t, cos vc t. The detected main video signal is separated into the luminance signal and carrier chrominance signal by a YC separator 102. The carrier chrominance signal is demodulated into chrominance difference signals I and Q by a quadrature demodulator 103, which is exactly the same as in the ordinary NTSC receiver. The luminance signal is fed to an adder 106. On the other hand, the detected multiplex signal is converted in frequency as shown in FIG. 8(f) by a frequency converter 101. Here, the reference phase of signal cos cc t necessary for conversion is separately transmitted and is multiplexed in, for example, the vertical blanking period, and in this case it is supplied from the YC separator 102. The frequency-converted multiplex signal is separated into the first high frequency luminance signal YH1 and the second high frequency luminance signal YH2 by a YH1, YH2 separator 104, and the former is fed to the adder 106, while the latter is further converted into a higher frequency band by a frequency converter 105 and fed to the adder 106. The adder 106 adds the luminance signals from the YC separator 102, the YH1, YH2 separator 104 and the frequency converter 105 to obtain a luminance signal Y of a wide range (FIG. 8(j)). In this way, the luminance signal Y of a wide range (FIG. 8(j)), and chrominance difference signals I and Q are reproduced.

In most of the existing receivers, the video demodulation is of synchronous detection method, but the reproduction of the video carrier is not perfect. That is, the phases are compared where the video carrier of the synchronous signal portion is large, but the phases may deviate due to distortion of the transmission path or the like. It is preferable not to superpose the multiplex signal on the synchronous signal portion. In certain receivers, meanwhile, the detection method of the carrier reproduction type is employed, but in this case the axis of detection may be slightly deviated by the multiplex signal. In this sense, when the high frequency component of the luminance signal is superposed as in this invention, the quadrature distortion is relatively less obvious. Thus, in the existing receivers, since the multiplex signal is nearly completely cancelled by the synchronous detection by the video carrier, interference due to the multiplex signal hardly occurs. In the receiver for multiplex signal demodulation, not only the main video signal is obtained in the same way as above but also the multiplex high definition luminance signal can be obtained without quadrature distortion by filtering and synchronous detection. In this method of the invention, furthermore, since the multiplex signal is subjected to quadrature modulation against the video carrier of the main video signal, transmission is similarly possible for motion pictures as well as still pictures.

Figure 9A:
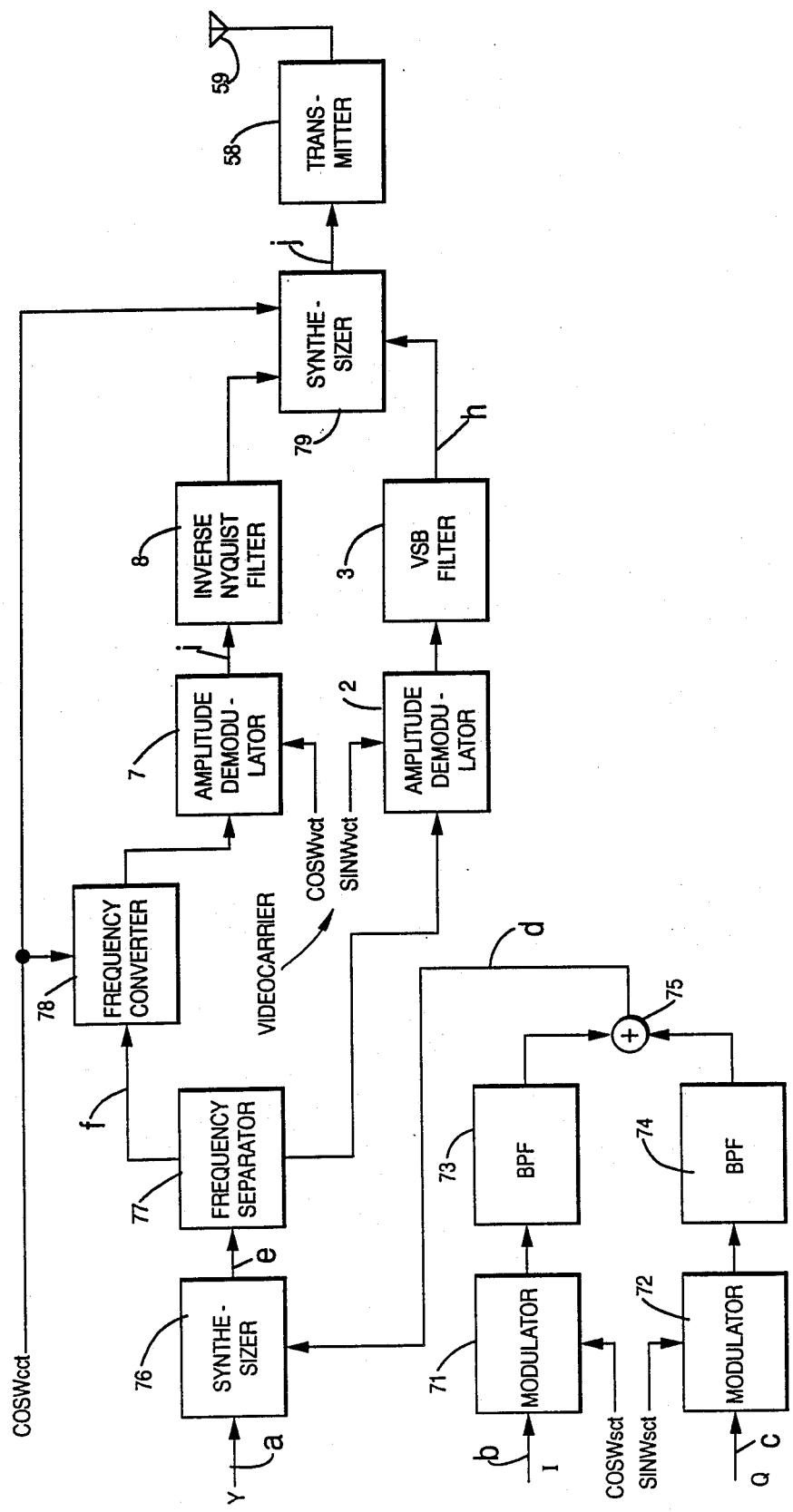
Figure 9B:
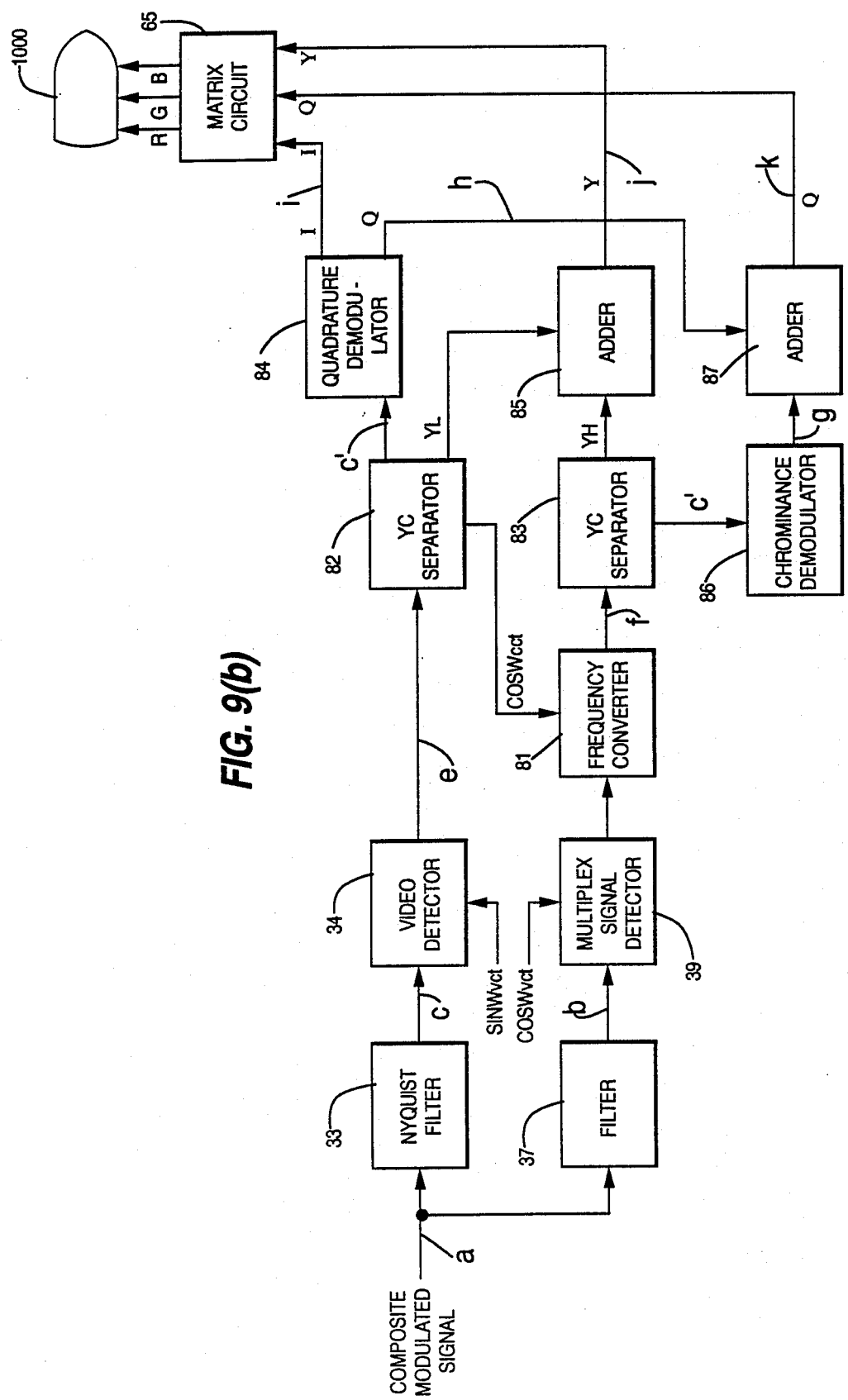

FIG. 9(a) is a block diagram showing a television multiplex signal processor at the transmission side for multiplexing the high frequency components of the luminance signal and chrominance signal in one of the embodiments of this invention. FIGS. 10(a)-(j) are explanatory diagrams showing the signal waveforms of corresponding parts in FIG. 9(a). FIG. 9(b) is a block diagram showing a television multiplex signal processor at the reception side for reproducing the high frequency components of luminance signal and of chrominance signal as one of the embodiments of this invention. FIGS. 11(a)-(k) are explanatory diagrams showing the signal waveforms of corresponding parts in FIG. 9(b).

Figure 10:
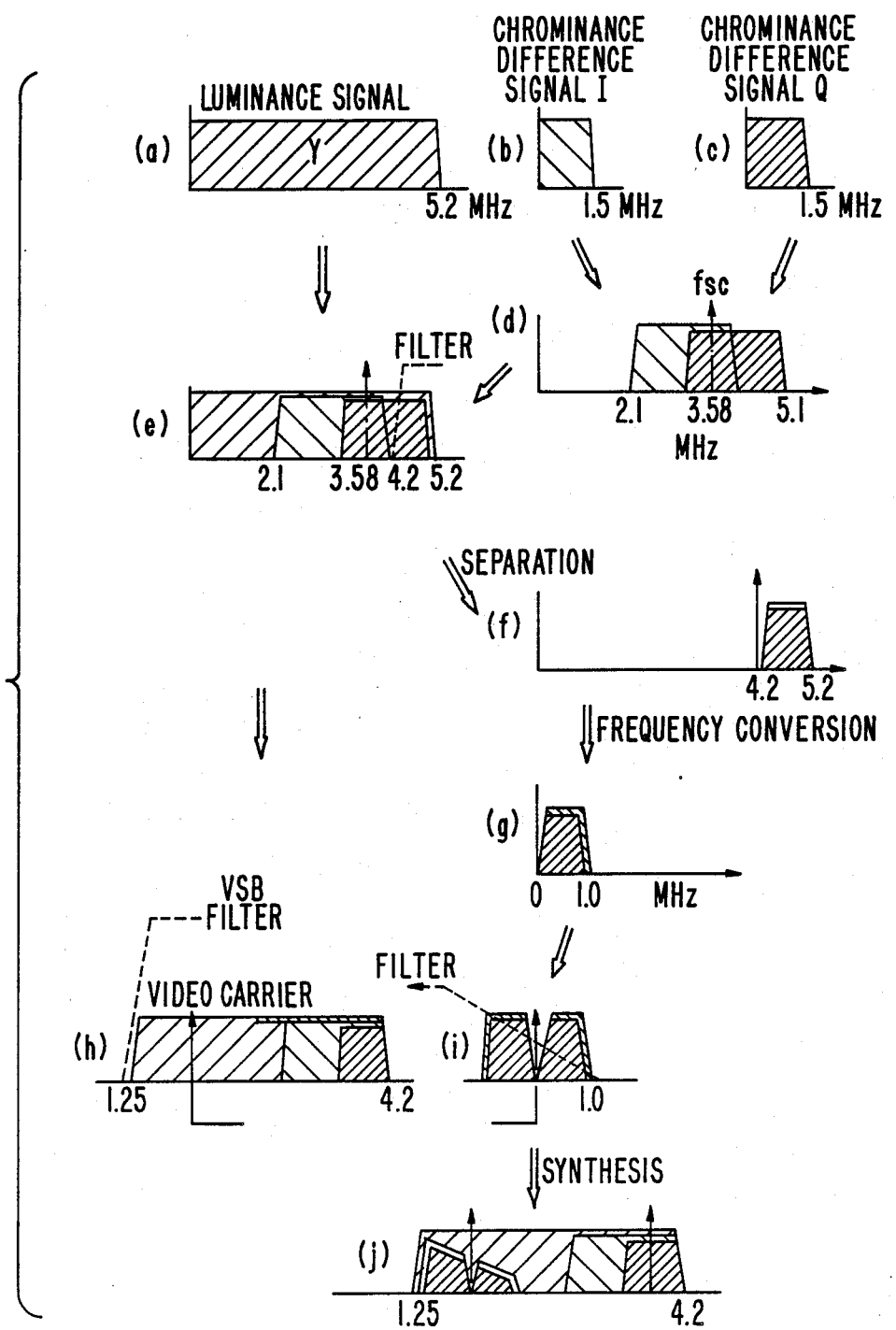

First the signal synthesizing method at the transmission side shown in FIG. 9(a) is described. A luminance signal of a high frequency range (0 to 5.2 MHz) is added to a carrier chrominance signal in a synthesizer 76. Here, the chrominance difference signals I, Q are of a high frequency range of 1.5 MHz, and are respectively fed into modulators 71 and 72. The modulators 71 and 72 perform quadrature modulation by carriers sin sct and cos sct differing in phase from each other by 90 degrees. The outputs of the modulators 71 and 72 pass through band-pass filters 73 and 74 having different characteristics from each other, and are added in an adder 75. The added signal, i.e.—the carrier chrominance signal, is as shown in FIG. 10(d), that is, signal I has components in a range of 2.1 to 4.1 MHz and signal Q, 3.1 to 5.1 MHz. The thus prepared carrier chrominance signal is combined with the luminance signal in the synthesizer 76. Its signal spectrum is shown in FIG. 10(e).

Next, the synthesized signal is separated by a frequency separator 77 into the components of 4.2 MHz and lower and the components over 4.2 MHz. The components up to 4.2 MHz are similar to the ordinary NTSC signal. The components over 4.2 MHz (FIG. 10(f)) are multiplied by a signal cos cct of 4.2 MHz to be converted in frequency into a signal of 0 to 1.0 MHz (FIG. 10(g)) by a frequency converter 78. This signal cos cct for frequency conversion is separately transmitted and is multiplexed, for example, in the vertical blanking period. The signal converted into the low frequency range is subjected to quadrature modulation by an amplitude modulator 7 using a video carrier sin vct, while the components under 4.2 MHz which are compatible with the ordinary NTSC signal are quadrature-modulated by an amplitude modulator 2 using a video carrier cos vct. In this case, when the direct-current component is preliminary suppressed, the multiplex signal of 1 MHz bandwidth modulated by the amplitude modulator 7 becomes the carrier suppressed modulated signal shown in FIG. 10(i), which is very convenient as stated later. This signal passes through an inverse Nyquist filter 8 having the characteristic shown in FIG.

10(i). The main video signal modulated by the modulator 2 passes through a VSB filter 3 as shown in FIG. 10(h). The outputs of the filters 8 and 3 are synthesized by a synthesizer 79 to become a composite modulated signal as shown in Fig. 10(j). This composite modulated signal, in comparison with the amplitude modulation in the vestigial sideband of an ordinary NTSC video signal, is in such a form that the multiplex signal of about 1 MHz (luminance signal of 4.2 to 5.2 MHz and Q signal of 0.5 to 1.5 MHz) is superposed in the vestigial sideband.

By controlling the synthesizer 79, it may be possible to add the multiplex signal only for the portion of the signal other than the synchronous signal of the original television signal. In this case, as mentioned above, in the video synchronous detector of the method to reproduce the video carrier on the basis of the synchronous signal, there is no deterioration of the characteristics due to the superposition of the multiplex signal, so that an excellent reception performance as in the conventional method can be obtained. Besides, depending on the frequency range of the luminance signal fed into the synthesizer 76, it is also possible to transmit only the high frequency component of the chrominance signal as the multiplex signal.

The television multiplex signal processor at the reception side for reproducing the high frequency components of luminance signal and of chrominance signal is explained by referring to FIG. 9(b) and FIGS. 11(a)-(k).

Figure 11:
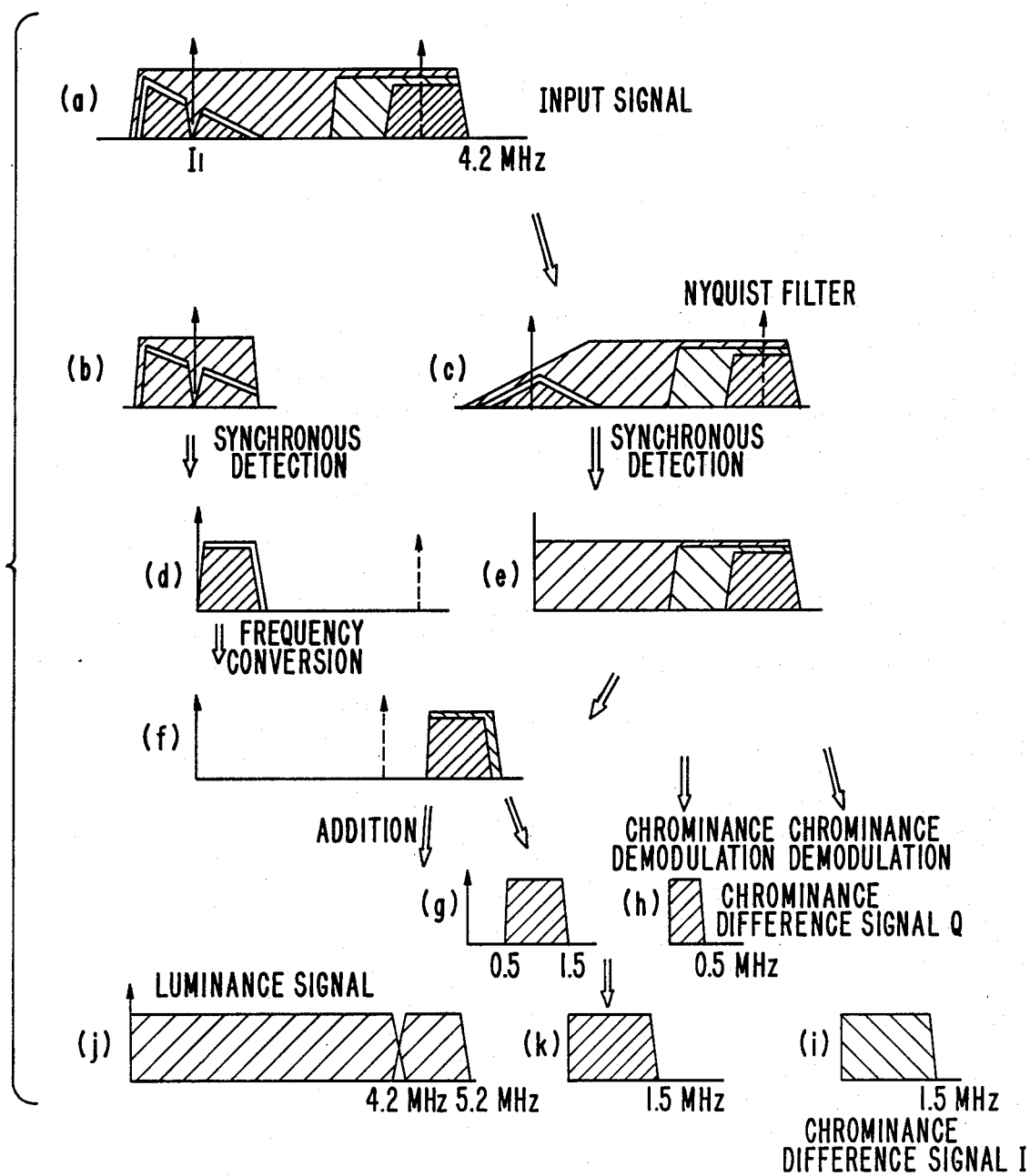

The received composite modulated signal is as shown in FIG. 11(a), which is same as that shown in FIG. 10(j). In an ordinary receiver, it corresponds to the tuner output. In FIG. 9(b), the composite modulated signal is fed into a Nyquist filter 33 and a filter 37. The part from this Nyquist filter 33 through a video detector 34 to a YC separator 82 is the same as that of an ordinary NTSC receiver. The Nyquist filter 33 has the same characteristic as mentioned above. On the other hand, as shown in FIG. 10(i), at the transmission side, since the multiplex signal is band limited by the inverse Nyquist filter having an inverse characteristic with respect to the frequency characteristic of the Nyquist filter 33, the multiplex signal component in the shaded area of FIG. 11(c) becomes nearly a double sideband signal, so that the interference by the multiplex signal with the existing television receiver for video synchronous detection does not occur, in principle.

The multiplex signal demodulation method at the reception side is explained below. The composite modulated signal of video intermediate frequency band which is the tuner output is band limited by the filter 37 (FIG. 11(b)). In FIG. 9(b), the video signal, which is the main signal, is subjected to quadrature synchronous detection by the video detector 34 using a video carrier sin vct, and the multiplex signal is subjected to quadrature synchronous detection by a multiplex signal detector 39 using a video carrier cosvct. The detected main video signal is separated into the luminance signal and carrier chrominance signal by a YC separator 82. The carrier chrominance signal is further demodulated into chrominance difference signals I and Q by a quadrature demodulator 84, which is exactly the same as in the ordinary NTSC receiver. On the other hand, the detected multiplex signal is converted in frequency by a frequency converter 81 as shown in FIG. 11(f). Here, the signal cos cct necessary for conversion is transmitted separately and is multiplexed in, for example, the vertical blanking interval, and it is supplied from the YC separator 82 in this case. The frequency-converted multiplex signal is separated into the high-frequency luminance signal and high-frequency chrominance signal C by a YC separator 83, and the former is added to the luminance signal from the YC separator 82 by an adder 85, while the latter is demodulated into the high-frequency chrominance difference signal by a chrominance demodulator 86 (FIG. 11(g)). This demodulated chrominance difference signal is added to the chrominance difference signal Q of a narrow band by an adder 87 (FIG. 11(k)). Thus, the wide-band luminance signal Y (FIG. 11(j)) and the 1.5 MHz band chrominance difference signals I and Q are regenerated.

Figure 16A:
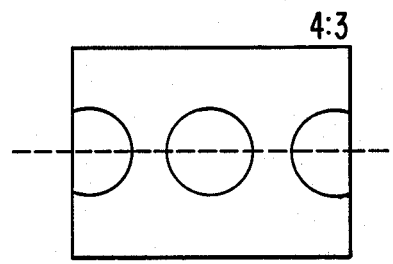
FIG. 16(a) is an example of a display screen of an existing television and FIG. 16(b) is a time-axis expression of a composite video signal.
Figure 16B:
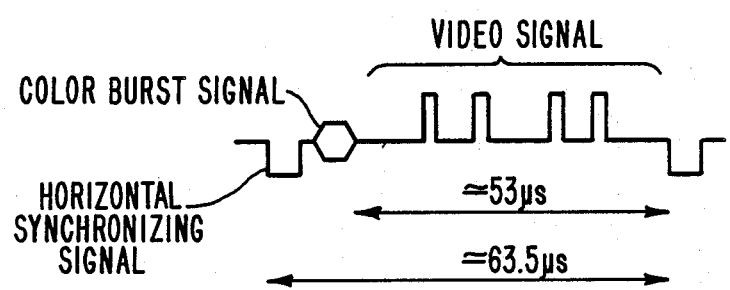
Figure 17A:
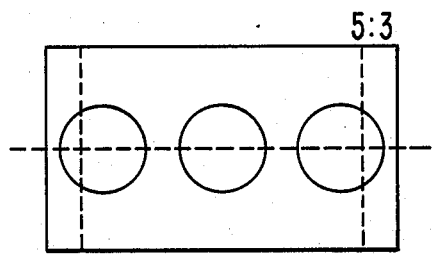
FIG. 17(a) is an example of a display screen at aspect
Figure 17B:
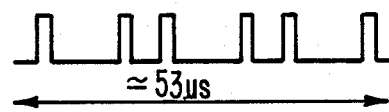
FIGS. 17(b)–(c) are time-axis expressions ratio of 5:3 and of a composite video signal.
Figure 17C:
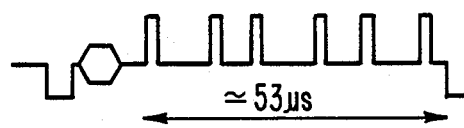

Hereinafter, as one of the embodiments of this invention, a television multiplex signal processor of a wide aspect ratio is explained. FIG. 16(a) shows an example of a display screen of an existing television, and FIG. 16(b) shows a composite video signal in one scanning line period near the middle of the same screen. Since the aspect ratio is 4:3, of the three circles shown in the display example of FIG. 16(a), a part of each of the right and left circles is cut. FIG. 17(a) shows a display screen of a larger aspect ratio, for example, 5:3 as compared with the existing screen. FIG. 17(b) shows a video signal in one scanning line period near the middle of the same screen, and FIG. 17(c) shows a composite video signal added to a synchronous signal and a color bust signal by rewriting the video signal of FIG. 17(b) so that the time-axis scale is equal to that in FIG. 16(b).

When the aspect ratio is increased as shown in FIG. 17(a), more video information can be obtained than the screen shown in FIG. 16(a). Here, in the existing television receiver, if a video signal with an aspect ratio of 5:3 is received, in order that the picture can be received as favorably as in the conventional method, that is, in order to keep compatibility, the time-axis is expanded with respect to the television signal in the period displayed on the screen of the existing television receiver. As clear from the comparison between FIG. 16(b) and FIG. 17(c), when the signal of FIG. 17(c) is received by the existing television receiver, it becomes an ellipsis stretched vertically although the original picture is circle, and it is necessary to expand the time-axis of the signal of FIG. 17(c). That is, when the original picture is picked up at an aspect ratio m:3 (where m is a real number not smaller than 4) stretched laterally in comparison to the conventional case, it is enough to expand the time-axis so a to be m/4 times longer than the picked-up signal corresponding to the portion displayed on the screen of the existing television receiver. Furthermore, in order to obtain a screen information with an aspect ratio of m:3, the remaining signal portion i sent by frequency multiplexing. Meanwhile, if a horizontal blanking period is not required in the pickup tube, for example, in the case of a CCD camera, it is not always necessary to expand the time-axis.

Figure 12A:
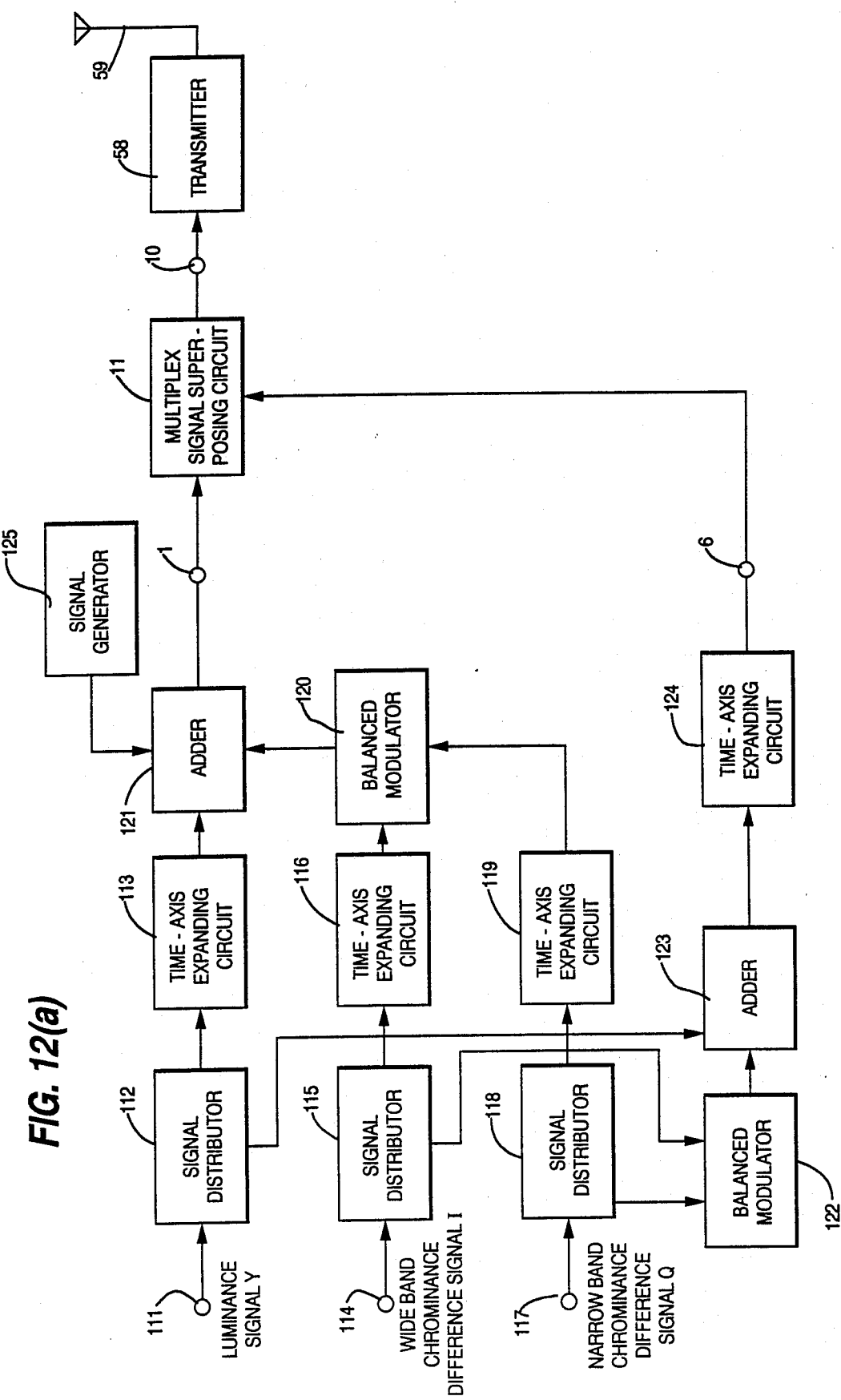

FIG. 12(a) is a block diagram showing a television multiplex signal processor with a wide aspect ratio at the transmission side in one of the embodiments of this invention. In FIG. 12(a), element 111 is an input terminal of the luminance signal Y obtained from a signal picked up by a camera having a wider aspect ratio than the existing ratio; element 114 is an input terminal of the wide band chrominance difference signal I obtained from the same picked-up signal; element 117 is an input terminal of the narrow band chrominance difference signal Q obtained from the same picked-up signal; elements 112, 115 and 118 are signal distributors; elements 113, 116, 119 and 124 are time-axis expanding circuits; elements 121 and 123 are adders; elements 120 and 122 are balanced modulators; element 125 is a signal generator; element 1 is a main signal input terminal; element 6 is a multiplex signal input terminal; element 11 is a multiplex signal superposing circuit, and element 10 is a composite signal output terminal. The luminance signal Y enters the signal distributor 112, and is distributed into the time-axis expanding circuit 113 and the adder 123. Similarly, the wide band chrominance difference signal I and the narrow band chrominance difference signal Q enter the respective signal distributors 115, 118, and are distributed into the time-axis expanding circuits 116, 119, and the balanced modulator 122. The time-axis can be expanded, for example, by varying the writing and reading clocks of a memory. Conventionally, when the original picture is picked up at an aspect ratio of m:3 (where m is a real number not smaller than 4) stretched laterally, the picked-up signal corresponding to the portion displayed on the screen of the existing television receiver is expanded in the time-axis by m/4 times by the time-axis expanded in the time-axis by m/4 times by the time-axis expanding circuits 113, 116, 119. Next, of the chrominance difference signals distributed by the signal distributors 115, 118, the remaining chrominance difference signal components other than the chrominance difference signals expanded by the time-axis expanding circuits 116, 119 are modulated by the balanced modulator 122, and are combined with the remaining luminance component other than the luminance signal expanded by the time-axis expanding circuit 113 by the adder 123. The output of the adder 123 is band compressed by the time-axis expanding circuit 124, and is fed into the multiplex signal superposing circuit 11 through the multiplex signal input terminal 6 as a multiplex signal. The output signals of the time-axis expanding circuits 116, 119 are modulated by the balanced modulator 120, and the output of the balanced modulator 120 is added by the adder 121 to the output signal from the time-axis expanding circuit 113 and a synchronous signal, a burst signal and a discriminating signal to distinguish the composite television signal of this processor from the conventional television signal, which are produced by the signal generator 125. The discriminating signal may be, for example, superposed in the vertical blanking period. The output of the adder 121 is fed into the multiplex signal superposing circuit 11 through the main signal input terminal 1 as a main signal. The output of the multiplex signal superposing circuit 11 is the composite signal in which the multiplex signal is superposed on the video base band main signal. The composite signal is transmitted through the transmitter 58 and the antenna 59.

Figure 12B:
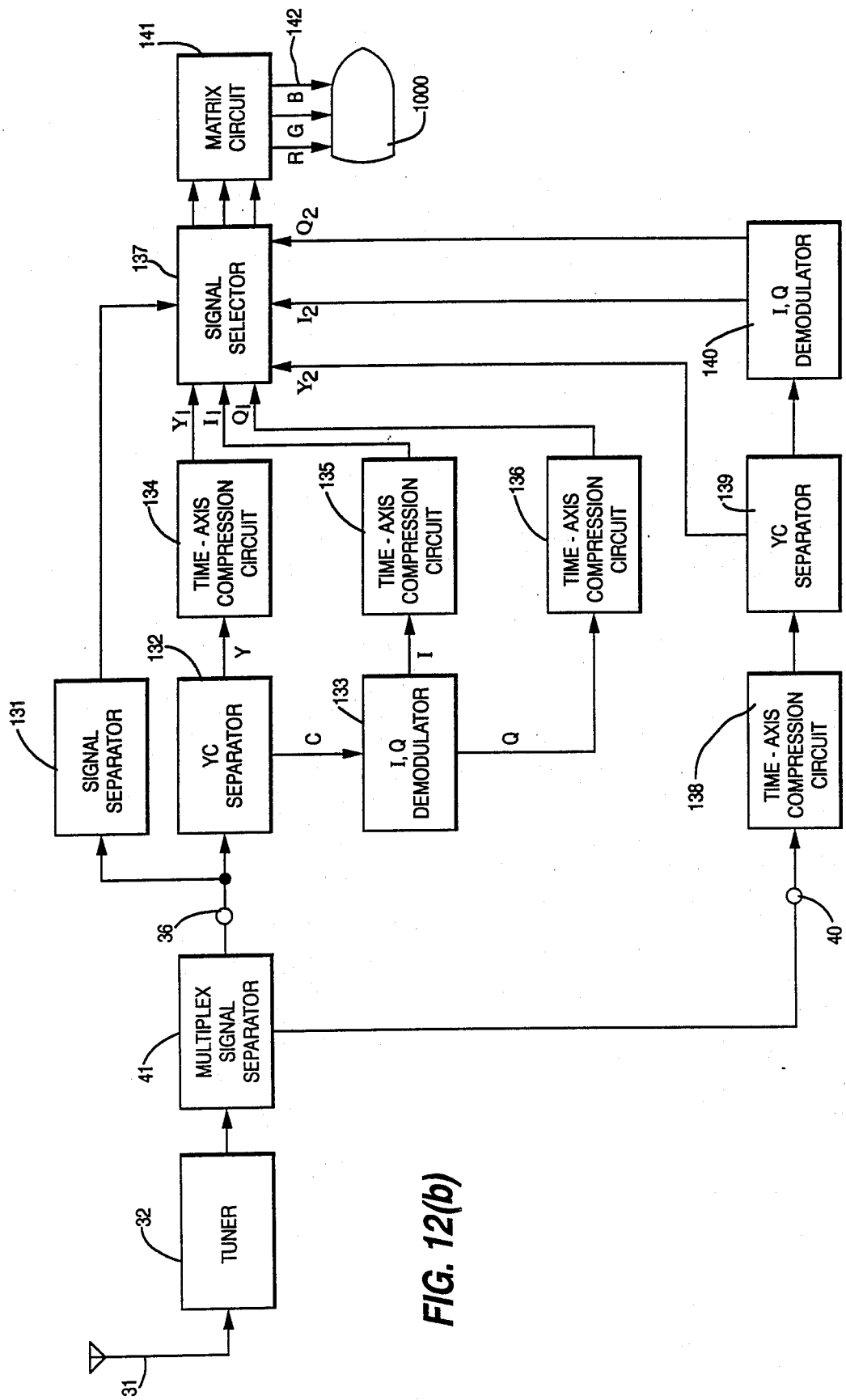

FIG. 12(b) is a block diagram showing a television multiplex signal processor with a wide aspect ratio at the reception side in one of the embodiments of this invention. In FIG. 12(b), element 41 is a multiplex signal separator; element 36 is a main signal output terminal; element 40 is a multiplex signal output terminal; elements 132 and 139 are YC separators; elements 134, 135, 136 and 138 are time-axis compression circuits; elements 133 and 140 are I, Q demodulators; element 137 is a signal selector; element 131 is a signal separator; element 141 is a matrix circuit, and elements 142 are R, G, B signal output terminals. The composite signal transmitted from the transmission side and received via the antenna 31 and the tuner 32 is separated into the main signal and the multiplex signal in the multiplex signal separator 41, which are respectively delivered from the main signal output terminal 36 and the multiplex signal output terminal 40. The video baseband signal which is the main signal is separated into the luminance signal Y and the chrominance signal C by means of the YC separator 132. The signal Y is compressed in the time-axis by the time-axis compression circuit 134 to become a signal Y1 The signal C is separated into chrominance difference signals I, Q by means of the I, Q demodulator 133. The signal I is compressed in the time-axis by the time-axis compression circuit 135 to become a signal $I_1$. The signal Q is compressed in the time-axis by the time-axis compression circuit 136 to become a signal $Q_1$. The multiplex signal is compressed in the time-axis by the time-axis compression circuit 138, and then is separated into signals $Y_2$, $I_2$ and $Q_2$ by means of the YC separator 139, and the I, Q demodulator 140. The signals $Y_1$, $I_1$, $Q_1$, $Y_q$, $I_2$ and $Q_2$ are fed into the signal selector 137, in which the signals $Y_1$, $I_1$ and $Q_1$ are selected for the portion corresponding to the screen of the conventional television receiver with an aspect ratio of 4:3, and since they are compressed in the time-axis, as for the remaining period of one horizontal scanning period, the blanking signal or the like is generated and selected inside the signal selector 137 for the conventional broadcasting signal, while the signals $Y_2$, $I_2$ and $Q_2$ are selected when receiving said wide television signal. The output signals of the signal selector 137 are converted into R, G, B signals by the matrix circuit 141. The R, G, B signals are fed into the CRT 1000.

Incidentally, the time-axis compression circuits 134, 135, 136, 138 are intended to receive the conventional television signal without any trouble, and to reproduce the television signal by compressing the time-axis expanded portion of the wide television signal having an aspect ratio stretched laterally. That is, as clear from the comparison between FIG. 16(b) and FIG. 17(c), it is necessary to compress the time-axis of the conventional television signal in order to receive the picture of the existing broadcasting without changing the aspect ratio. The compression ratio is determined by the aspect ratio.

The signal separator 131 separates, from the video baseband signal, the discriminating signal for distinguishing the television signal of the existing broadcasting from the synchronous signal, color burst signal, and the wide television signal. The signal selector 137 is controlled according to this discriminating signal.

Figure 13B:
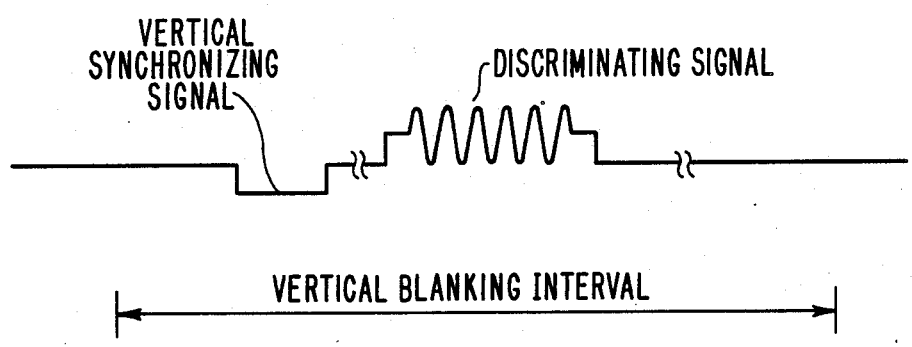
FIG. 13(b) shows an example of a discriminating signal.
Figure 27:
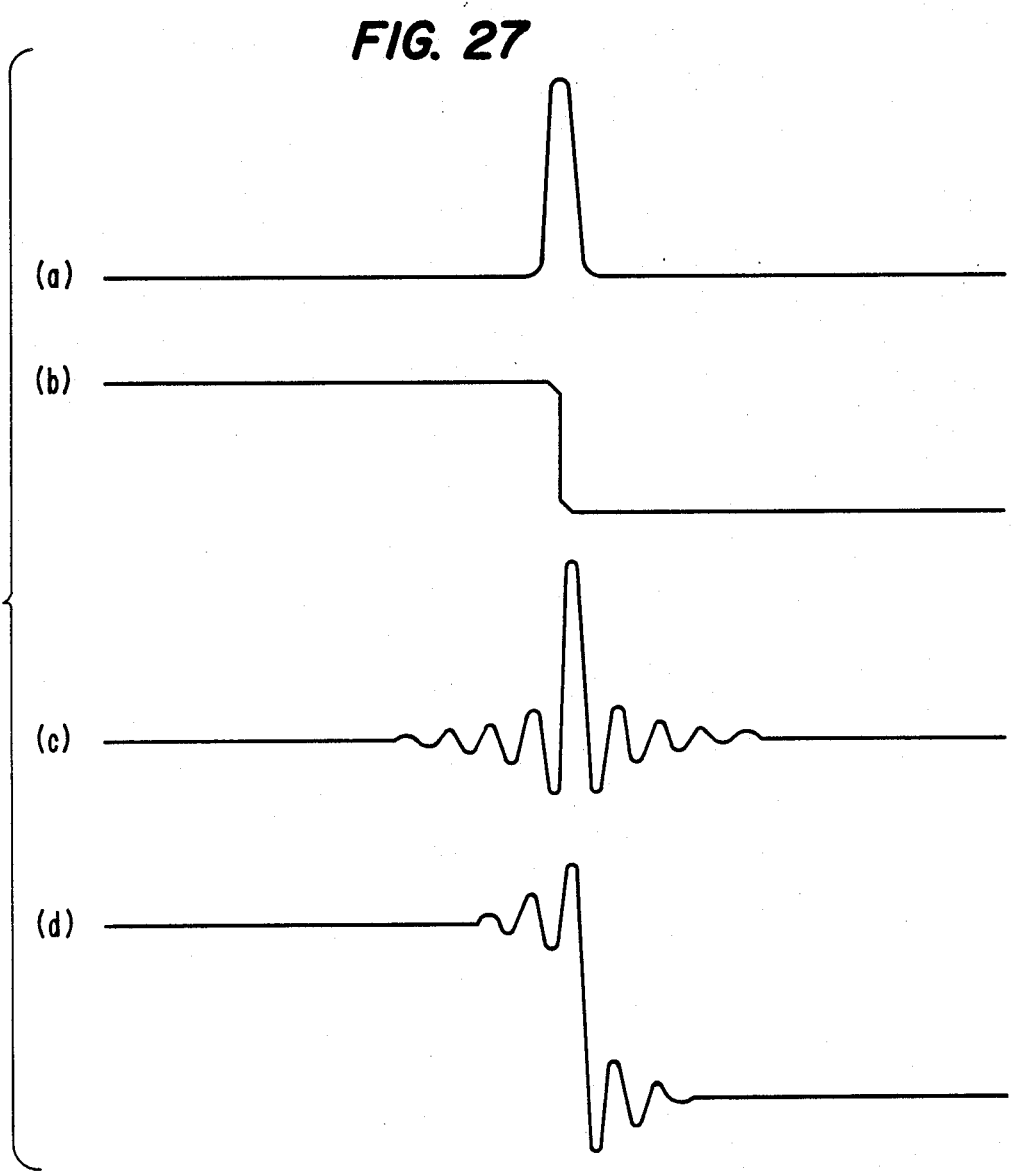
FIGS. 27(a)–(d) show waveforms of a reference signal generated in the reference signal generator shown in FIG. 26 and FIG. 28.

FIG. 13(a) is a block diagram of the signal generator 125 in FIG. 12(a), in which element 126 is a synchronous signal generator; element 127 is a burst signal generator; element 128 is a discriminating signal generator, and element 129 is an adder. The synchronous signal generator 126 and the burst signal generator 127 generate the same synchronous and burst signals as those in the conventional broadcasting system. The discriminating signal generator 128 generates a signal to distinguish whether or not a picture having a wide aspect ratio is sent out, and for example, a pilot signal or the like superposed in the blanking period is generated as shown in FIG. 13(b). The sum of the outputs of these three generators is delivered a an output from the signal generator 125.

FIG. 14 is a block diagram of the signal separator 131 in FIG. 12(b), which comprises a gate circuit 144. The video baseband signal which is the main signal is fed to the gate circuit 144, and discriminating signal is separated from the video baseband signal by the gate circuit 144. Since the discriminating signal is superposed, for example, in the blanking period of the video baseband signal, its separation is easy.

FIG. 15 is a block diagram of the signal selector 137 in FIG. 12(b), in which elements 146, 147 are selectors, and element 148 is a blanking signal generator. If the received signal is judged not to be for a picture with a wide aspect ratio by the discriminating signal, $Y_1$, $I_1$, $Q_1$ signals are selected by the selectors 146, 147 in the period corresponding to a screen of an aspect ratio of 4:3, and a blanking signal from the blanking signal generator 148 is selected in the other period. If the received signal is judged to be for a picture with a wide aspect ratio by the discriminating signal, $Y_2$, $I_2$, $Q_2$ signals are selected by the selectors 146, 147.

The signal expanded in the time-axis is widened in the band when the time-axis is compressed at the reception side, and therefore the resolution is not lowered even if the aspect ratio becomes larger. The multiplex signal not appearing on the screen of an aspect ratio of 4:3, for example, corresponding to the information out of both sides of the screen, is nearly cancelled in the conventional receiver by synchronous detection using the video carrier, so that interference due to the multiplex signal hardly occurs. In the receiver for multiplex signal demodulation, not only the video baseband signal is reproduced by synchronous detection, but also the multiplex signal containing the video signal to be displayed on the side portions of a wide aspect ratio screen is reproduced by filtering and synchronous detection using the phase-controlled carrier without quadrature distortion. As for the television signal having the conventional aspect ratio of 4:3, it is displayed near the middle of he monitor of the screen having an aspect ratio of 5:3, and both sides of the screen are, for example blanked.

Figure 18:
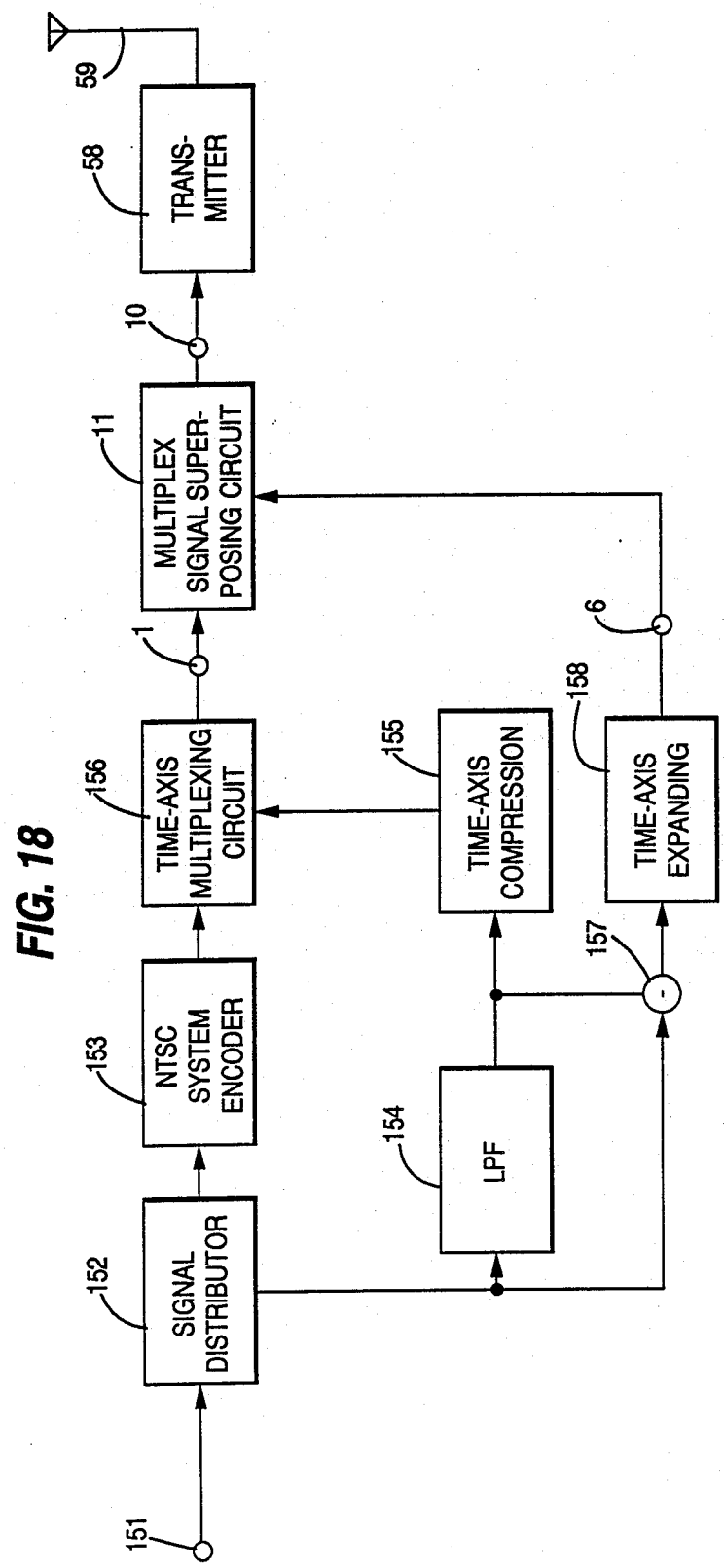

FIG. 18 is a block diagram showing a television multiplex signal processor with a wide aspect ratio in one of the embodiments of this invention, in which element 151 is an input terminal of a picture signal having an aspect ratio greater than 4:3; element 152 is a signal distributor; element 153 is an NTSC system encoder; element 154 is a low-pass filter (LPF); element 155 is a time-axis compression circuit; element 156 is a time-axis multiplexing circuit; element 157 is a subtractor; element 158 is a time-axis expansion circuit; element 1 is a main signal input terminal; element 6 is a multiplex signal input terminal; element 11 is a multiplex signal superposing circuit, and element 10 is a composite signal output terminal.

Figure 19:
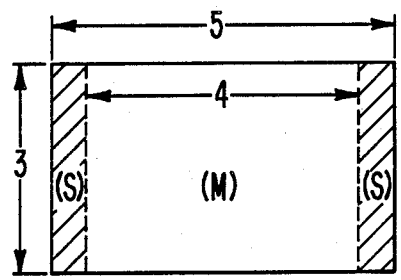
FIG. 19 is a picture composition at different aspect ratio.

Referring to FIG. 18, FIG. 19, FIGS. 20(a)–(e), FIGS. 21(a)–(e) and FIG. 22, the television multiplex signal processor in the constitution shown in FIG. 18 is described below. FIG. 19 shows a picture whose aspect ratio is 5:3. The picture signal fed into the input terminal 151 is separated, by the signal distributor 152, into a main picture signal for providing an image in the region of an aspect ratio of 4:3 shown by (M) in FIG. 19, and a sub picture signal for providing an image in the region indicated by the shaded area (S). The main picture signal separated by the signal distributor 152 is encoded by the NTSC system encoder 153 into an NTSC system signal, which is supplied into the time-axis multiplex circuit 156. The sub picture signal separated by the signal distributor 152 is supplied into the LPF 154 and the subtractor 157. This sub picture signal has a waveform as shown in FIG. 20(a), for example, on the time-axis, and on the frequency axis, as a characteristic of general picture signal, it shows a spectrum distribution low in the high frequency energy as shown in FIG. 21(a). By the LPF 154 and the subtractor 157, the sub picture signal is separated into a low frequency component of high energy (the waveform in FIG. 20(b), the frequency spectrum in FIG. 21(b)), and a high frequency component of relatively low energy (the waveform in FIG. 20(d)), the frequency spectrum in FIG. 21(d)), which are respectively supplied into the time-axis compression circuit 155 and the time-axis expansion circuit 158. In the time-axis compression circuit 155, the low frequency component shown in FIG. 20(b), FIG. 21(b) is compressed in the time-axis as shown in FIG. 20(c), FIG. 21(c) into a frequency spectrum below the band that can be transmitted by the NTSC system, and it is supplied into the time-axis multiplex circuit 156. In the time-axis multiplex circuit 156, the low frequency component of the sub picture signal compressed in the time-axis is multiplexed on the time-axis in the horizontal blanking period and vertical blanking period, shown in FIG. 22, of the NTSC system signal composed of the main picture signal. This time-axis multiplexed signal is supplied through the main signal input terminal 1 into the multiplex signal superposing circuit 11. In the time-axis expansion circuit 158, the high frequency component shown in FIG. 20(d), FIG. 21(d) is expanded in the time-axis so that the band is below 1.25 MHz as shown in FIG. 20(e), FIG. 21(e) and is supplied through the multiplex signal input terminal 6 into the multiplex signal superposing circuit 11. From the multiplex signal superposing circuit 11, a composite signal is obtained as described before, and it is delivered from the composite signal output terminal 10 to be transmitted via the transmitter 58 and the antenna 59.

Thus, according to this embodiment, the sub picture signal is separated into a low frequency component and a high frequency component, and the low frequency component is multiplexed on the time-axis while the high frequency component is multiplexed by quadrature modulation in the vestigial sideband of the NTSC system signal, whereby a television signal containing picture information with an aspect ratio larger than 4:3 can be transmitted. When this composite television signal is received by a television receiver of the conventional synchronous detection system, since the high frequency component of the sub picture signal does not have a DC component, detection of the NTSC system signal with an aspect ratio of 4:3 can be effected without interference. When the same signal is received by a television receiver of envelope detection system, since the high frequency component of the sub picture signal is relatively small in energy, the level of interference is small. In this embodiment, meanwhile, the LPF 154 in FIG. 18 is a one-dimensional one, but it is also possible to use a two-dimensional filter.

As described above, according to this invention, sufficient services of movies or programs of realistic feeling are possible because the image of an aspect ratio of, for example, 5:3 is directly reproduced in the receiver. Also, if received by the existing television receiver, the image of aspect ratio of 4:3 can be reproduced with no or small interference. Thus, the present invention is very effective industrially.

Figure 23:
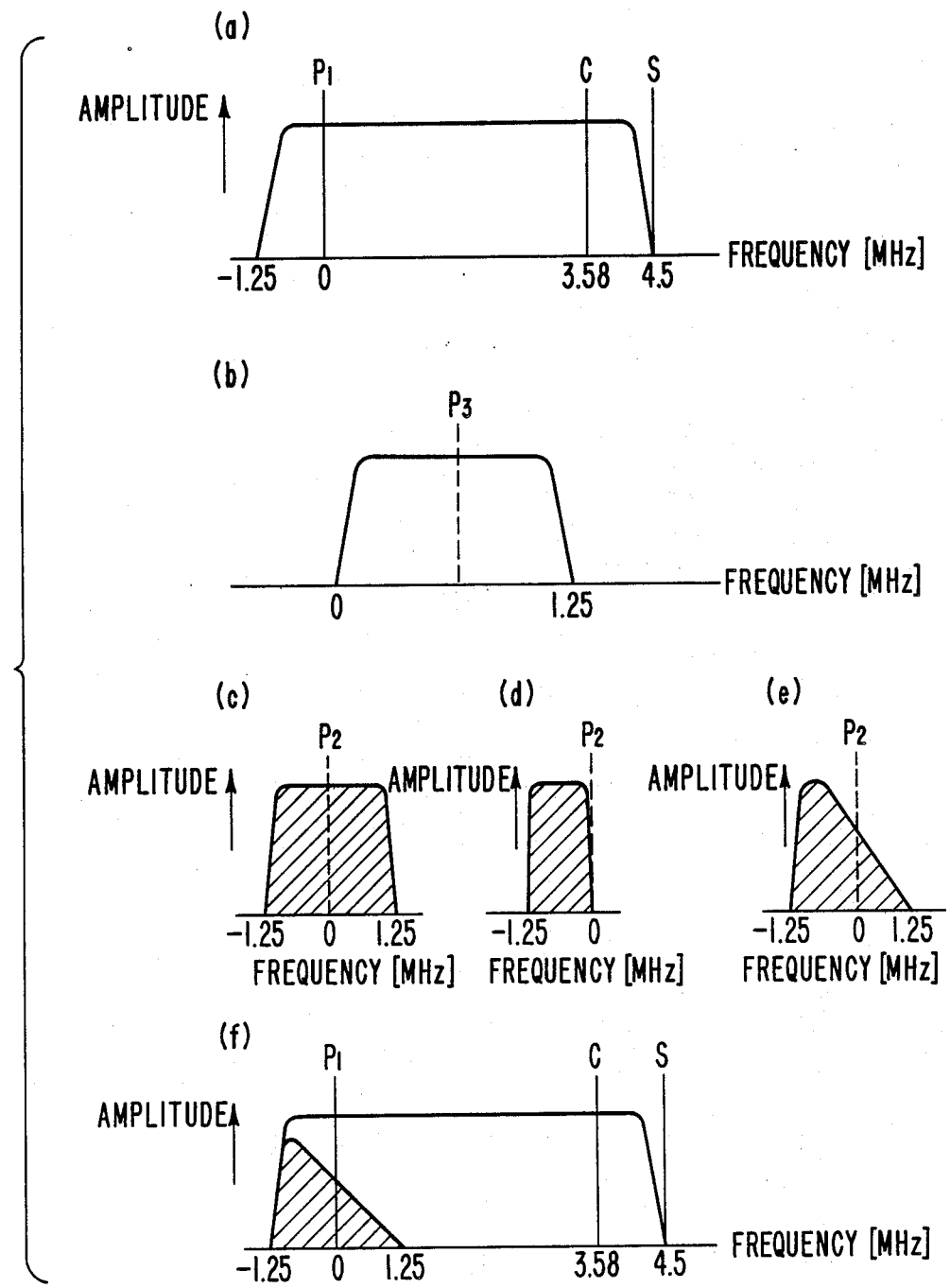

Next, multiplex transmission of digital signals is considered. FIGS. 23(a)–(f) are spectral diagrams showing a digital multiplex signal processing method at the transmission side in one of the embodiments of this invention. FIG. 23(a) is a spectral diagram of a television signal amplitude modulated in the vestigial sideband in the current television system, in which the lower sideband of the video carrier $P_1$ is the vestigial sideband. FIG. 23(b) is a spectral diagram of the multiplex signal obtained by phase shift keying (PSK) modulation of subcarrier $P_3$ by a digital signal preliminary band limited by a roll-off filter. FIG. 23(c) shows the band limited multiplex signal, in which a carrier $P_2$ which has the same frequency but has a phase which is different by 90 degrees from the video carrier $P_1$ is amplitude-modulated in double sideband so as to remove the carrier $P_2$ FIG. 23(d) is same as above except that amplitude modulation in single sideband is effected instead of amplitude modulation in double sideband. FIG. 23(e) is same as above except that amplitude modulation in vestigial sideband is effected instead of amplitude modulation in double sideband. For example, the signal of FIG. 23(e) multiplexed on the television signal of FIG. 23(a) is the signal shown in FIG. 23(f), and it is an example of television signal synthesized by this invention. In FIG. 23(b), meanwhile, the phase shift keying (PSK) modulation is shown, but other methods of modulation may be employed, such as amplitude shift keying (ASK) modulation and frequency shift keying (FSK) modulation. The phase shift keying modulation may be bi-phase shift keying (BPSK) modulation or multi-phase shift keying modulation such as quadri-phase shift keying (QPSK) modulation. Similarly, as for the amplitude shift keying modulation, two-level or multi-level modulation may be possible. Also, as for the frequency shift keying modulation, two-frequency or multi-frequency modulation may be possible. In FIG. 23(f), the signal to be multiplexed is the signal shown in FIG. 23(e), but signals of FIG. 23(c) or FIG. 23(d) may be used.

Figure 24:
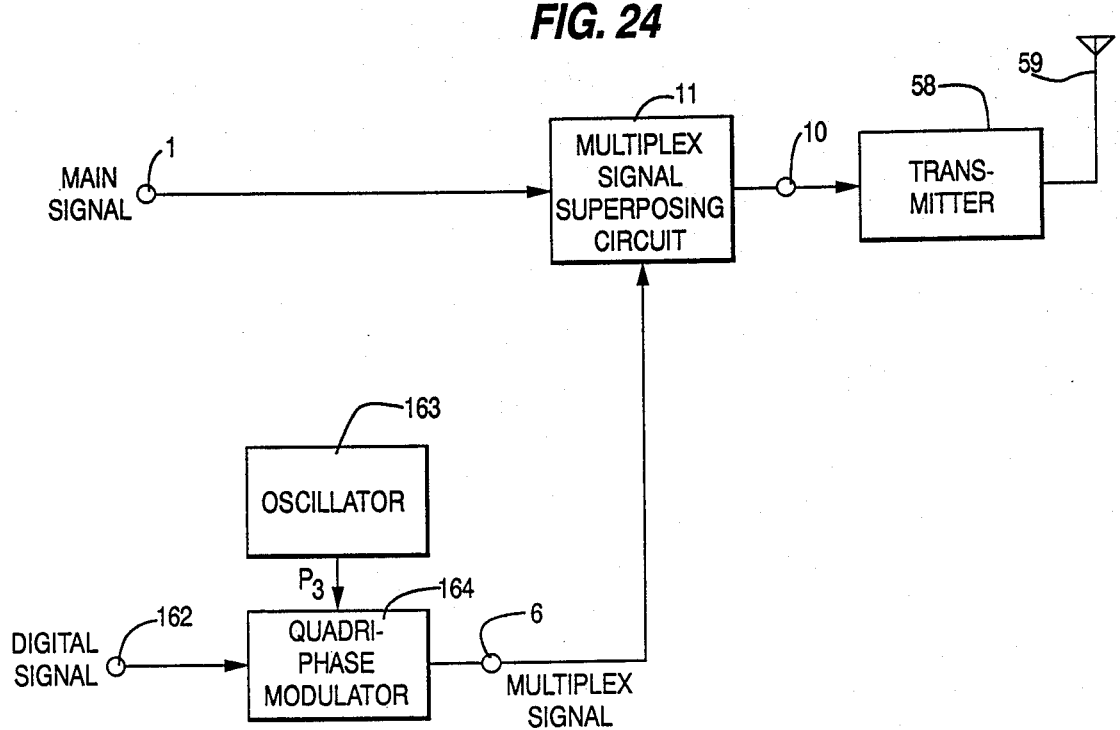

FIG. 24 is a block diagram showing a digital multiplex signal processor at the transmission side in one of the embodiments of this invention, in which element 11 is a multiplex signal superposing circuit; element 1 is a main signal input terminal; element 6 is a multiplex signal input terminal; element 162 is a digital signal input terminal; element 10 is a composite signal output terminal; element 163 is an oscillator, and element 164 is a quadri-phase modulator. A video baseband signal as the main signal is fed through the main signal input terminal 1 into the multiplex signal superposing circuit 11. A digital signal supplied through the digital signal input terminal 162 modulates the subcarrier $P_3$ generated by the oscillator 163 by quadri-phase shift keying modulation by the quadri-phase modulator 164 to produce a multiplex signal. Incidentally, instead of the quadri-phase modulator 164, a multi-phase shift modulator, frequency modulator or amplitude modulator may be used. The output multiplex signal of the quadri-phase modulator 164 is fed through the multiplex signal input terminal 6 into the multiplex signal superposing circuit 11. The output of the multiplex signal superposing circuit 11 is a composite signal.

Figure 25:
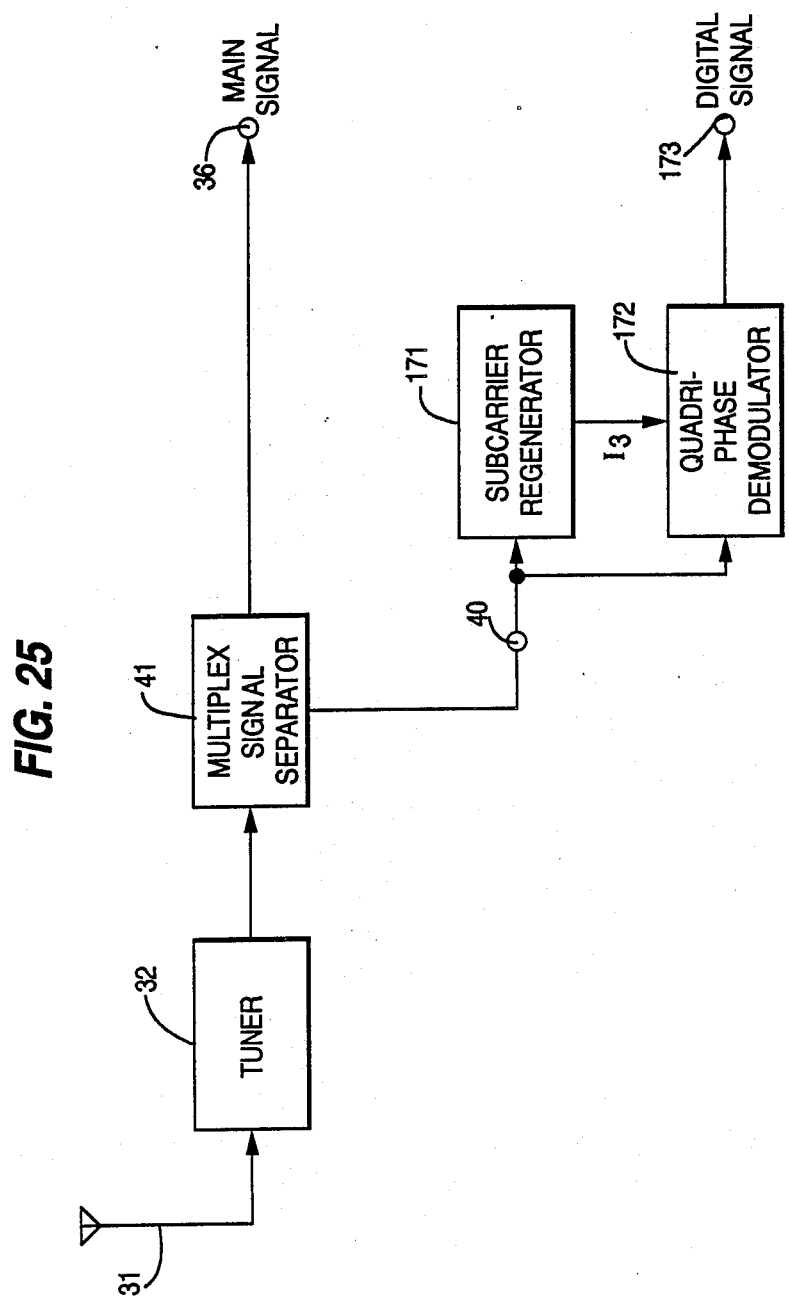

As another embodiment of this invention, a digital multiplex signal processor at the reception side is described below. FIG. 25 is a block diagram of this digital multiplex signal processor, in which element 41 is a multiplex signal separator; element 36 is a main signal output terminal; element 40 is a multiplex signal output terminal; element 172 is a quadri-phase demodulator; element 171 is a subcarrier regenerator, and element 173 is a digital signal output terminal. The signal transmitted from the transmission side is separated into the main signal and the multiplex signal by the multiplex signal separator 41. Incidentally, if the multiplex signal is a signal as shown in FIGS. 23(c) or (d), it an be similarly separated and demodulated. The multiplex signal is subjected to quadri-phase shift keying demodulation by the quadri-phase demodulator 172 using the subcarrier $I_3$ obtained by the subcarrier regenerator 171. In this case, too, instead of the quadri-phase demodulator 172, a multi-phase demodulator, frequency demodulator or amplitude demodulator may be used depending on the transmission side. The demodulation result becomes the original digital signal, and it is delivered from the digital signal output terminal 173. As is clear from the explanation above, it is possible to multiplex a large quantity of digital signals within the band of the current television system.

Figure 26:
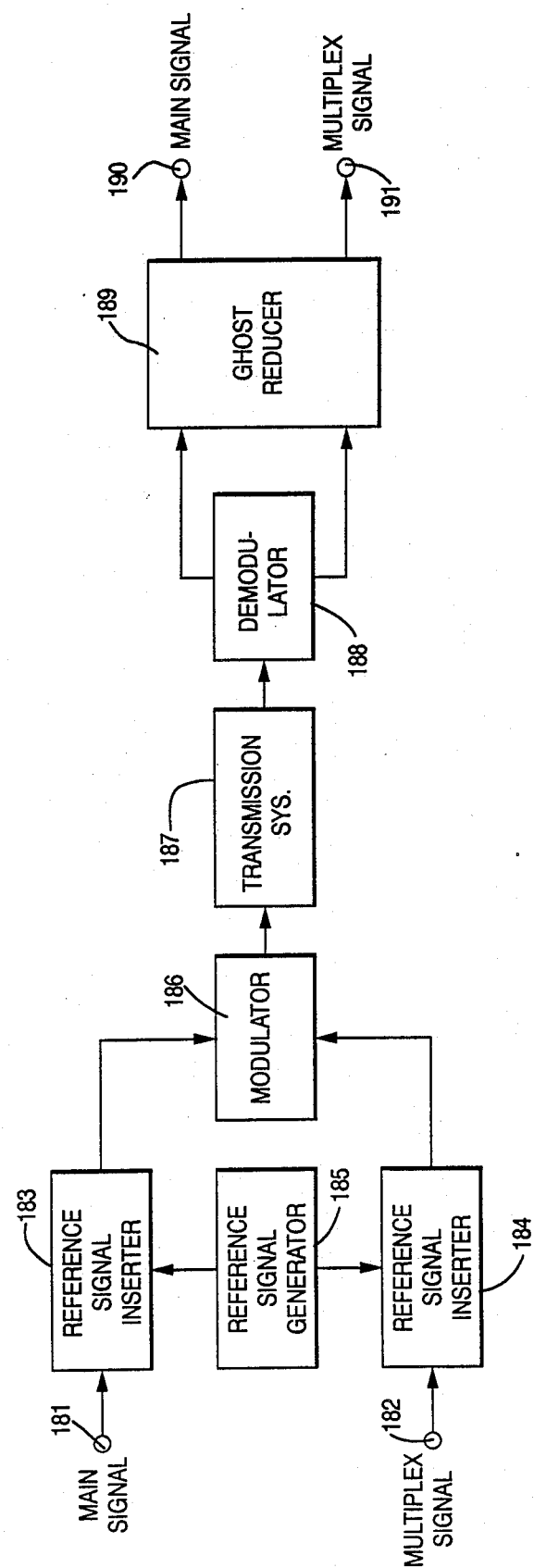
FIG. 26 is a block diagram of a transmission device according to this invention.

Next are described ghost reduction and crosstalk reduction in the transmission channel. FIG. 26 shows a circuit composition of a transmission apparatus in one of the embodiments of this invention, in which element 181 is a main signal input terminal; element 182 is a multiplex signal input terminal; elements 183 and 184 are reference signal inserters; element 185 is a reference signal generator; element 186 is a modulator; element 187 is a transmission system; element 188 is a demodulator; element 189 is a ghost reducer; element 190 is a main signal output terminal, and element 191 is a multiplex signal output terminal. A main signal and a multiplex signal fed through the main signal input terminal 181 and the multiplex signal input terminal 182 are combined with reference signals for ghost reduction generated by the reference signal generator 185 and inserted, in the vertical blanking intervals by the reference signal inserters 183 and 184. The reference signals may have a pulse waveform, bar waveform, sin x/x waveform, or their combined waveform as shown in FIGS. 27(a)–(d), but it is required to contain the frequency components in the transmission band sufficiently. Meanwhile, the reference signal waveforms inserted into the main signal and the multiplex signal may be either identical to or different from each other. The main signal and the multiplex signal combined with the reference signals for ghost reduction are subjected to quadrature modulation in the modulator 186. The internal structure of the modulator is same as that shown in FIG. 2, and thus its operation is not repeatedly described here. The transmission system 187 is supposed to contain various high frequency circuits necessary for signal transmission such as a tuner and amplifier. In the transmission system 187, group delay distortion, frequency amplitude characteristic distortion and so-called linear distortion are caused by the multi-path transmission or intervening amplifiers. The received signal having such ghost or linear distortion is subjected to quadrature synchronous detection by the demodulator 188, and is separated and demodulated into the main signal and the multiplex signal. The internal structure of the demodulator 188 is the same as that shown in FIG. 4, and thus its explanation is omitted here.

The main signal and the multiplex signal, which are outputted from the demodulator 188, contain ghost components and crosstalk components of the respective signals. In the ghost reducer 189, based on the reference signals inserted at the transmission side, a filter having an inverse characteristic to the characteristic of the part containing the modulator 186, transmission system 187 and demodulator 188, regarded as one filter is realized and the ghost components and crosstalk component are cancelled. Since a series of signal processings, at the modulator 186, transmission system 187 and demodulator 188, regarded as one filter is realized and the ghost components and crosstalk component are cancelled. Since a series of signal processings, at the modulator 186, transmission system 187 and demodulator 188 are linear, a filter having a linear inverse characteristic is present, and it may be approximately realized by a two-dimensional transversal filter using two systems of delay lines with taps. An example of the internal structure of the ghost reducer 189 is shown in FIG. 28.

Figure 28:
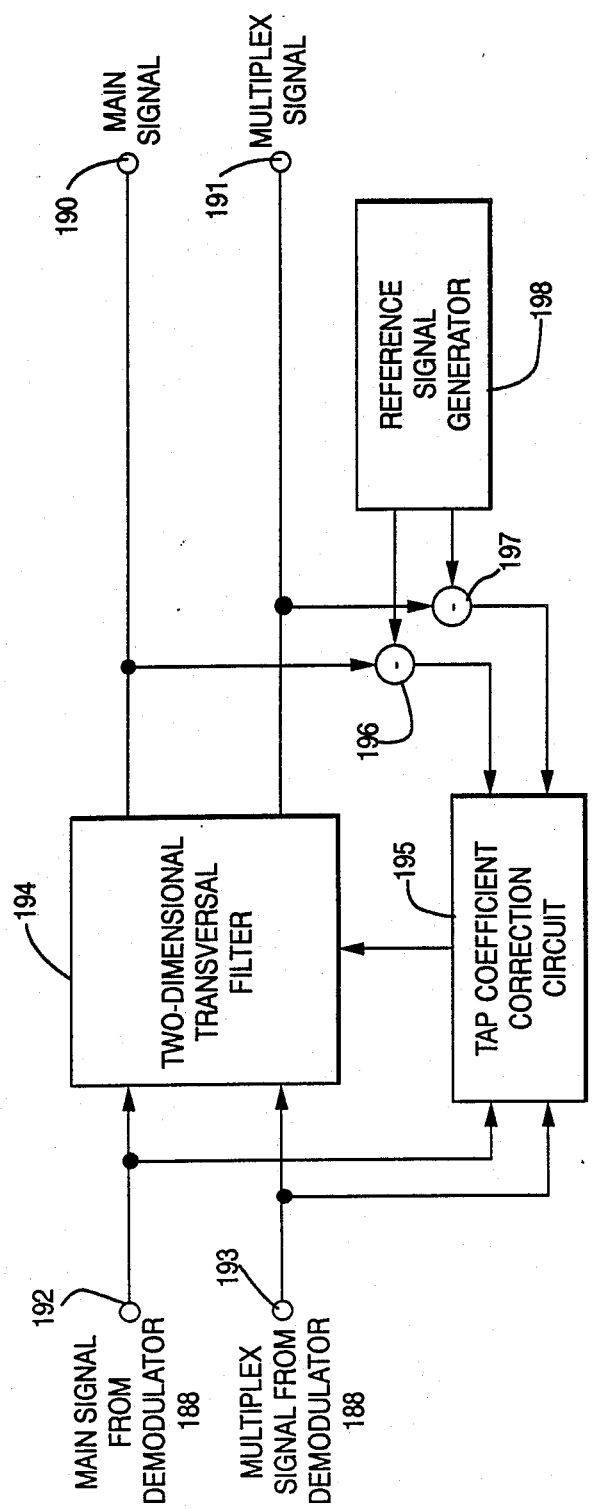
FIG. 28 is a circuit composition of an example of the ghost reduction device of FIG. 26.

FIG. 28 shows a circuit composition of the ghost reducer 189, in which element 190 is a main signal output terminal; element 191 is a multiplex signal output terminal; element 192 is a main signal input terminal; element 193 is a multiplex signal input terminal; element 194 is a two-dimensional transversal filter; element 195 is a tap coefficient correction arithmetic circuit; element 196 and 197 are subtracters, and element 198 is a reference signal generator. The internal structure of the two-dimensional transversal filter 194 is shown in FIG. 29.

Figure 29:
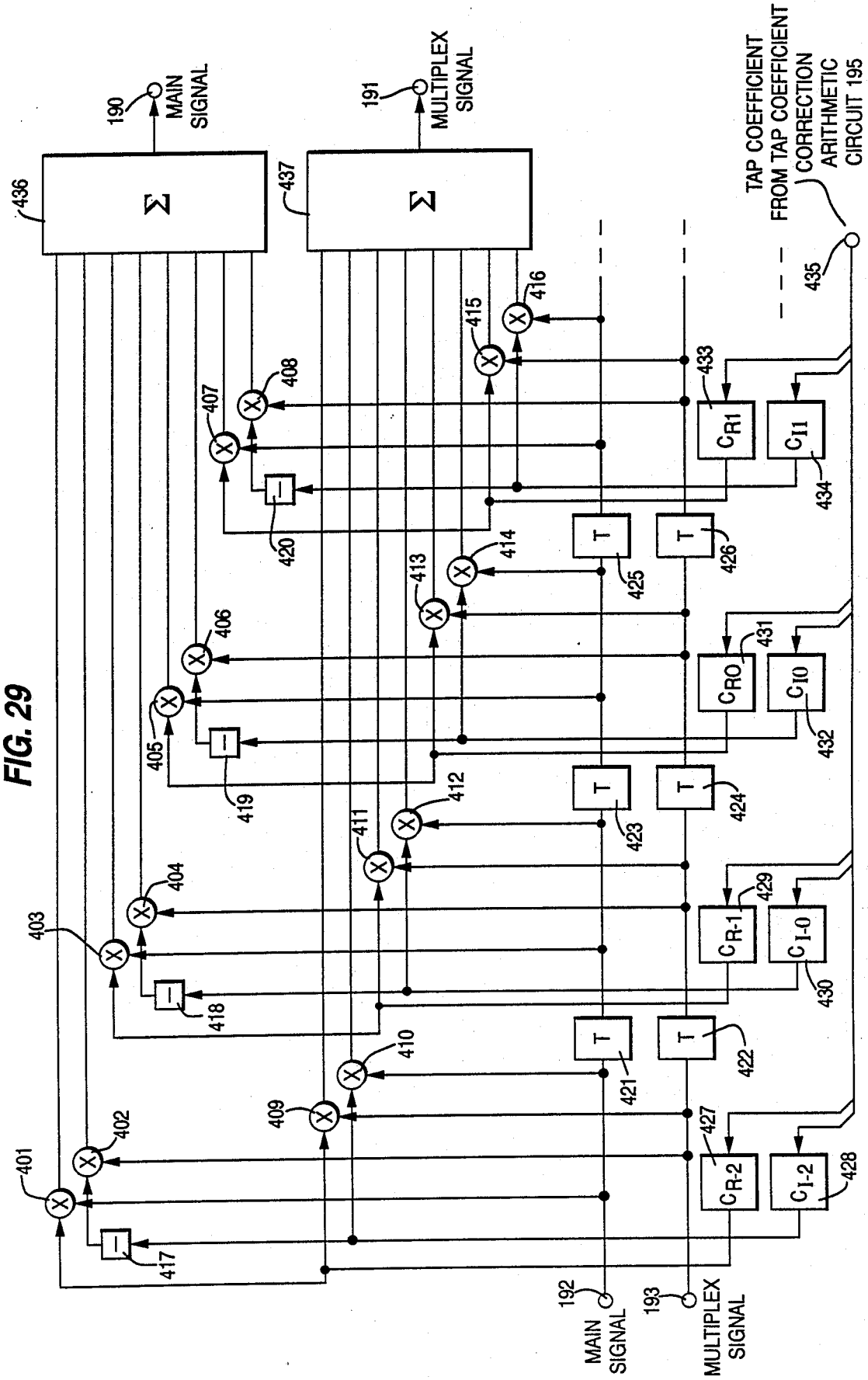
FIG. 29 is a circuit composition of an example of the transversal filter of FIG. 28.

FIG. 29 shows a circuit composition of the two-dimensional transversal filter 194, in which element 190 is a main signal output terminal; element 191 is a multiplex signal output terminal; element 192 is a main signal input terminal; element 193 is a multiplex signal input terminal; elements 401 and 416 are multipliers; elements 417 and 420 are polarity inverters; elements 421 and 426 are delay lines each with a delay time T; elements 427 and 434 are tap coefficient holders; element 435 is a tap coefficient writing terminal, and elements 436 and 437 are adders.

Referring now to FIG. 28 and FIG. 29, the operation of the ghost reducer 189 is described below.

As mentioned above, basically, the modulator 186 is a quadrature modulator, while the demodulator 188 is a synchronous detector of two axes crossing orthogonally with each other, so that the series of signal processings by the modulator 186, transmission system 187 and demodulator 188 are linear. That is, from the modulator 186, a signal having a complex envelope of which the input signals are real part and imaginary part are sent out, while from the demodulator 188, the complex envelope of the received signal is taken out. Supposing, for example, the sample value trains at each interval T of the reference signals inserted into the original signal and the multiplex signal which are input signals of the modulator 186 to be $a_n$, $b_n$, respectively, and defining a complex envelope $x_n$ of a modulated wage as $$X_n = a_n + jb_n \tag{1}$$

its impulse response $h_n$ is expressed by a complex number because the characteristic is linear from the modulator 186 to the demodulator 188. Therefore, when the output signals of the demodulator 188 corresponding to the reference signals $a_n$, $b_n$, that is, the signals at the main signal input terminal 192 and the multiplex signal input terminal 193 in FIG. 28 or FIG. 29 are assumed to be $\alpha_n$, $\beta_n$, a complex signal train $y_n$ defined as $$Y_n = \alpha_n + j\beta_n \tag{2}$$

can be expressed as follows:

$$y_n = \sum_{i=-\infty}^{\infty} x_i \cdot h_{n-i} \tag{3}$$

On the other hand, supposing the output signals of the two-dimensional transversal filter 194 supplied with $y_n$, that is, the signals at the main signal output terminal 190 and the multiplex signal output terminal 191 in FIG. 28 or FIG. 29 to be An, Bn, defining a complex signal train $z_n$ as $$Z_n = A_n + jB_n \tag{4}$$

and the tap coefficients $c_{Ri}$, $C_{Ii}$ (i = −N to N) of the two-dimensional transversal filter 194 in FIG. 29 as a complex tap coefficient $c_i$ $$C_i = C_{ri} + jC_{Ii} \tag{5}$$

then $Z_n$ can be expressed, using $y_n$, as follows:

$$Z_n = \sum_{i=-N}^{N} C_i \cdot y_{n-i} = C^t Y_n \tag{6}$$

where $$C^t = [c_{-n} \ldots C_o \ldots C_n]$$

$$Y^t_n + [Y_{n+n} \ldots Y_n \ldots Y_{nN}]$$

superscript t: transpose.

On the other hand, from equation (3) and equation (6), it follows that $$\begin{aligned} Z_n &= \sum_{i=-N}^{N} C_i \sum_{m=-\infty}^{\infty} X_m \cdot h_{n-i-m} \\ &= \sum_{m=-\infty}^{\infty} X_m \sum_{i=-N}^{N} C_i \cdot h_{n-i-m} \\ &= \sum_{m=-\infty}^{\infty} X_m \cdot S_{n-m} \end{aligned} \tag{7}$$

where, $$S_n = \sum_{i=-N}^{N} C_i \cdot h_{n-i} \tag{8}$$

The impulse response train $s_n$ is an entire impulse response of the part composed of the modulator 186, transmission system 187, demodulator 188 and two-dimensional transversal filter 194. If the tap number 2N+1 is infinitely large, it is possible to define accurately as $$S_n = \sum_{i=-N}^{N} C_i \cdot h_{n-i} = 0 \quad (n \neq 0) \tag{9}$$

$$s_o = \sum_{i=-N}^{N} C_i \cdot h_{-i} = 1 \tag{10}$$

so that the ghost in the transmission system 187, and the linear distortion in the modulator 186 and demodulator 188 can be completely equalized by the two-dimensional transversal filter 194. As a result, the ghost and crosstalk can be eliminated. Actually, however, the tap number is finite, and the conditions of equations (9) and (10) cannot be satisfied perfectly, but, instead, by setting an evaluation function to evaluate the approximation to these conditions and attempting to minimize it, the complex tap coefficient $c_i$ can be optimally selected.

Methods to optimize the complex tap coefficient $c_i$ can be roughly classified into the sequential method and nonsequential method. An example of the former method is described below. More specifically, as the sequential methods, the zero forcing method, mean square error method, and their combination are known. An example of mean square error method is described below.

In the mean square error method, the following evaluation function E is used.

$$E = \sum_n E_n = \sum_n |Z_n - \Gamma_n|^2 \quad (11)$$
$$= \sum_n |\epsilon_n|^2$$

where the complex signal train $r_n$ is a signal train having the reference signal trains for the main signal and the multiplex signal generated by the reference signal generator 198 at the reception side respectively in the real part and imaginary part. The complex signal train $r_n$ is caused to coincide with a complex signal train $x_n$ generated by the reference signal generator 185 at the transmission side. Therefore, equation (11) shows the square sum of the error $\epsilon_n$ at each sample point, and this square error E is minimized by the steepest descent method. That is, supposing the tap coefficients after the k-th correction to be $k_{cRi}$, $k_{cIi}$, and the complex tap coefficient defined by equation (5) to be $k_{ci}$, by correcting the sequential tap coefficient so as to fulfill the equations $$^{k+1}C_{Ri} = {}^kC_{Ri} - \delta \frac{\partial E}{\partial C_{Ri}} \quad (12)$$

$$^{k+1}C_{Ii} = {}^kC_{Ii} - \delta \frac{\partial E}{\partial C_{Ii}} \quad (13)$$

the square error E which is the evaluation function can be minimized. Meanwhile, expressing the complex conjugate by and paying attention to the relationship of $$\frac{\partial E}{\partial (jC_{Ii})} = -j \frac{\partial E}{\partial C_{Ii}}$$

equations (12), (13) can be expressed by one expression using equation (11) as follows:

$$^{k+1}C_i = {}^kC_i - \delta \frac{\partial E}{\partial C_i^*} \quad (13)$$

$$= {}^kC_i - \delta \sum_n \frac{\partial E_n}{\partial C_i^*} \quad (14)$$

On the other hand, using equations (6) and (10), the following equation is obtained:

$$\frac{\partial E_n}{\partial C_i^*} = 2 \epsilon_n y_{n-i}^* \quad (15)$$

Thus, the tap coefficient can be corrected as:

$$^{k+1}C = {}^kC - \gamma \sum_n \epsilon_n Y_n^* \quad (16)$$

$$(\gamma = 2\delta)$$

In FIG. 28, into the tap coefficient correction arithmetic circuit 195, the error signal $\epsilon_n$ having the reference signal train $r_n$ subtracted from the output signal train $z_n$ of the two-dimensional transversal filter 194, and the input signal train $y_n$ of the two-dimensional transversal filter 194 are fed by using the subtractors 196, 197, and the reference signal generator 198. In the tap coefficient correction arithmetic circuit 195, calculation as expressed by equation (16) is carried out, and the tap coefficient of the two-dimensional transversal filter 194 is corrected. By
repeating this operation, the tap coefficients $c_{Ri}$, $c_{Ii}$ are converged to the optimum values, so that the ghost and crosstalk are reduced.

Thus, in the multiplex signal processor, known reference signals are inserted into the main signal and the multiplex signal at the transmission side. At the reception side, two demodulated signals separated and demodulated by synchronous detection in the detection phases of two axes orthogonal to each other are passed into two systems of delay lines with taps, and the delayed signals are synthesized with a properly determined weight by using the reference signals that have been received. In other words, by using the two-dimensional transversal filter, a filter having a reverse characteristic to the transmission characteristic of the multipath transmission, that is, the transmission path in which ghost is present is realized, whereby the two distorted demodulated signals are equalized, so that the original main and multiplex signals are obtained in high quality even in the presence of ghosts, and that the crosstalk between the two signals can be reduced at the same time.

Figure 30:
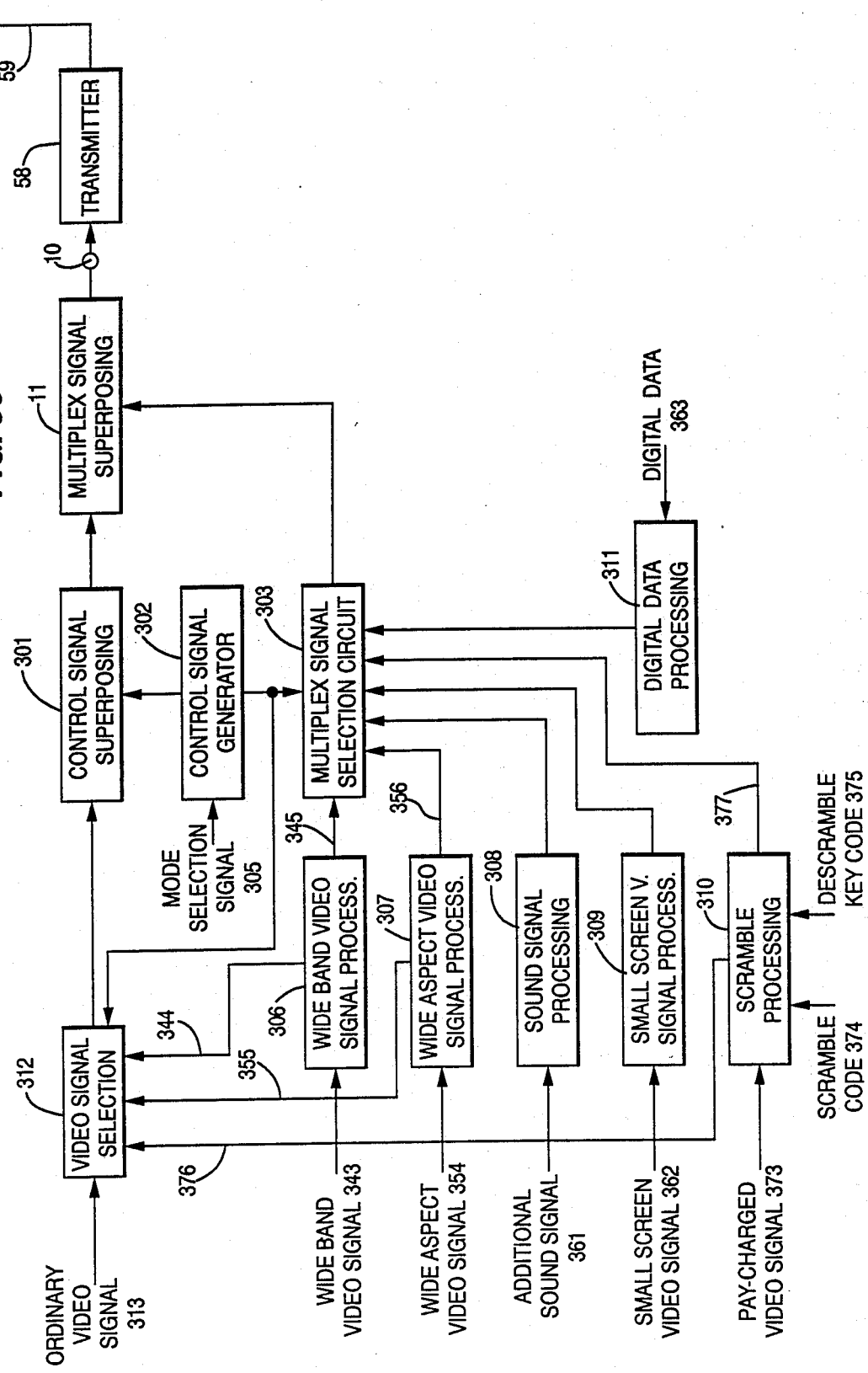

Below is explained the case of a multiplex transmission by changing over various multiplex signals. FIG. 30 is a block diagram used to explain a television signal transmission apparatus in one of the embodiments of this invention, in which element 301 is a control signal superposing circuit; element 302 is a control signal generator; element 303 is a multiplex signal selection circuit; element 11 is a multiplex signal superposing circuit; element 305 is a mode selection signal; element 306 is a wide band video signal processing circuit; element 307 is a wide aspect video signal processing circuit; element 308 is an additional sound signal processing circuit; element 309 is a small screen video signal processing circuit; element 310 is a scramble processing circuit; element 311 is a digital data processing circuit; element 312 is a video signal selection circuit, and element 313 is an ordinary video signal. Moreover, element 10 is a composite signal; element 343 is a wide band video signal; element 354 is a wide aspect video signal; element 361 is an additional sound signal; element 362 is a small screen video signal; element 363 is a digital data for multiplex,, and element 373 is a pay-charged video signal.

There are a plurality of selectable signal-transmission modes for transmitting the ordinary video signal, wide band video signal, wide aspect video signal, additional sound signal, small screen video signal, digital data and pay-charged video signal. The mode selection signal 395 is produced, for example, by a mode selection switch (not shown) for indicating a selected mode. The control signal generator 302 generates, according to the mode selection signal 395, an error detection-, error correction-coded digital control signal showing the mode which is fed to the control signal superposing circuit 301 and a selection control signal which is applied to the video signal selection circuit 312 and the multiplex signal selection circuit 303. The video signal selection circuit 312 selects, according to the selection control signal, one of the ordinary video signal 313 and video signals supplied from the wide band video signal processing circuit 306, wide aspect video signal processing circuit 307 and scramble processing circuit 310. The control signal superposing circuit 301 superposes the digital control signal from the control signal generator-302 on the video signal selected and supplied from the video signal selection circuit 312 in the vertical blanking period thereof. The multiplex signal selection circuit 303 selects, according to the selection control signal, one of multiplex signals supplied from the processing circuits 306, 307, 308, 309, 310 and 311. The video signal from the control signal superposing circuit 301, regarded as the main signal, and the multiplex signal selected from the multiplex signal selection circuit 303 are fed into the multiplex signal superposing circuit 11, where they are subjected to the quadrature modulation as described before to become the composite signal 10 which will be transmitted.

Hereinafter each block is described, but the description of multiplex signal superposing circuit 11 is omitted because it is given in FIG. 2.

Figure 31:
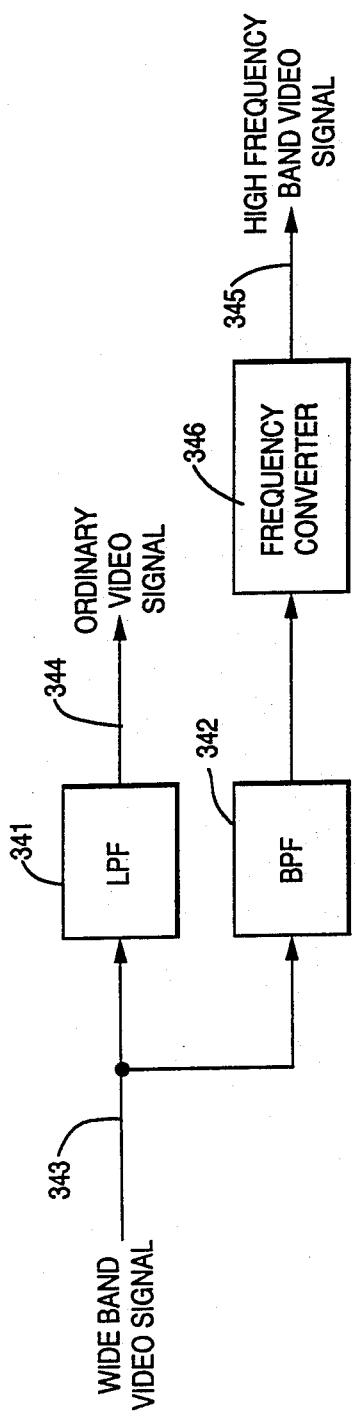
FIG. 31 is a circuit composition of an example of video high frequency range auxiliary signal circuit of FIG. 30.

First, the wide band video signal processing circuit 306 in FIG. 30 is as follows. FIG. 31 is a block diagram of the wide band video signal processing circuit 306 shown in FIG. 30. Element 341 is a low-pass filter (LPF) for passing an ordinary video band (about 4.2 MHz); element 342 is a band-pass filter (BPF) (About 4.2 to 5.2 MHz); element 343 is a wide band video signal; element 3344 is an ordinary video signal; element 345 is a high frequency video signal, and element 346 is a frequency converter. The wide band video signal 343 produced by a camera or the like is limited in band to the same band as that of the existing television signal by the LPF 341 to become the ordinary band video signal 344, which is fed into the video signal selection circuit 312 in FIG. 30. The signal limited in the band by the BPF 342 is converted to a signal of low frequency band of about 1 MHz by the frequency converter 346, and then fed, as the high frequency video signal 345, into the multiplex signal selection circuit 303 in FIG. 30. Needless to say, it is also possible to convert the frequency of the higher frequency portion of the high frequency video signal before the BPF, for example, 5.2 to 6.2 MHz band to 4.2 to 5.2 MHz band.

Figure 32:
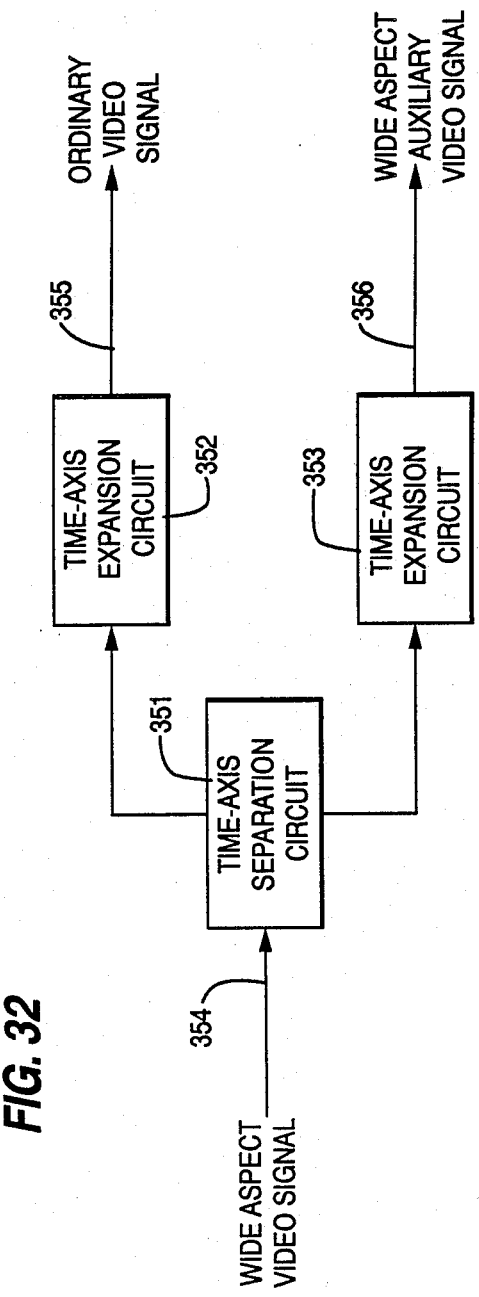
FIG. 32 is a circuit composition of an example of wide aspect video auxiliary circuit of FIG. 30.
Figure 33:
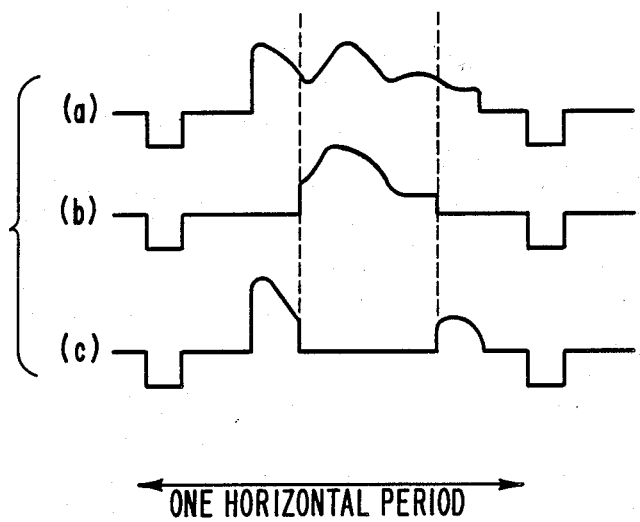
FIGS. 33(a)–(c) are waveform diagrams used to explain the operation of wide aspect video auxiliary circuit of FIG. 30.

Next is explained the wide aspect video signal processing circuit 307 in FIG. 30. FIG. 32 is a block diagram of the wide aspect video signal processing circuit 307 shown in FIG. 30. Element 351 is a time-axis separation circuit; elements 352 and 353 are time-axis expansion circuits; element 354 is a wide aspect video signal; element 355 is an ordinary video signal, and element 356 is a wide aspect auxiliary video signal. The wide aspect video signal 354 is a video signal for a screen longer in the horizontal direction than usual with an aspect ratio of, for example, 5:3, and its horizontal frequency is same as that of an ordinary television signal (FIG. 33(a)). This signal is divided into the middle portion with aspect ratio 4:3 (FIG. 33(b)), and both side portions (FIG. 33(c)), by the time0axis separation circuit 351. The middle portion is expanded by about 5/4 times by the time-axis expansion circuit 352 to become the ordinary video signal 355, which is fed into th video signal selection circuit 312 in FIG. 30. Both side portions are expanded by about 4 times by the time-axis expansion circuit 353 to become the wide aspect auxiliary video signal 356, which is fed into the multiplex signal selection circuit 303 in FIG. 30. The widths of both sides of the screen may not necessarily be the same but a value for indicating the widths may be sent in the vertical blanking period as control data if required.

Next, the sound signal processing circuit 308 shown in FIG. for processing digitally coded sound data is described below. For example, it is possible to sample a sound at about 44 KHz and quantize linearly in 16 bits, so that high quality sound can be transmitted in a band of 1.25 MHz including an error correction code (e.g. "A Digital Audio System Based on a PCM Standard Format", the 64th AES, 1979). By using a data compression method such as ADPCM, high quality sound of multiple channels can be transmitted digitally, and stereophonic sound or multilingual voice transmissions will be enabled. That is, the sound signal processing circuit 308 is the circuit for converting the format of the digitally coded sound data so as to be transmitted in the video signal period of a television signal. Also, as described later, a format conversion according to the small screen signal may be also effected if required. The additional sound signal 361 in FIG. 30 is converted into a signal in the video signal period by the sound signal processing circuit 308, and is fed into the multiplex signal selection circuit 303. It is also possible to compress and analog sound signal in a narrow band on the time-axis, and frequency multiplex it to transmit it as multiple channels.

The small screen video signal processing circuit 309 in FIG. 30 is described below. The small screen video signal 362 in FIG. 30 is a video signal with a band of 1.25 MHz. The small screen video signal processing circuit 309 converts this signal into a signal synchronized with the ordinary video signal 313, and the converted signal is fed, as a multiplex signal, to the multiplex signal selection circuit 303. Since the band of this multiplex signal is 1.25 MHz, when its resolution is similar to that of the ordinary video signal at identical horizontal and vertical frequencies, it is possible to transmit a signal for a small screen with aspect ration of 1:3 with respect to the aspect ration of 4:3 of the television screen. When it is divided, for example, into three portions, three small screens each with aspect ration of 1:1 can be obtained. And one of the three portions may be assigned for a sound transmission channel.

here, the transmission quantity of digital data is explained. The band for multiplex signal transmission is about 1.25 MHz. In the horizontal blanking period of a television signal, since it is preferable not to multiplex a signal so as not to interfere with he existing receiver, the usable period is about 50 μs. Therefore, the quantity of data that can be transmitted is 125 bits per horizontal period, but considering the quality of transmission path, error detection and correction are necessary, and thus the practically transmittable quantity is about 80 bits. Considering that the data common to the multiplex signal is transmitted in the vertical blanking period, about 1.1 Mbits of data can be transmitted per second. Therefore, in one of the above three small screen portions, the quantity of data that can be transmitted in a second is 80 bits×160 lines×30=384 Kbits, which means one channel sound signal can be sufficiently transmitted because one channel sound signal is 352 bits if processed by 44 KHz sampling, 8-bit ADPCM coding. It may be naturally understood that the sound signal and the small screen video signal can be changed over as required by the multiplex signal selection circuit 303.

The scramble processing circuit 310 shown in FIG. 30 is described below. FIG. 34 is a block diagram of the scramble processing circuit 310 in FIG. 30. Element 371 is a video scramble circuit; element 372 is a descramble information generating circuit; element 373 is a pay-charged video signal; element 374 is a scramble code; element 375 is a descramble key code; element 376 is a scramble video signal, and element 377 is a descramble data. The pay-charged video signal 373 is an ordinary video signal for providing a pay-charged program. This signal is fed into the video scramble circuit 371, in which the video signals to be displayed on the screen are scrambled block by block according to the scramble code 374 to obtain the scrambled video signal 376 for producing an unrecognizable screen image. The descramble information generating circuit 372 produces the descramble data 377 for descrambling the scrambled video signal according to the scramble code 374 and the descramble key code 375. The scramble key code 374 and descramble key code 375 are supplied,, for example, from a computer (not shown). The descramble key code is the data relating to the code of, for example, subscribed user, and since a larger quantity of information than before can be transmitted, complicated scrambling which is not possible conventionally can be realized, such as transmission of different key codes to respective users, or changing of th scrambling format with the time. At this time, when a program identification code is transmitted, automatic charging can be processed easily.

The digital data processing circuit 311 in FIG. 30 is described below. The data transmission quantity and method are same as those described in connection with the sound signal processing circuit 308. However, it is not necessary that the signal is synchronized with the screen image. The digital data 363 is for data communication such as facsimile data, and it is formatted so as to be transmitted in the video signal period by the digital data processing circuit 311, and fed into the multiplex signal selection circuit 303. When used for data communication, facsimile data or the like can be transmitted at higher rate than before.

Figure 35:
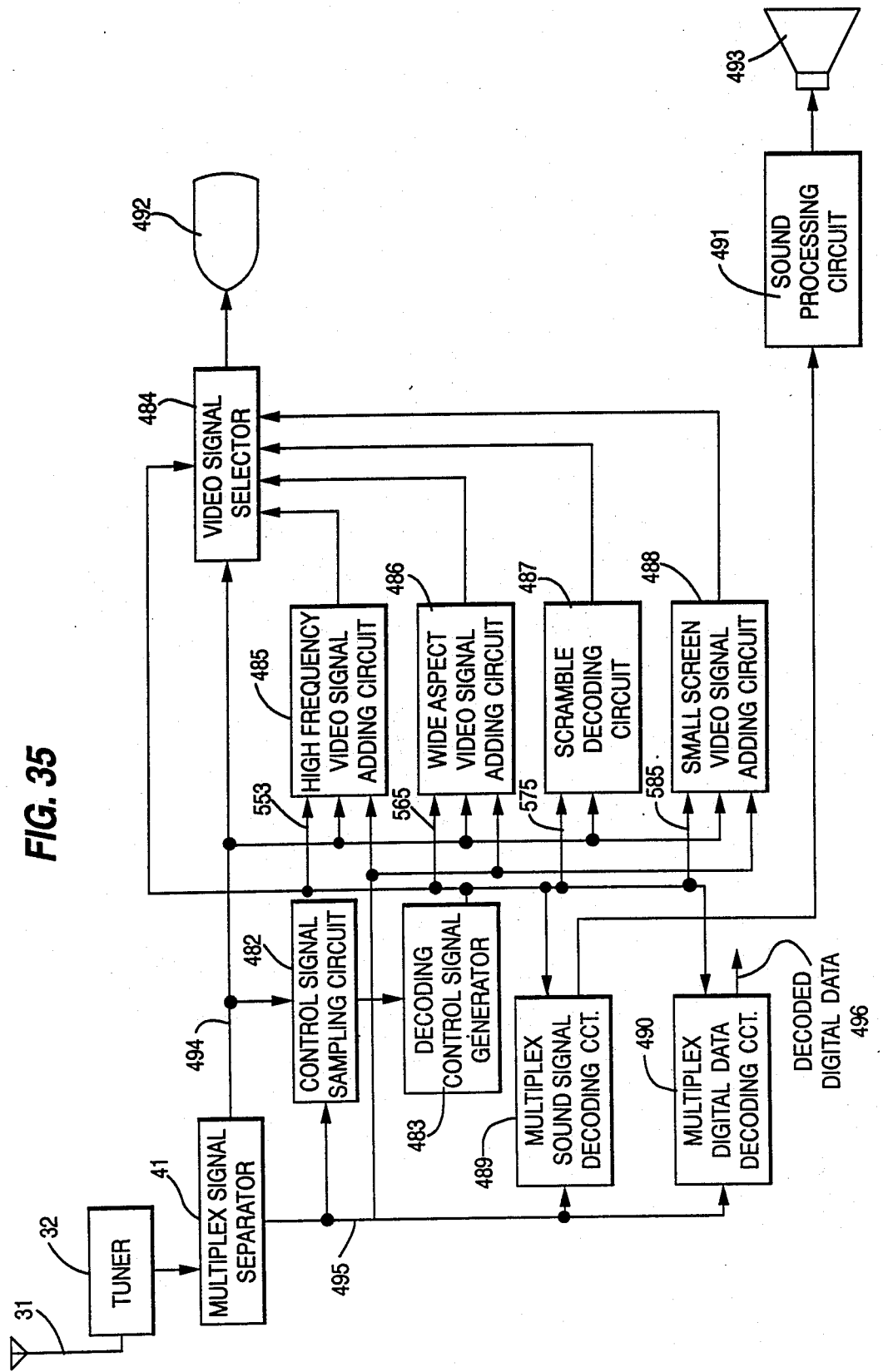

Referring now to FIG. 35, a television signal receiver as one of the embodiments of this invention is described below. Element 41 is a multiplex signal separator; element 482 is a control signal sampling circuit; element 483 is a decoding control signal generator; element 484 is a video signal selector; element 485 is a high frequency video signal adding circuit; element 486 is a wide aspect video signal adding circuit; element 487 is a scramble decoding circuit; element 488 is a small screen video signal adding circuit; element 489 is a multiplex sound signal decoding circuit; element 490 is a multiplex digital data decoding circuit; element 491 is a sound processing circuit; element 492 is a display unit; element 493 is a sound generator; element 494 is a demodulated video signal; element 495 is a demodulated multiplex signal, and element 496 is a decoded digital data.

The new composite television signal transmitted from the transmitting apparatus in FIG. 30 is received via the antenna 31 and the tuner 32, and fed into the multiplex signal separator 41.

In the multiplex signal separator 41, the composite television signal is separated and subjected to the quadrature detection to become the demodulated video signal 494 and the demodulated multiplex signal 495. From the video signal 494, the control signal superposed in the vertical blanking period is extracted by the control signal generator 483. The decoding control signal generator 483 generates decoding control signals for controlling the circuits 484 through 490. One of various video signals that are decoded by respective circuits 485 through 488 is selected by the video signal selector 484, and sent to the display unit 492 to produce a television screen image. The display unit 492 is, for example, a CRT with an aspect ration of 5:4. The decoded sound signal from the multiplex sound signal decoding circuit 489 is processed by the sound processing circuit 491, and sent to the sound generator 493 such as a speaker. Hereinafter, each block is described in detail, but the multiplex signal separator 41 which is described in connection with FIG. 4 is not mentioned below.

Figure 36:
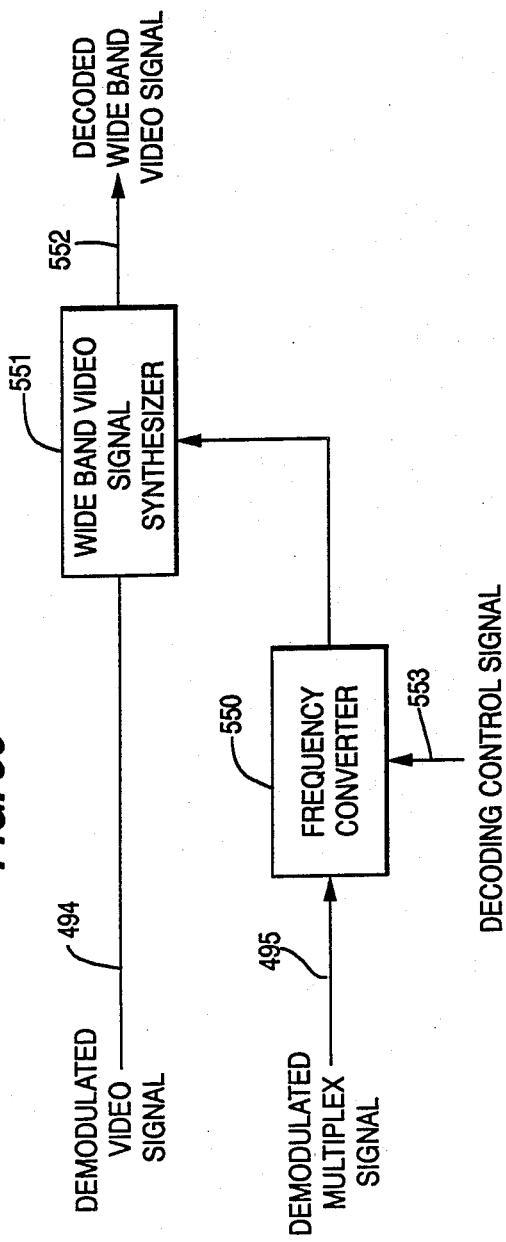
FIG. 36 is a circuit composition of an example of the video high frequency range addition circuit of FIG. 35.

First, the high frequency video signal adding circuit 485 in FIG. 35 is as follows. FIG. 36 is a block diagram of the high frequency video signal adding circuit 485; in which element 550 is a frequency converter; element 551 is a wide band video signal synthesizer, and element 552 is a decoded wide band video signal. The demodulated multiplex signal 495 is reconverted to its original band by the frequency converter 550 controlled by the decoding control signal 553, and is combined with the demodulated video signal 494 in the wide band signal synthesizer 551 to become the decoded wide band signal 552. This signal 552 is fed into the video signal selector 484 in FIG. 35.

Figure 37:
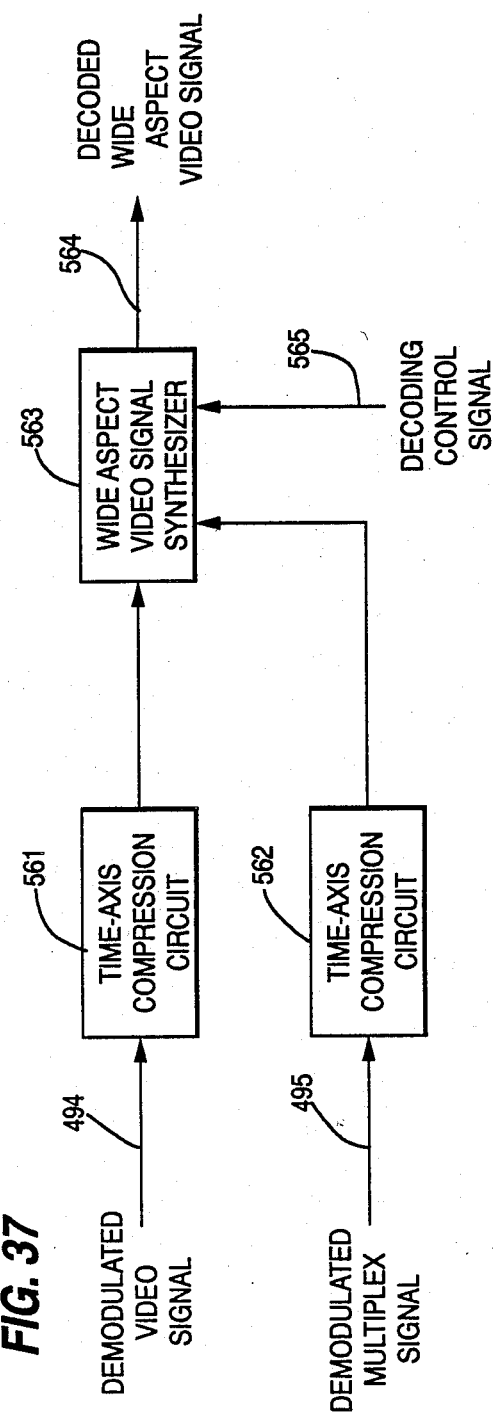
FIG. 37 is a circuit composition of an example of the wide aspect video addition circuit of FIG. 35.

The wide aspect video signal adding circuit 486 in FIG. 35 is as follows. FIG. 37 is a block diagram of the wide aspect video signal adding circuit 486, in which elements 561 and 562 are time-axis compression circuits; element 562 is a wide aspect video signal synthesizer, and element 564 is a decoded wide aspect video signal. The decoding operation is an operation which is opposite to that at the transmission side shown in FIG. 32 and FIG. 33. The decoded signal 564 is the signal to be displayed on a screen longer in the horizontal direction than the current one. The widths of the both sides of the screen can be controlled by the decoding control signal 565 from the decoding control signal generator 563 when necessary.

The scramble decoding circuit 487 in FIG. 35 is described below. FIG. 38 is a block diagram of the scramble decoding circuit 487, in which element 571 is a scramble decoder; element 572 is a descramble control circuit; element 573 is a decoded pay-charged video signal, and element 574 is a user key code. From the demodulated multiplex signal 495, the decoding control signal 575, and a user key code 574 which is supplied from, for example, a microcomputer (not shown), a control signal fro descrambling is generated. According to this control signal, the scramble decoding circuit 571 decodes the demodulated video signal 494 to obtain decoded pay-charged video signal 573 providing a recognizable screen image.

The small screen video signal adding circuit 488 in FIG. 35 is described below. FIG. 39 is a block diagram of the small screen video signal adding circuit 488, in which elements 581 and 582 are time-axis compression circuits; element 583 is a small screen video signal synthesizer, and element 584 is a video signal with decoded small screen video signal.

Figure 40:
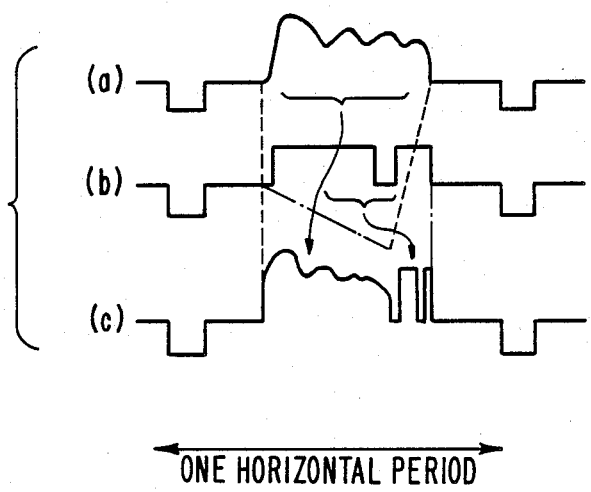
FIGS. 40(a)–(c) are waveform diagrams used to explain the operation of the small screen video addition circuit of FIG. 35.

Referring th FIGS. 40 (a)–(c), the demodulated video signal 494 in FIG. 40(a) is compressed so as o be positioned a the left side of the screen by the time-axis compression circuit 581, and the small screen signal of demodulated multiplex signal 495 in FIG. 40(b) is compressed by the time-axis compression circuit 582 so as to be positioned at the right side of the screen, and they are synthesized as shown in FIG. 40(c) by the small screen signal synthesizer 583 so as to become the video signal with decoded small screen video signal 584. Instead of the right end of the screen as explained above, a small screen may be similarly disposed at a desired position on the screen according to the decoding control signal 585.

The multiplex sound signal decoding circuit 489 and multiplex digital data decoding circuit 490 in FIG. 35 may function in a manner opposite to those at the transmission side, and thus, their detailed descriptions are hence omitted.

In addition to the television system of wide aspect ratio described hereabove, another embodiment of such system is described below. Concerning the television system of wide aspect ratio, to begin with, signal processing at the transmission side is explained herein. FIG. 41 is a block diagram of a television multiplex signal processor with wide aspect ration at the transmission side as one of the embodiments of this invention, in which element 601 is a luminance signal generating circuit; element 602 is an I (chrominance difference) signal generating circuit and element 603 is a Q (chrominance difference) signal generating circuit. The signal generating circuits 601, 602 and 603 generate a luminance signal, a wide band I signal and a narrow band Q signal, respectively, from a signal picked up by a television camera (not shown) having a larger aspect ration than the conventional aspect ration of 4:3. Elements 604, 605, and 606 are time-axis expansion circuits; element 607 is an NTSC system encoder; element 608 is a time-axis multiplexing circuit; element 609 is an added; element 610 is a multiplex signal processing circuit; element 611 is a luminance signal input terminal; element 612 is an I signal input terminal; element 613 is a Q signal input terminal; element 614 is a multiplex signal output terminal; element 615 is a time-axis multiplex signal output terminal; element 125 is a signal generating circuit; element 11 is a multiplex signal superposing circuit; element 58 is a transmitter; element 59 is an antenna; element 1 is a main signal input terminal; element 6 is a multiplex signal input terminal, and element 10 is a composite signal output terminal. Incidentally, an antenna has been illustrated, but the transmission path is not limited to a wireless system, but may be a wired system. Meanwhile, the signal generating circuit 125, multiplex signal superposing circuit 11, transmitter 58, and antenna 59 have been described in connection with FIG. 2 and FIG. 12, and explanations thereof are omitted from the following description.

The luminance signal generated by the luminance signal generating circuit 601 is fed into the time-axis expansions circuit 604 and through the terminal 611 into the multiplex signal processing circuit 610. Similarly, the wide band I signal and narrow band Q signal which are respectively generated by the I signal generating circuit 602 and Q signal generating circuit 603 are respectively fed into the time-axis expansion circuit 605 and time-axis expansion circuit 606 and through terminals 612, 613 into the multiplex signal processing circuit 610. When the original picture is picked at a horizontally stretched aspect ration m:3 (where m is a real number not smaller than 4), the signal corresponding to the portion displayed on the screen of the existing television receiver is expanded in the time-axis by m/4 times in each of the time-axis expansion circuits 604, 605, and 606. The luminance signal and chrominance difference signal components in the remaining period other than those expanded by the time-axis expansion circuit 604, 605, and 606 are converted by the multiplex signal processing circuit 610 into a time-axis multiplex signal and a frequency-axis multiplex signal, which are fed into the time-axis multiplex circuit 608 through the terminal 615 and the multiplex signal superposing circuit 11 through the terminal 614, respectively. The time-axis expanded output signals from the time-axis expansion circuits 604, 605, and 606 are converted into an NTSC signal in a know manner by the NTSC system encoder 607. Its output is combined with the time-axis multiplex signal by the time-axis multiplex circuit 608. The time-axis multiplex circuit 608 is required to have only an adding function. Its output is combined, by the adder 609, with a synchronous signal, a burst signal, and a discriminating signal for distinguishing the wide television signal from the conventional television signal, which are supplied from the signal generating circuit 125. The discriminating signal is superposed, for example, in the vertical blanking period. The output of the adder 609 and the frequency-axis multiplex signal are synthesized in the multiplex signal superposing circuit 11 to be composite signal, which is transmitted through the transmitter 58 and antenna 59.

FIG. 42 is a block diagram showing an example of internal structure of the multiplex signal processing circuit 610 in FIG. 41. In FIG. 42, element 611 is a luminance signal input terminal; element 612 is a time-axis multiplex signal output terminal; elements 621, 624, and 625 are low-pass filters (LPFs); element 622 is a subtractor; elements 626, 627, and 628 are time-axis compression circuits; element 623 is a time-axis expansion circuit, and element 629 is a time-axis adjusting circuit.

Figure 20:
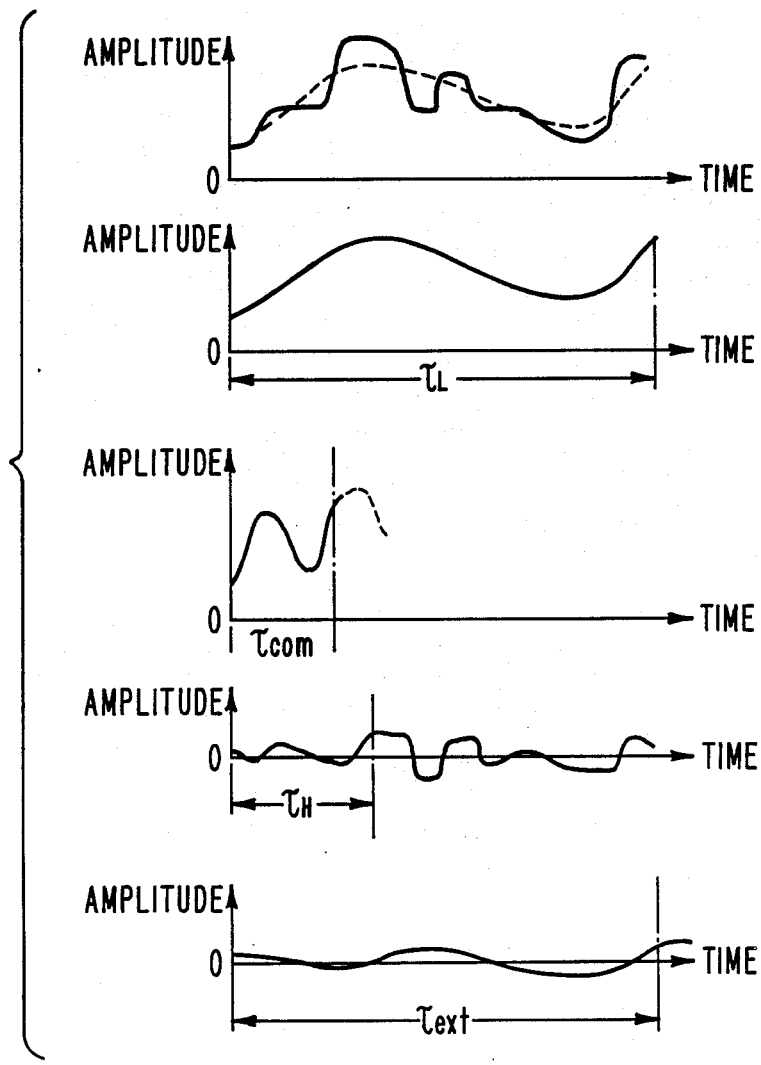
FIGS. 20(a)–(e) are signal waveform diagrams showing the signal processing step in FIG. 18.
Figure 21:
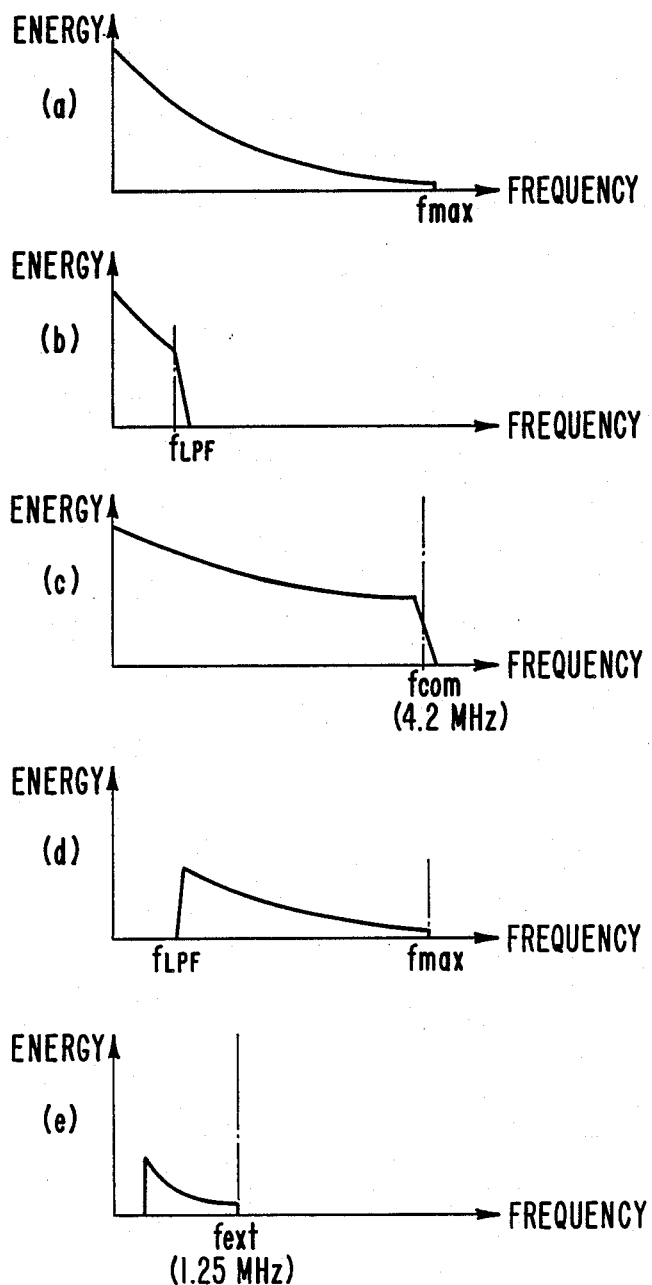
FIGS. 21(a)–(e) are spectral diagrams showing the signal processing step in FIG. 18.
Figure 22:
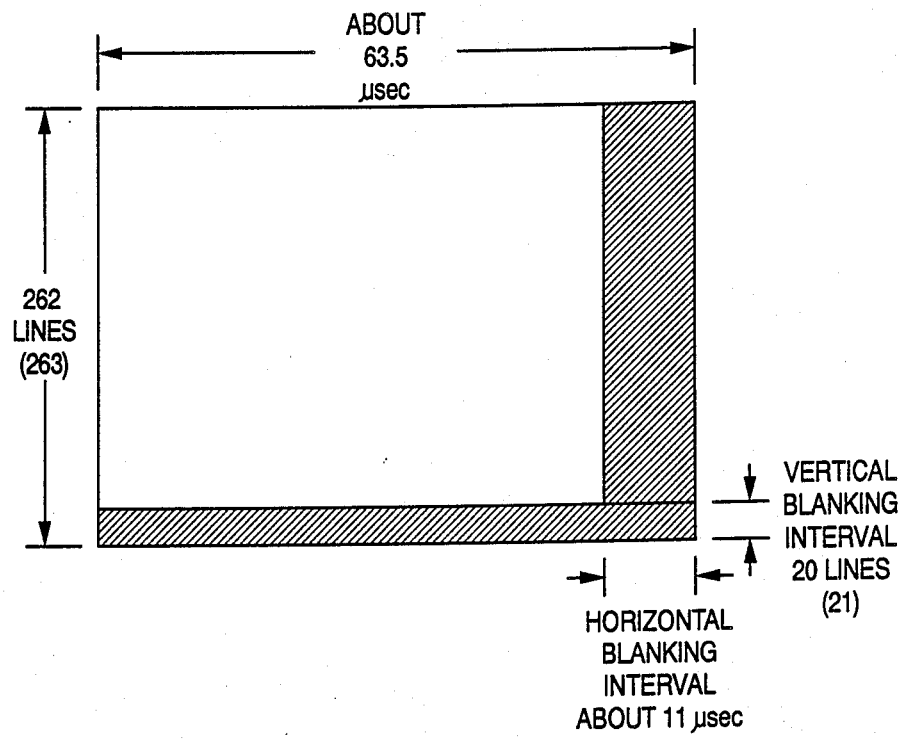
FIG. 22 is a diagram showing the blanking period of a television signal.

Referring now to FIG. 20, FIG. 21, and FIG. 22, the television multiplex signal processor having the constitution as shown in FIG. 41 and FIG. 42 is described below. The signal corresponding to the portion displayed on the screen of the existing television receiver is a main signal, and the signal corresponding to other portions, such as both sides of the wide aspect ratio screen, is a multiplex signal. The part of the luminance signal for the multiplex signal is fed through the luminance signal input terminal 611 into the LPF 621 and subtractor 622. This signal, for example, has a waveform as shown in FIG. 20($a$), and on the frequency-axis it presents a spectrum profile of low energy of high frequency as shown in FIG. 21($a$) as a general characteristic of such signal. By the LPF 621 and subtractor 622, the luminance signal is separated into a low frequency component with high energy (waveform in FIG. 20($b$), frequency spectrum in FIG. 21($b$)) and a high frequency component with relatively low energy (waveform in FIG. 20($d$), frequency spectrum in FIG. 21($d$)), which are respectively supplied into the time-axis compression circuit 626 and time-axis expansion circuit 623. In the time-axis compression circuit 626, the low frequency component shown in FIG. 20($b$), FIG. 21($b$) is compressed in the time-axis into a signal having the frequency spectrum settling within the band that can be transmitted by the NTSC system as shown in FIG. 20($c$), FIG. 21($c$). The compressed signal $Y_0$ is supplied into the time-axis adjusting circuit 629. In the time-axis adjusting circuit 629, the time-axis of the low frequency component of the luminance signal compressed in the time-axis is adjusted so that the signal can be multiplexed at least in the horizontal blanking period and vertical blanking period of the NTSC system signal composed of the main signal as shown in FIG. 22. For the adjustment of time-axis, for example, the signals $Y_0$, $I_0$, $Q_0$ may be each delayed by a memory or the like so that the signals are located in the vertical blanking interval sequentially in the order of, for example, $Y_0$, $I_0$ and $Q_0$. the output of the time-axis adjusting circuit 629 is the time-axis multiplex signal. In the time-axis expansion circuit 623, the high frequency component shown in FIGS. 20(d) and 21(d) is expanded in the time-axis so that the band is below the level of frequency-axis multiplexing to obtain the frequency-axis multiplexing to obtain the frequency-axis multiplex signal 614 as shown in FIG. 20(e) and FIG. 21(e). Next, the I signal and Q signal band are limited under the level transmittable by the NTSC system, by means of the LPFs 624 and 625, and the time-axis compression circuits 627 and 628, respectively. The outputs $I_0$, $Q_0$ of the time-axis compression circuits 627 and 628 are adjusted in time so as not to overlap with the luminance signal at least in the horizontal blanking period and vertical blanking period of the NTSC system signal composed of the main signal in the time-axis adjusting circuit 629.

FIG. 43 is a block diagram showing a television multiplex signal processor with a wide aspect ratio at the reception side in one of the embodiments of this invention, in which element 41 is a multiplex signal separator; 131 is a signal separator; element 132 is a YC separator; element 133 is an I, Q demodulator; elements 134, 135, and 136 are time-axis compression circuits corresponding to the time-axis expansion at the transmission side; element 137 is a signal selector; element 701 is a multiplex signal regenerator; element 141 is a matrix circuit; elements 142 are R, G, B signal output terminals; element 36 is a main signal output terminal; element 40 is a multiplex signal output terminal; element 702 is a main signal input terminal, and element 703 is a multiplex signal input terminal. The signal transmitted from the transmission side shown in FIG. 41 and received via the antenna 31 and the tuner 32 is separated into the main signal and the frequency-axis multiplex signal by the multiplex signal separator 41, which signals are respectively delivered through the main signal output terminal 36 and multiplex signal output terminal 40. The video baseband signal which is a main signal is separated into the luminance (Y) signal and carrier chrominance (C) signal by the YC separator 132. The Y signal is compressed in the time-axis by the time-axis compression circuit 134 to become the $Y_1$ signal. The C signal is separated into the I signal and Q signal by the I, Q demodulator 133. The I signal is compressed in the time-axis by the time-axis compression circuit 1435 to become the $I_1$ signal, while the Q signal is compressed in the time-axis by the time-axis compression circuit 136 to become $Q_1$ signal. The frequency-axis multiplex signal is transformed into the $Y_2$ signal, $I_2$ signal, and $Q_2$ signal by the multiplex signal regenerator 701. These signals $Y_1$, $I_1$, $Q_1$, $Y_2$, $I_2$, and $Q_2$ are fed into the signal selector 137, in which the $Y_1$, $I_1$, and $Q_1$ signals are selected for the portion corresponding to the screen of the existing television receiver with an aspect ration of 4:3. For the remaining period of one horizontal scanning period, a blanking signal or the like generated inside the signal selector 137 is selected when the conventional television signal is received, whereas the $Y_2$, $I_2$, and $Q_2$ signals are selected when the wide television signal is received. The output signal of the signal selector 137 is changed into R, G, B signals by the matrix circuit 141. Meanwhile, the time-axis compression circuits 134, 135 and 136 are intended to recover the wide television signal by compressing the time-axis expanded portion of the television signal having a horizontally stretched aspect ratio, as well as to allow the conventional television signal to be received without trouble. This compression ratio is determined by the aspect ratio. However, if the display unit 1000 is a liquid crystal display or the like and the blanking period is not required as in the CRT, it is not always required to compress the time-axis. Incidentally, the multiplex signal separator 41, signal separator 131, YC separator 132, I, Q demodulator 133, time-axis compression circuits 134, 135, 136, signal selector 137, and matrix circuit 141 have been described in connection with FIG. 12(b), and are omitted from the present explanations.

Figure 44:
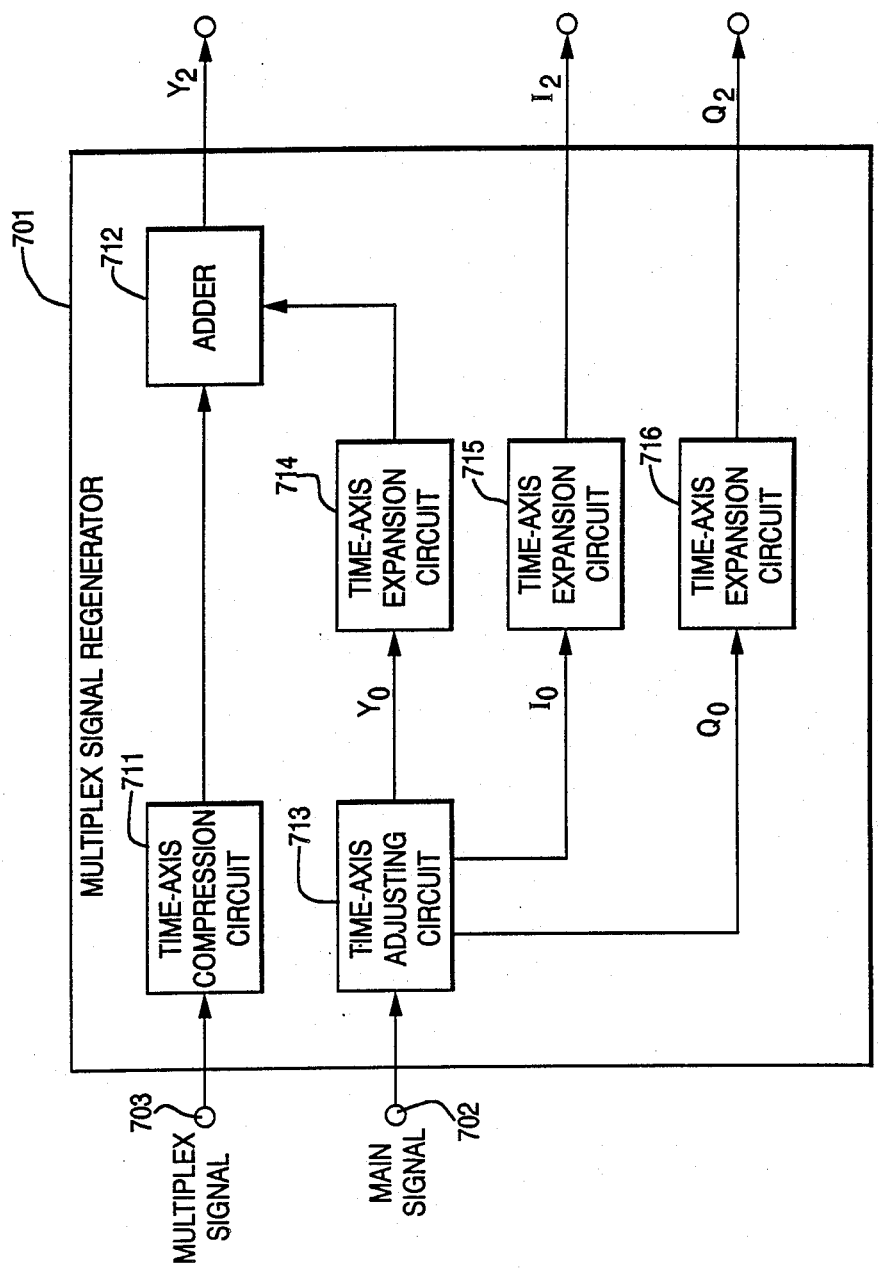
FIG. 44 is a circuit composition of an example of the multiplex signal regenerating circuit 701 shown in FIG. 43.

FIG. 44 is a block diagram showing an example of internal structure of the multiplex signal regenerator 701 in FIG. 43. This is a signal processing circuit at the reception side corresponding to the example of multiplex signal processing circuit 601 in FIG. 42 at the transmission side. In FIG. 22, element 703 is a multiplex signal input terminal; element 702 is a main signal input terminal; element 711 is a time-area compression circuit; element 712 is an adder; element 713 is a time-axis adjusting circuit, and elements 714, 715, and 716 are time-axis expansion circuits. The multiplex signal expanded by the time-axis by the time-axis expansion circuit 623 in FIG. 42 is compressed in the time-axis expansion circuit 623 in FIG. 42 is compressed in the time-axis by the time-axis compression circuit 711. The signal superposed in the blanking period of the main signal fed through the mains signal input terminal 702 is returned to the initial time relationship by the time-axis adjusting circuit 713 and correspond to the signals $Y_0$, $I_0$, and $Q_0$ compressed in the time-axis by the time-axis compression circuits 626, 627, and 628 in FIG. 42 are expanded in the time-axis by the time-axis expansion circuits 714, 715, and 716, respectively. Outputs of the time-axis expansion circuits 715 and 716 are the $I_2$ and $Q_2$ signals. The output of the time-axis expansion circuit 714 is combined with the output of the time-axis compression circuit 711 by the adder 712 to become the $Y_2$ signal. This adder 712 corresponds to the one-dimensional LPF 621 at the transmission side considered in FIG. 42, and if the filter is two-dimensional, two-dimensional processing corresponding to its inverse calculation is necessary.

In this way, by separating the multiplex signal into low frequency component and high frequency component, and multiplexing the low frequency component on the time-axis in the blanking period and multiplexing the high frequency component of small power on the frequency-axis, the multiplex signal hardly interferes with the existing television receiver, and such television signals that contain video information with an aspect ratio of greater than 4:3 can be transmitted and regenerated.

What is claimed is:

1. A multiplex signal processing apparatus in a television signal transmitting system, comprising:
    a main signal generating means for generating a television signal as a main signal;
    a multiplex signal generating means for generating a multiplex signal;
    a carrier generating means for generating a first carrier;
    a first amplitude-modulating means for amplitude modulating said carrier by said main signal to obtain a first vestigial sideband, amplitude-modulated signal;

a phase shifting means for shifting the phase of said first carrier by 90° to obtain a second carrier;

a second amplitude-modulating means for amplitude-modulating said second carrier by said multiples signal to obtain a double sideband, amplitude-modulated signal;

an inverse Nyquist filter having a Nyquist characteristic for filtering said double sideband, amplitude modulated signal to obtain a second vestigial sideband, amplitude-modulated signal, said inverse Nyquist filter having a frequency characteristic which is substantially symmetrical with respect to the frequency of said first carrier to a frequency characteristic of a Nyquist filter which is provided in a video detecting stages of a television receiver;

an adding means for adding said first and second vestigial sideband, amplitude-modulated signals to obtain a multiplexed signal; and a transmitting means for transmitting said multiplexed signal. signal.

2. An apparatus according to claim 1, wherein said second amplitude-modulating means has a means for removing said second carrier from said double sideband, amplitude-modulated signal in periods corresponding to blanking intervals of said television signal.

3. An apparatus according to claim 2, wherein said multiplex signal generating means comprises a means for down-converting high frequency components of luminance signal of said television signal to a low frequency band signal which is used as said multiplex signal.

4. An apparatus according to claim 2, wherein said multiplex signal generating means comprises a means for down-converting high frequency components of chrominance signal of said television signal to a low frequency band signal which is used as said multiplex signal.

5. An apparatus according to claim 2, wherein said multiplex signal generating means comprises a means for down-converting high frequency components of luminance and chrominance signals of said television signal to a low frequency band signal which is used as said multiplex signal.

6. An apparatus according to claim 2, wherein said multiplex signal generating means comprises a means for compressing a frequency band of high frequency components of luminance signal of said television signal, and a means for down-converting the frequency band-compressed high frequency components of luminance signal to a low frequency band signal which is used as said multiplex signal.

7. An apparatus according to claim 2, wherein said multiplex signal generating means comprises a means for generating a subcarrier, and a means for modulating said subcarrier by a digital signal to obtain a modulated signal which is used as said multiplex signal.

8. An apparatus according to claim 1, further comprising a means for generating a discriminating signal for discriminating the kind of said multiplex signal, and a means for superposing said discriminating signal in a vertical blanking interval of said television signal.

9. An apparatus according to claim 1, further comprising a means for generating a reference signal for ghost cancelling, and a means for inserting said reference signal into a vertical blanking interval of each of said main and multiplex signals.

10. A multiplex signal processing apparatus in a television signal receiving system for receiving a multiplexed signal containing a first signal which is obtained by amplitude-modulating a first carrier by a television signal as a main signal in a vestigial sideband and a second signal which is multiplexed with said first signal and is obtained by amplitude-modulating a second carrier which is the same in frequency and different in phase by 90° from said first carrier by a multiplex signal in double sideband and filtering the double sideband, amplitude-modulated signal by an inverse Nyquist filter to form a vestigial sideband signal, said apparatus comprising:

a Nyquist filter for filtering said multiplexed signal, said Nyquist filter having a frequency characteristic which is substantially symmetrical to a frequency characteristic of said inverse Nyquist filter with respect to the frequency of said first carrier;

a carrier regenerating means for regenerating said first carrier from said multiplexed signal;

a main signal detecting means for detecting said main signal from said multiplexed signal passed through said Nyquist filter by synchronous detection using said regenerated first carrier;

a main signal processing means for processing said main signal detected by said main signal detecting means;

a phase shifting means for shifting the phase of said regenerated first carrier by 90° to obtain said second carrier;

a filter for passing said multiplexed signal to remove quadrature distortion;

a multiplex signal detecting means for detecting said multiplex signal from said quadrature distortion removed multiplexed signal by synchronous detection using said second carrier from said phase shifting means; and a multiplex signal processing means for processing said multiplex signal detected by said multiplex signal detecting means to obtain an original signal for said multiplex signal.

11. An apparatus according to claim 10, wherein said multiplex signal is a low frequency band signal containing high frequency components of luminance signal of said television signal, and wherein said multiplex signal processing means comprises a means for up-converting said low frequency band signal to an original high frequency band of said high frequency components of luminance signal.

12. An apparatus according to claim 10, wherein said multiplex signal is a low frequency band signal containing high frequency components of chrominance signal of said television signal, and wherein said multiplex signal processing means comprises a means for up-converting said low frequency band signal to an original high frequency band of said high frequency components of chrominance signal.

13. An apparatus according to claim 10, wherein said multiplex signal is a low frequency band signal containing high frequency components of luminance and chrominance signals of said television signal, and wherein said multiplex signal processing means comprises a means for upconverting said low frequency band signal to an original frequency band of said high frequency components of luminance and chrominance signals.

14. An apparatus according to claim 10, wherein said multiplex signal is a low frequency band signal containing band-compressed high frequency components of luminance signal of said television signal, and wherein said multiplex signal processing means comprises a means for up-converting said low frequency band signal to an original frequency band of said band-compressed high frequency components of luminance signal, and a means for band-expanding said band-compressed high frequency components of luminance siginal to obtain original high frequency components of luminance signal.

15. An apparatus according to claim 10, wherein said multiplex signal is a modulated signal obtained by modulating a subcarrier by a digital signal, and wherein said multiplex signal processing means comprises a means for generating said subcarrier, and a means for demodulating said modulated signal by said subcarrier to obtain said digital signal.

16. An apparatus according to claim 10, wherein said multiplexed signal contains a discriminating signal for discriminating the kind of said multiplex signal in a vertical blanking interval, and wherein said apparatrus further comprises a means for extracting said discriminating signal, and a means for controlling said main and multiplex signal processing means according to said discriminating signal.

17. An apparatus according to claim 10, wherein each of said main and multiplex signals contains a reference signal for ghost cancelling in a vertical blanking interval, and wherein said apparatus further comprises two systems of tapped delay lines for respectively delaying said main and multiplex signals, and a means for weighting respective outputs of said delay lines according to said reference signal received and adding the weighted outputs to obtain ghost cancelled main and multiplex signals.

18. A multiplex signal processing apparatus in a television signal transmitting and receiving system, comprising at a transmitting side:
a main signal generating means for generating a television signal as a main signal;
a multiplex signal generating means for generating a multiplex signal;
a carrier generating means for generating a first carrier;
a first amplitude-modulating means for amplitude modulating said carrier by said main signal to obtain a first vestigial sideband, amplitude-modulated signal;
a phase shifting means for shifting the phase of said first carrier by 90° to obtain a second carrier;
a second amplitude-modulating means for amplitude modulating said second carrier by said multiples signal to obtain an double sideband, amplitude-modulated signal;
an inverse Nyquist filter having a Nyquist characteristic for filtering said double sideband, amplitude-modulated signal to obtain a second vestigial sideband, amplitude-modulated signal;
an adding means for adding said first and second vestigial sideband, amplitude-modulated signals to obtain a multiplexed signal; and
a transmitting means for transmitting said multiplexed signal, and
at a receiving side:
a Nyquist filter for filtering said multiplexed signal said Nyquist filter having a frequency characteristic which is substantially symmetrical to a frequency characteristic of said inverse Nyquist filter with respect to the frequency of said first carrier;
a carrier regenerating means for regenerating said first carrier from said multiplexed signal;
a main signal detecting means for detecting said main signal from said multiplexed signal passed through said Nyquist filter by synchronous detection using said regenerated first carrier;
a main signal processing means for processing said main signal detected by said main signal detecting means;
a phase shifting means for shifting the phase of said regenerated first carrier by 90? to obtain said second carrier;
a filter for passing said multiplexed signal to remove quadrature distortion;
a multiplex signal detecting means for detecting said multiplex signal from said quadrature distortion removed multiplexed signal by synchronous detection using said second carrier from said phase shifting means; and
a multiplex signal processing means for processing said multiplex signal detected by said multiples signal detecting means to obtain an original signal for said multiplex signal.

19. An apparatus according to claim 18, wherein said multiplex signal generating means comprises a means for down-converting high frequency components of luminance signal of said television signal to obtain a low frequency band signal containing said high frequency components of luminance signal, and wherein said multiplex signal processing means comprises a means for up-converting said low frequency band signal detected as said multiplex signal by said multiplex signal detecting means to obtain said high frequency components of luminance signal.

20. An apparatus according to claim 18, wherein said multiplex signal generating means comprises a means for down-converting high frequency components of chrominance signal of said television signal to obtain a low frequency band signal containing said high frequency components of chrominance signal, and wherein said multiplex signal processing means comprises a means for up-converting said low frequency band signal detected as said multiplex signal by said multiplex signal detecting means to obtain said high frequency components of chrominance signal.

21. An apparatus according to claim 18, wherein said multiplex signal generating means comprises a means for down-converting high frequency components of luminance and chrominance signals of said television signal to obtain a low frequency band signal containing said high frequency components of luminance and chrominance signals, and wherein said multiplex signal processing means comprises a means for up-converting said low frequency band signal detected as said multiplex signal by said multiplex signal detecting means to obtain said high frequency components of luminance and chrominance signals.

22. An apparatus according to claim 18, wherein said multiplex signal generating means comprises a means for compressing a frequency band of high frequency components of luminance signal of said television signal, and a means for down-converting the frequency band-compressed high frequency components of luminance signal to obtain a low frequency band signal containing the frequency band-compressed high frequency components of luminance signal, and wherein said multiplex signal processing means comprises a means for up-converting said low frequency band signal detected as said multiplex signal by said multiplex signal detecting means to obtain said frequency band-compressed high frequency components of luminance signal, and a means for expanding the frequency band of said frequency band-compressed high frequency components of luminance signal to obtain said high frequency components of luminance signal in its original frequency band.

23. An apparatus according to claim 18, wherein said multiplex signal generating means comprises a means for generating a subcarrier, and a means for modulating said subcarrier by a digital signal to obtain a modulated signal, and wherein said multiplex signal processing means comprises a means for generating said subcarrier, and a means for demodulating said modulated signal detected as said multiplex signal by said multiplex signal detecting means by using said subcarrier generated by said subcarrier generating means in said multiplex signal processing means to obtain said digital signal.

24. An apparatus according to claim 18, further comprising, at the transmitting side, a means for generating a discriminating signal for discriminating the kind of said multiplex signal, and a means for superposing said discriminating signal in a vertical blanking interval of said television signal, and, at the receiving side, a means for extracting said discriminating signal from the received multiplexed signal, and a means for controlling said main and multiplex signal processing means according to the extracted discriminating signal.

25. An apparatus according to claim 18, further comprising, at the transmitting side, a means for generating a reference signal for ghost cancelling, and a means for inserting said reference signal into a vertical blanking interval of each of said main and multiplex signals, and, at the receiving side, two systems of tapped delay lines for respectively delaying said detected main and multiplex signals, and a means for weighting respective outputs of said delay lines according to said reference signal received and adding the weighted outputs to obtain ghost cancelled main and multiplex signals.

26. A multiplex signal processing apparatus in a signal transmitting system, comprising:
a main signal generating means for generating a main signal;
a multiplex signal generative means for generating a multiplex signal,
a carrier generating means for generating a first carrier;
a first amplitude-modulating means for amplitude-modulating said carrier by said main signal to obtain a first vestigial sideband, amplitude-modulated signal;
a phase shifting means for shifting the phase of said first carrier by 90° to obtain a second carrier;
a second amplitude-modulating means for amplitude modulating said second carrier by said multiplex signal to obtain a double sideband, amplitude-modulated signal;
an inverse Nyquist filter having a Nyquist characteristic for filtering said double sideband, amplitude-modulated signal to obtain a second vestigial sideband, amplitude-modulated signal, said inverse Nyquist filter having a frequency characteristic which is substantially symmetrical with respect to the frequency of said first carrier to a frequency characteristic of a Nyquist filter which is provided in a video detecting stage of a television receiver;
an adding means for adding said first and second vestigial sideband, amplitude-modulater signals to obtain a multiplexed signal; and
a transmitting means for transmitting said multiplex.

27. A multiplex signal processing apparatus in a signal receiving system for receiving a multiplexed signal containing a first signal which is obtained by amplitude-modulating a first carrier by a main signal in a vestigial sideband and a second signal which is multiplexed with said first signal and is obtained by amplitude-modulating a second carrier which is the same in frequency and different in phase by 90° from said first carrier by a multiplex signal in double sideband and filtering the double side band, amplitude-modulated signal by an inverse Nyquist filter to form a vestigial sideband signal, said apparatus comprising:
a Nyquist filter for filtering said multiplexed signal;
a carrier regenerating means for regenerating said first carrier from said multiplexed signal;
a main signal detecting means for detecting said main signal from said multiplexed signal passed through said Nyquist filter by synchronous detection using said regenerated first carrier;
a main signal processing means for processing said main signal detected by said main signal detecting means;
a phase shifting means for shifting the phase of said regenerated first carrier by 90° to obtain said second carrier;
a filter for passing said multiplexed signal to remove quadrature distortion;
a multiplex signal detecting means for detecting said multiplex signal from said quadrature distortion removed multiplexed signal by synchronous detection using said second carrier from said phase shifting means; and
a multiplex signal processing means for processing said multiplex signal detected by said multiplex signal detecting means to obtain an original signal for said multiplex signal.

28. A multiplex signal processing apparatus in a signal transmitting and receiving system, comprising, in a transmitting side:
a main signal generating means for generating a main signal;
a multiplex signal generating means for generating a multiplex signal;
a carrier generating means for generating a first carrier;
a first amplitude-modulating means for amplitude modulating said carrier by said main signal to obtain a first vestigial sideband, amplitude-modulated signal;
a phase shifting means for shifting the phase of said first carrier by 90° to obtain a second carrier;
a second amplitude-modulating means for amplitude modulating said second carrier by said multiplex signal to obtain a double, amplitude-modulated signal;
an inverse Nyquist filter having a Nyquist characteristic for filtering said double sideband, amplitude-modulated signal to obtain a second vestigial sideband, amplitude-modulated signal;
an adding means for adding said first and second vestigial sideband, amplitude-modulated signals to obtain a multiplexed signal; and
a transmitting means for transmitting said multiplexed signal, and
a in a receiving side:
a Nyquist filter for filtering said multiplexed signal, said Nyquist filter having a frequency characteristic which is substantially symmetrical to a frequency characteristic of said inverse Nyquist filter with respect to the frequency of said first carrier;

a carrier regenerating means for regenerating said first carrier from said multiplexed signal;

a main signal detecting means for detecting said main signal from said multiplexed signal passed through said Nyquist filter by synchronous detection using said regenerated first carrier;

a main signal processing means for processing said main signal detected by said main signal detecting means;

a phase shifting means for shifting the phase of said regenerated first carrier by 90° to obtain said second carrier;

a filter for passing said multiplexed signal to remove quadrature distortion;

a multiplex signal detecting means for detecting said multiplex signal from said quadrature distortion removed multiplexed signal by synchronous detection using said second carrier from said phase shifting means; and a multiplex signal processing means for processing said multiplex signal detected by said multiplex signal detecting means to obtain an original signal for said multiplex signal.

29. An apparatus according to claim 28, further comprising, at the transmitting side, a means for generating a discriminating signal for discrimination the kind of said multiplex signal, and a means for superposing said discriminating signal on said multiplexed signal, and, at the receiving side, a means for extracting said discriminating signal from said received multiplexed signal, and a means for controlling said main and multiplex signal processing means according to the extracted discriminating signal.

30. An apparatus for transmitting a wide aspect ration television signal corresponding to an image displayed on a television screen having a wider aspect ratio than 4:3, comprising:

a first time-axis expanding means for expanding on time-axis a first part of said wide aspect ratio television signal corresponding to the aspect ratio of 4:3 to obtain a first television signal;

a second time-axis expanding means for expanding on time-axis a second part which is the remaining part other than the first part of said wide aspect ratio television signal to obtain a second television signal;

a frequency-axis multiplexing means for multiplexing said first and second television signal on frequency-axis to obtain a multiplexed television signal, and a means for transmitting said multiplexed television signal;

wherein said frequency-axis multiplexing means comprises:

a carrier generating means for generating first and second carriers which are equal in frequency to and different in phase by 90° from each other;

a first amplitude-modulating means for amplitude modulating said first carrier by said first television signal to obtain a first vestigial side band, amplitude-modulated television signal;

a second amplitude-modulating means for amplitude modulating said second carrier by said second television signal to obtain a double side band, amplitude-modulated television signal;

an inverse Nyquist filter having a Nyquist characteristic for filtering said double side band, amplitude-modulated television signal to obtain a second vestigial side band, amplitude-modulated television signal; and an adding means for adding said first and second vestigial side band, amplitude-modulated television signals.

31. An apparatus for transmitting and an apparatus for receiving a wide aspect ratio television screen having a wider aspect ratio than 4:3, and apparatus for transmitting comprising:

a first time-axis expanding means for expanding on time-axis a first part of said wide aspect ratio television signal corresponding to the aspect ratio of 4:3 to obtain a first television signal;

a second time-axis expanding means for expanding on time-axis a second part which is the remaining part other than the first part of said wide aspect ratio television signal to obtain a second television signal;

a frequency-axis multiplexing means for multiplexing said first and second television signal on frequency-axis to obtain a multiplexed television signal; and a means for transmitting said multiplexed television signal;

and said apparatus for receiving the multiplexed television signal transmitted from said apparatus for transmitting comprising:

a means for receiving and multiplexed television signal;

a signal separating means for separating the received multiplexed television signal into said first television signal and said second television signal;

a second time-axis compressing means for compressing on time-axis said second television signal to obtain said second part of said wide aspect ratio television signal; and a means for composing said wide aspect ratio television signal from the first and second parts;

wherein said signal separating means comprises:

a Nyquist filter for filtering said multiplexed television signal;

a carrier regenerating means for regenerating from said multiplexed television signal first and second carriers which are equal in frequency to and different in phase by 90° from each other;

a first detecting means for detecting said first television signal from said multiplexed television signal passed through said Nyquist filter by using said regenerated first carrier;

a filter for passing said multiplexed television signal to remove quadrature distortion; and a second detecting means for detecting said second television signal from said multiplexed signal passed through said filter by using said regenerated second carrier.

32. An apparatus for transmitting a wide aspect ratio television signal corresponding to an image displayed on a television screen having a wider aspect ratio than 4:3, comprising:

a first time-axis expanding means for expanding on time-axis a first part of said wide aspect ratio television signal corresponding to the aspect ratio of 4:3 to obtain a first television signal;

a signal separating means for separating the remaining part other than the first part of each wide aspect television signal into second and third parts;

a time-axis compressing means for compressing on time-axis said second part to obtain a second television signal;

a second time-axis expanding means for expanding on time-axis said third part to obtain a multiplex signal.

a time-axis multiplexing means for multiplexing on time-axis said first and second television signal to obtain a main television signal;

a frequency-axis multiplexing means for multiplexing on time-axis said main television signal and said multiplex signal to obtain a multiplexed television signal; and a means for transmitting said multiplexed television signal;

wherein said frequency-axis multiplexing means comprises:

a carrier generating means for generating first and second carriers which are equal to frequency to and different in phase by 90° from each other;

a first amplitude-modulating means for amplitude modulating said first carrier by said main television signal to obtain a vestigial side band, amplitude-modulated television signal;

a second amplitude-modulating means for amplitude-modulating said second carrier by said multiplex signal to obtain a double side band, amplitude-modulated multiplex signal an inverse Nyquist filter having a Nyquist characteristic for filtering said double side band, amplitude-modulated multiplex signal to obtain a vestigial side band, amplitude modulated multiplex signal; and an adding means for adding said vestigial side band, amplitude-modulated television and multiplex signals to obtain said multiplexed television signal.

33. An apparatus for transmitting and an apparatus for receiving a wise aspect ratio television signal corresponding to an image displayer on a television screen having a wider aspect ratio than 4:3 said apparatus for transmitting comprising:

a first time-axis expanding means for expanding on time-axis a first part of said wide aspect ratio television signal corresponding to the aspect ratio of 4:3 to obtain a first television signal;

a signal separating means for separating the remaining part other than the first part of said wide aspect television signal into second and third parts;

a time-axis compressing means for compressing on time axis said second part to obtain a second television signal;

a second time-axis expanding means for expanding on time-axis said third part to obtain a multiplex signal;

a time-axis multiplexing means for multiplexing on time-axis said first and second television signal to obtain a main television signal;

a frequency-axis multiplexing means for multiplexing on time-axis said main television signal and said multiplex signal to obtain a multiplexed television signal; and a means for transmitting said multiplexed television signal;

and said apparatus for receiving the multiplexed television signal transmitted from said apparatus for transmitting comprising:

a means for receiving said multiplexed television signal;

a first signal separating means for separating the received multiplexed television signal into said main television signal and said multiplex signal;

a second signal separating means for separating said main television signal into said first and second television signals;

a first time-axis compressing means for compressing on time-axis said separated first television signal to obtain said first part of said wide aspect ratio television signal;

a time-axis expanding means for expanding on time-axis said separated second television signal to obtain said second part of said wide aspect ratio television signal;

a second time-axis compressing means for compressing on time-axis said separated multiples signal to obtain said third part of said wide aspect ratio television signal; and a means for composing said wide aspect ratio television signal from said first, second and third parts;

wherein said first signal separating means comprises:

a Nyquist filter for filtering said multiplexed television signal;

a carrier regenerating means for regenerating from said multiplexed television signal first and second carriers which are equal in frequency to and different in phase by 90° from each other;

a first detecting means for detecting said main television signal form said multiplexed television signal passed through said Nyquist filter by using said regenerated first carrier;

a filter for passing said multiplexed television signal to remove quadrature distortion; and a second detecting means for detecting said multiplex signal from said multiplexed television signal passed through said filter by using said regenerated second carrier.

* * * * *